US012391107B2

(12) United States Patent
Müller et al.

(10) Patent No.: US 12,391,107 B2
(45) Date of Patent: Aug. 19, 2025

(54) BATTERY GUIDE PINS FOR A BATTERY RECEIVING SPACE OF A MATERIALS HANDLING VEHICLE, AND MATERIALS HANDLING VEHICLES INCORPORATING THE SAME

(71) Applicant: CROWN EQUIPMENT CORPORATION, New Bremen, OH (US)

(72) Inventors: Roland Müller, Feldkirchen (DE); Martin Ma, Jiangsu (CN); Jack Yang, Jiangsu (CN); Andy Chen, Jiangsu (CN); Bruce Xia, Jiangsu (CN); Luying Sun, Jiangsu (CN)

(73) Assignee: CROWN EQUIPMENT CORPORATION, New Bremen, OH (US)

( * ) Notice: Subject to any disclaimer, the term of this patent is extended or adjusted under 35 U.S.C. 154(b) by 575 days.

(21) Appl. No.: 17/814,585

(22) Filed: Jul. 25, 2022

(65) Prior Publication Data

US 2023/0129896 A1    Apr. 27, 2023

Related U.S. Application Data

(63) Continuation of application No. PCT/CN2022/083994, filed on Mar. 30, 2022, and a
(Continued)

(51) Int. Cl.
*B60K 1/04*     (2019.01)
*B60L 50/64*    (2019.01)
(Continued)

(52) U.S. Cl.
CPC ............... *B60K 1/04* (2013.01); *B60L 50/64* (2019.02); *B60L 53/80* (2019.02); *H01M 50/249* (2021.01); *H01M 2220/20* (2013.01)

(58) Field of Classification Search
CPC .... B60K 1/04; H01M 50/249; H01M 50/244; H01M 50/256; H01M 50/262;
(Continued)

(56) References Cited

U.S. PATENT DOCUMENTS 5,626,979 A * 5/1997 Mitsui ................ H01M 50/244
                                              429/97
6,004,690 A    12/1999 Van Lerberghe
(Continued)

FOREIGN PATENT DOCUMENTS

CN    101100184 A    1/2008
CN    101200269 A    6/2008
(Continued)

OTHER PUBLICATIONS

International Search Report and Written Opinion dated Dec. 30, 2022 issued in International application No. PCT/CN2022/083994 filed Mar. 30, 2022.
(Continued)

*Primary Examiner* — Steve Clemmons
(74) *Attorney, Agent, or Firm* — Dinsmore & Shohl LLP

(57) ABSTRACT

A materials handling vehicle including a battery receiving space, and a removable battery assembly, wherein: the battery receiving space includes opposing pairs of battery guide pins, each opposing pair arranged on opposite sides of the battery receiving space, and each opposing pair includes a latching pin and a guiding pin; the removable battery assembly includes a battery locking mechanism; the battery locking mechanism includes spring-loaded locking pins that are spring-biased in extended positions and are movable from the extended positions to respective retracted positions; the latching pin of each opposing pair of battery guide pins includes a recess forming a battery latch that is positioned to
(Continued)

receive a leading portion of one of the spring-loaded locking pins in the extended position.

33 Claims, 27 Drawing Sheets

Related U.S. Application Data continuation-in-part of application No. PCT/CN2021/125869, filed on Oct. 22, 2021.

(51) Int. Cl.
*B60L 53/80* (2019.01)
*H01M 50/249* (2021.01)

(58) Field of Classification Search
CPC .............. H01M 2220/20; B66F 9/0753; B66F 9/07536; B66F 9/0754
See application file for complete search history.

(56) References Cited

U.S. PATENT DOCUMENTS

| | | | |
|---|---|---|---|
| 7,117,966 B2 * | 10/2006 | Kohda | B60L 53/80 180/68.5 |
| 8,347,995 B2 | 1/2013 | Fernandez-Mateo | |
| 8,413,947 B2 | 4/2013 | Chiang | |
| 9,327,586 B2 * | 5/2016 | Miyashiro | B62J 43/20 |
| 9,827,840 B2 * | 11/2017 | Wen | H01M 50/249 |
| 11,233,291 B2 * | 1/2022 | Confer | H01M 50/264 |
| 11,813,956 B1 * | 11/2023 | Decuzzi | B66D 1/60 |
| 2005/0191543 A1 | 9/2005 | Harrington | |
| 2007/0052389 A1 | 3/2007 | Kooij | |
| 2010/0275564 A1 | 11/2010 | Baetica et al. | |
| 2018/0130983 A1 | 5/2018 | Tessier | |

FOREIGN PATENT DOCUMENTS

| | | | | |
|---|---|---|---|---|
| CN | 102358156 B | | 2/2012 | |
| CN | 102398876 A | | 4/2012 | |
| CN | 211255144 U | | 8/2014 | |
| CN | 105523506 A | | 4/2016 | |
| CN | 205873810 U | | 1/2017 | |
| CN | 108112339 A | | 6/2018 | |
| CN | 208819918 U | | 5/2019 | |
| CN | 211578809 U | | 9/2020 | |
| CN | 113120809 A | * | 7/2021 | ............... B60K 1/04 |
| CN | 213738432 U | | 7/2021 | |
| CN | 113471613 A | | 10/2021 | |
| CN | 215662918 U | | 1/2022 | |
| DE | 19956623 A1 | * | 6/2001 | ............... B60K 1/04 |
| DE | 102007034747 A1 | | 1/2009 | |
| DE | 202014004558 U1 | | 8/2014 | |
| EP | 2018989 B1 | | 4/2010 | |
| EP | 2261167 A1 | * | 12/2010 | .......... B60L 11/1822 |
| EP | 2674389 B1 | | 3/2017 | |
| EP | 3309001 A1 | | 4/2018 | |
| EP | 3719862 A1 | | 10/2020 | |
| JP | 2629787 B2 | | 7/1997 | |
| JP | H11208287 A | | 8/1998 | |
| JP | 2002003194 A | | 1/2002 | |
| JP | 2003327394 A | | 11/2003 | |
| JP | 5478853 B2 | | 4/2014 | |
| JP | 201820679 A | | 8/2018 | |
| KR | 20130130921 A | | 12/2013 | |

OTHER PUBLICATIONS

Extended European Search Report issued Oct. 9, 2023 in European Application No. 22203046.2 filed Oct. 21, 2022.
International Search Report and Written Opinion issued in International application No. PCT/CN2021/125869 dated Jun. 7, 2022.
Extended European Search Report issued on Aug. 21, 2024 in related European Patent Application No. 24176256.6 filed Oct. 21, 2022.

* cited by examiner

BATTERY GUIDE PINS FOR A BATTERY RECEIVING SPACE OF A MATERIALS HANDLING VEHICLE, AND MATERIALS HANDLING VEHICLES INCORPORATING THE SAME

CROSS-REFERENCE TO RELATED APPLICATIONS

This application is a bypass continuation in part application of International Patent Application Ser. No. PCT/CN2021/125869 filed Oct. 22, 2021, and a bypass continuation application of International Patent Application Ser. No. PCT/CN2021/083994 filed Mar. 30, 2022, the entire disclosures of which are hereby incorporated herein by reference.

BACKGROUND

Although the concepts of the present disclosure are described herein with primary reference to electric pallet trucks where the drive motor of the pallet truck is integrated with the hub of the pallet truck's single drive wheel, it is contemplated that particular concepts of the present disclosure will enjoy applicability to pallet trucks with other types of motor configurations, or to other types of battery-powered materials handling vehicles including, for example, forklift trucks, tuggers, etc.

SUMMARY

In accordance with the present disclosure, an object of the invention can be seen in providing an improved materials handling vehicle as well as an improved removable battery assembly.

An aspect relates to a materials handling vehicle. The materials handling vehicle may comprise a materials handling mechanism and a drive mechanism. The materials handling vehicle may comprise a battery receiving space and a removable battery assembly.

The materials handling vehicle may be configured to move along an inventory transit surface and engage goods in a warehouse environment. The materials handling mechanism may be configured to engage goods in a warehouse environment and may cooperate with the drive mechanism, under power from the removable battery assembly, to move goods along an inventory transit surface in the warehouse environment. The removable battery assembly may comprise a battery body and a battery locking mechanism. The removable battery assembly and the battery receiving space may cooperate to define a battery insertion and removal axis. The removable battery assembly may be inserted into and removed from the battery receiving space along the battery insertion and removal axis. The battery body may define a longitudinal battery insertion and removal axis along which the removable battery assembly can be inserted into and removed from a battery receiving space of a materials handling vehicle.

The battery locking mechanism may comprise a spring-loaded battery handle and a spring-loaded locking pin. The spring-loaded locking pin may comprise a leading portion that may be configured to engage a battery latch positioned in a battery receiving space of a materials handling vehicle. The battery receiving space may comprise a battery latch positioned to receive a leading portion of the spring-loaded locking pin, with the spring-loaded locking pin in an extended position, and/or the removable battery assembly seated in the battery receiving space. The spring-loaded battery handle may comprise a planar handle cam surface and the spring-loaded locking pin may comprise a planar pin cam surface that may be parallel to the handle cam surface. The spring-loaded battery handle and the spring-loaded locking pin may be configured such that the handle cam surface engages the pin cam surface with movement of the battery handle, relative to the battery body, along the battery insertion and removal axis. The spring-loaded battery handle and the handle cam surface may be constrained to linear movement along the battery insertion and removal axis. The battery body may constrain the spring-loaded battery handle and the handle cam surface to linear movement along the battery insertion and removal axis. The spring-loaded locking pin and the pin cam surface may be constrained to linear movement along a latch engagement and disengagement axis that may be perpendicular to the battery insertion and removal axis. The battery body may constrain the spring-loaded locking pin and the pin cam surface to linear movement along the latch engagement and disengagement axis. The spring-loaded battery handle may be spring-biased in a locked position and may be movable relative to the battery body from the locked position to an unlocked position in a handle lifting direction along the battery insertion and removal axis. The spring-loaded locking pin may be spring-biased in an extended position and may be movable to a retracted position in response to movement of the battery handle from the locked position to an unlocked position, with the handle cam surface engaging the pin cam surface. The spring-loaded locking pin may be spring-biased in an extended position and may be movable relative to the battery body from the extended position to a retracted position along the latch engagement and disengagement axis in response to movement of the battery handle, relative to the battery body, in the handle lifting direction with the handle cam surface engaged with the pin cam surface.

The battery locking mechanism may comprise a pair of spring-loaded locking pins. The battery receiving space may comprise a corresponding pair of battery latches positioned on opposite sides of the battery receiving space, to receive a leading portion of a corresponding one of the pair of spring-loaded locking pins with the removable battery assembly seated in the battery receiving space.

The spring-loaded battery handle may comprise a grip portion and a pair of spaced apart arm portions extending in the handle lifting direction, along the battery insertion and removal axis, from inside the battery body to opposite ends of the grip portion, outside of the battery body (210). Each arm portion may comprise a planar handle cam surface and each spring-loaded locking pin may comprise a corresponding planar pin cam surface that may be parallel to the handle cam surface.

The planar handle cam surface and corresponding planar pin cam surface of one of the arm portions may be configured as a mirror image of the planar handle cam surface and corresponding planar pin cam surface of the other of the arm portions. The pair of spring-loaded locking pins may comprise locking pin extensions that may extend along the latch engagement and disengagement axis in opposite directions.

The planar handle cam surface and the planar pin cam surface may define equal alternate exterior angles, relative to a cam surface traversal extending in the handle lifting direction, along the battery insertion and removal axis.

The spring-loaded battery handle may comprise a locking pin passage formed in the planar handle cam surface. The spring-loaded locking pin may comprise a locking pin extension extending from the planar pin cam surface through the locking pin passage formed in the planar handle cam surface.

The removable battery assembly may further comprise a handle spring in direct contact with the spring-loaded battery handle to bias the battery handle toward the locked position, a locking pin spring in direct contact with the spring-loaded locking pin to bias the spring-loaded locking pin toward the extended position, or both.

The removable battery assembly may further comprise a handle spring in direct contact with the spring-loaded battery handle to bias the battery handle toward the locked position. The battery body may comprise a handle-facing, spring-receiving cavity for the handle spring. The spring-loaded battery handle may comprise a spring-engaging finger extending from the battery handle in the handle lifting direction, along the battery insertion and removal axis, into the handle-facing spring-receiving cavity, along a longitudinal axis of the spring-receiving cavity.

The removable battery assembly may further comprise a locking pin spring in direct contact with the spring-loaded locking pin to bias the spring-loaded locking pin toward the extended position. The battery body may comprise a pin-facing, spring-receiving cavity. The spring-loaded locking pin may comprise a spring-engaging finger extending from the spring-loaded locking pin perpendicular to the battery insertion and removal axis, into the pin-facing, spring-receiving cavity, along a longitudinal axis of the spring-receiving cavity.

The battery body of the removable battery assembly may comprise a plurality of rechargeable battery cells, a front case, and a rear case. The front and rear cases may cooperate to contain a plurality of rechargeable battery cells therein. The front and rear cases may cooperate to contain portions of the spring-loaded battery handle comprising the handle cam surface and portions of the spring-loaded locking pin comprising the pin cam surface.

Either the front case or the rear case of the battery body may exclusively constrain the spring-loaded battery handle and the handle cam surface to linear movement along the battery insertion and removal axis.

The battery body may contain portions of the spring-loaded battery handle comprising the handle cam surface and portions of the spring-loaded locking pin comprising the pin cam surface. The battery body may comprise one or more handle passages and one or more locking pin passages. An arm portion of the spring-loaded battery handle may pass through the handle passage to a grip portion of the battery handle outside of the battery body. A locking pin extension of the spring-loaded locking pin passes through the locking pin passage to an exterior of the battery body.

The spring-loaded battery handle and the spring-loaded locking pin may engage at the handle cam surface and the pin cam surface such that movement of the battery handle from the locked position to the unlocked position through the handle passage in the handle lifting direction causes movement of the locking pin extension of the spring-loaded locking pin through the locking pin passage from the extended position to the retracted position along the latch engagement and disengagement axis.

The grip portion of the battery handle may be flush with a top surface of the battery body in the locked position and may extend above the top surface of the battery body in the unlocked position.

The battery body may comprise a handle grip recess formed below the grip portion of the spring-loaded battery handle. The handle grip recess may extend at least approximately 6.5 mm along the battery insertion and removal axis.

The spring-loaded battery handle may comprise handle-side limiting surfaces independent of the planar handle cam surface of the battery handle. The handle-side limiting surfaces may be inclined relative to the handle lifting direction. The battery body may comprise body-side limiting surfaces that may be positioned parallel to corresponding handle-side limiting surfaces of the spring-loaded battery handle, to engage the corresponding handle-side limiting surfaces of the battery handle in the locked position.

The battery body may comprise a body-side limiting surface that may be inclined relative to the handle lifting direction and dedicated for engagement of the handle cam surface in the unlocked position.

The removable battery assembly may comprise a leading face and an electrical socket on the leading face of the removable battery assembly. The battery receiving space may comprise an electrical connector that may complement the electrical socket of the removable battery assembly. The spring-loaded locking pin may be positioned at a point along a longitudinal dimension of the battery body that may result in locking pin engagement with the battery latch simultaneously with engagement of the electrical socket on the leading face of the removable battery assembly with the electrical connector in the battery receiving space, as the removable battery assembly may be inserted into the battery receiving space, with the spring-loaded battery handle in the locked position.

The electrical socket may be recessed on the leading face of the removable battery assembly.

The leading face of the removable battery assembly may rest on a bottom surface of the battery receiving space with the spring-loaded locking pin engaged with the battery latch, and the electrical socket engaged with the electrical connector.

The removable battery assembly may comprise a leading face and an electrical socket on the leading face of the removable battery assembly. The battery receiving space may comprise an electrical connector that may complement the electrical socket of the removable battery assembly. The electrical socket, the electrical connector, the battery body, and the battery receiving space may be configured to define a standoff gap extending along the battery insertion and removal axis between opposing surfaces of the electrical socket and the electrical connector, with the leading face of the removable battery assembly resting on a bottom surface of the battery receiving space.

The electrical connector in the battery receiving space may comprise a connector housing comprising an outer wall that is tapered to a reduced-size footprint as it extends away from the bottom surface of the battery receiving space. The electrical socket on the leading face of the removable battery assembly may comprise a socket housing comprising an inner wall that is tapered to an increased-size footprint as it extends away from the leading face of the removable battery assembly, the inner wall that may be tapered to complement and contact the taper of the outer wall of the connector housing with the leading face of the removable battery assembly resting on the bottom surface of the battery receiving space, and with the standoff gap between opposing surfaces of the electrical socket and the electrical connector.

The battery receiving space may comprise opposing pairs of battery guide pins, each opposing pair may be arranged on opposite sides of the battery receiving space, and each opposing pair may comprise a latching pin and a guiding pin. The battery body may comprise lateral battery faces, each may comprise a longitudinal guide structure that may be oriented along the battery insertion and removal axis and is sized to accommodate the opposing pairs of guide pins as the removable battery assembly is inserted into and removed from the battery receiving space. The latching pin of each opposing pair of battery guide pins may comprise a recess forming the battery latch that may be positioned to receive a leading portion of one of the spring-loaded locking pins in the extended position, with the removable battery assembly seated in the battery receiving space.

The battery receiving space may comprise a latching pin and a guiding pin arranged on one side of the battery receiving space. The battery body may comprise a lateral battery face comprising a longitudinal guide structure that may be oriented along the battery insertion and removal axis and may be sized to accommodate the latching pin and the guiding pin as the removable battery assembly is inserted into and removed from the battery receiving space. The latching pin may comprise a recess forming the battery latch.

The battery receiving space may comprise latching pins arranged on opposite sides of the battery receiving space. The battery body may comprise lateral battery faces, each comprising a longitudinal guide structure that may be oriented along the battery insertion and removal axis and may be sized to accommodate one of the latching pins as the removable battery assembly is inserted into and removed from the battery receiving space. Each latching pin may comprise a recess forming the battery latch.

A further aspect relates to a removable battery assembly. The removable battery assembly may comprise a battery body and a battery locking mechanism.

The battery body may define a longitudinal battery insertion and removal axis along which the removable battery assembly can be inserted into and removed from a battery receiving space of a materials handling vehicle.

The battery locking mechanism may comprise a spring-loaded battery handle and a spring-loaded locking pin. The spring-loaded locking pin may comprise a leading portion that may be configured to engage a battery latch positioned in a battery receiving space of a materials handling vehicle. The spring-loaded battery handle may comprise a planar handle cam surface and the spring-loaded locking pin may comprise a planar pin cam surface that may be parallel to the handle cam surface. The spring-loaded battery handle and the spring-loaded locking pin may be configured such that the handle cam surface engages the pin cam surface with movement of the battery handle, relative to the battery body, along the battery insertion and removal axis. The battery body may constrain the spring-loaded battery handle and the handle cam surface to linear movement along the battery insertion and removal axis. The battery body may constrain the spring-loaded locking pin and the pin cam surface to linear movement along a latch engagement and disengagement axis that may be perpendicular to the battery insertion and removal axis. The spring-loaded battery handle may be spring-biased in a locked position and is movable relative to the battery body from the locked position to an unlocked position in a handle lifting direction along the battery insertion and removal axis. The spring-loaded locking pin may be spring-biased in an extended position and may be movable relative to the battery body from the extended position to a retracted position along the latch engagement and disengagement axis in response to movement of the battery handle, relative to the battery body, in the handle lifting direction with the handle cam surface engaged with the pin cam surface.

The battery locking mechanism may comprise a pair of spring-loaded locking pins. The battery receiving space may comprise a corresponding pair of battery latches positioned on opposite sides of the battery receiving space, to receive a leading portion of a corresponding one of the pair of spring-loaded locking pins with the removable battery assembly seated in the battery receiving space.

The spring-loaded battery handle may comprise a grip portion and a pair of spaced apart arm portions extending in the handle lifting direction, along the battery insertion and removal axis, from inside the battery body to opposite ends of the grip portion, outside of the battery body (210). Each arm portion may comprise a planar handle cam surface and each spring-loaded locking pin may comprise a corresponding planar pin cam surface that may be parallel to the handle cam surface.

The planar handle cam surface and corresponding planar pin cam surface of one of the arm portions may be configured as a mirror image of the planar handle cam surface and corresponding planar pin cam surface of the other of the arm portions. The pair of spring-loaded locking pins may comprise locking pin extensions that may extend along the latch engagement and disengagement axis in opposite directions.

The planar handle cam surface and the planar pin cam surface may define equal alternate exterior angles, relative to a cam surface traversal extending in the handle lifting direction, along the battery insertion and removal axis.

The spring-loaded battery handle may comprise a locking pin passage formed in the planar handle cam surface. The spring-loaded locking pin may comprise a locking pin extension extending from the planar pin cam surface through the locking pin passage formed in the planar handle cam surface.

The removable battery assembly may further comprise a handle spring in direct contact with the spring-loaded battery handle to bias the battery handle toward the locked position, a locking pin spring in direct contact with the spring-loaded locking pin to bias the spring-loaded locking pin toward the extended position, or both.

The removable battery assembly may further comprise a handle spring in direct contact with the spring-loaded battery handle to bias the battery handle toward the locked position. The battery body may comprise a handle-facing, spring-receiving cavity for the handle spring. The spring-loaded battery handle may comprise a spring-engaging finger extending from the battery handle in the handle lifting direction, along the battery insertion and removal axis, into the handle-facing spring-receiving cavity, along a longitudinal axis of the spring-receiving cavity.

The removable battery assembly may further comprise a locking pin spring in direct contact with the spring-loaded locking pin to bias the spring-loaded locking pin toward the extended position. The battery body may comprise a pin-facing, spring-receiving cavity. The spring-loaded locking pin may comprise a spring-engaging finger extending from the spring-loaded locking pin perpendicular to the battery insertion and removal axis, into the pin-facing, spring-receiving cavity, along a longitudinal axis of the spring-receiving cavity.

The battery body of the removable battery assembly may comprise a plurality of rechargeable battery cells, a front case, and a rear case. The front and rear cases may cooperate to contain a plurality of rechargeable battery cells therein. The front and rear cases may cooperate to contain portions of the spring-loaded battery handle comprising the handle cam surface and portions of the spring-loaded locking pin comprising the pin cam surface.

Either the front case or the rear case of the battery body may exclusively constrain the spring-loaded battery handle and the handle cam surface to linear movement along the battery insertion and removal axis.

The battery body may contain portions of the spring-loaded battery handle comprising the handle cam surface and portions of the spring-loaded locking pin comprising the pin cam surface. The battery body may comprise one or more handle passages and one or more locking pin passages. An arm portion of the spring-loaded battery handle may pass through the handle passage to a grip portion of the battery handle outside of the battery body. A locking pin extension of the spring-loaded locking pin passes through the locking pin passage to an exterior of the battery body.

The spring-loaded battery handle and the spring-loaded locking pin may engage at the handle cam surface and the pin cam surface such that movement of the battery handle from the locked position to the unlocked position through the handle passage in the handle lifting direction causes movement of the locking pin extension of the spring-loaded locking pin through the locking pin passage from the extended position to the retracted position along the latch engagement and disengagement axis.

The grip portion of the battery handle may be flush with a top surface of the battery body in the locked position and may extend above the top surface of the battery body in the unlocked position.

The battery body may comprise a handle grip recess formed below the grip portion of the spring-loaded battery handle. The handle grip recess may extend at least approximately 6.5 mm along the battery insertion and removal axis.

The spring-loaded battery handle may comprise handle-side limiting surfaces independent of the planar handle cam surface of the battery handle. The handle-side limiting surfaces may be inclined relative to the handle lifting direction. The battery body may comprise body-side limiting surfaces that may be positioned parallel to corresponding handle-side limiting surfaces of the spring-loaded battery handle, to engage the corresponding handle-side limiting surfaces of the battery handle in the locked position.

The battery body may comprise a body-side limiting surface that may be inclined relative to the handle lifting direction and dedicated for engagement of the handle cam surface in the unlocked position.

The removable battery assembly may comprise a leading face and an electrical socket on the leading face of the removable battery assembly. The battery receiving space may comprise an electrical connector that may complement the electrical socket of the removable battery assembly. The spring-loaded locking pin may be positioned at a point along a longitudinal dimension of the battery body that may result in locking pin engagement with the battery latch simultaneously with engagement of the electrical socket on the leading face of the removable battery assembly with the electrical connector in the battery receiving space, as the removable battery assembly may be inserted into the battery receiving space, with the spring-loaded battery handle in the locked position.

The electrical socket may be recessed on the leading face of the removable battery assembly.

The leading face of the removable battery assembly may rest on a bottom surface of the battery receiving space with the spring-loaded locking pin engaged with the battery latch, and the electrical socket engaged with the electrical connector.

The removable battery assembly may comprise a leading face and an electrical socket on the leading face of the removable battery assembly. The battery receiving space may comprise an electrical connector that may complement the electrical socket of the removable battery assembly. The electrical socket, the electrical connector, the battery body, and the battery receiving space may be configured to define a standoff gap extending along the battery insertion and removal axis between opposing surfaces of the electrical socket and the electrical connector, with the leading face of the removable battery assembly resting on a bottom surface of the battery receiving space.

The electrical connector in the battery receiving space may comprise a connector housing comprising an outer wall that is tapered to a reduced-size footprint as it extends away from the bottom surface of the battery receiving space. The electrical socket on the leading face of the removable battery assembly may comprise a socket housing comprising an inner wall that is tapered to an increased-size footprint as it extends away from the leading face of the removable battery assembly, the inner wall that may be tapered to complement and contact the taper of the outer wall of the connector housing with the leading face of the removable battery assembly resting on the bottom surface of the battery receiving space, and with the standoff gap between opposing surfaces of the electrical socket and the electrical connector.

The battery receiving space may comprise opposing pairs of battery guide pins, each opposing pair may be arranged on opposite sides of the battery receiving space, and each opposing pair may comprise a latching pin and a guiding pin. The battery body may comprise lateral battery faces, each may comprise a longitudinal guide structure that may be oriented along the battery insertion and removal axis and is sized to accommodate the opposing pairs of guide pins as the removable battery assembly is inserted into and removed from the battery receiving space. The latching pin of each opposing pair of battery guide pins may comprise a recess forming the battery latch that may be positioned to receive a leading portion of one of the spring-loaded locking pins in the extended position, with the removable battery assembly seated in the battery receiving space.

The battery receiving space may comprise a latching pin and a guiding pin arranged on one side of the battery receiving space. The battery body may comprise a lateral battery face comprising a longitudinal guide structure that may be oriented along the battery insertion and removal axis and may be sized to accommodate the latching pin and the guiding pin as the removable battery assembly is inserted into and removed from the battery receiving space. The latching pin may comprise a recess forming the battery latch.

The battery receiving space may comprise latching pins arranged on opposite sides of the battery receiving space. The battery body may comprise lateral battery faces, each comprising a longitudinal guide structure that may be oriented along the battery insertion and removal axis and may be sized to accommodate one of the latching pins as the removable battery assembly is inserted into and removed from the battery receiving space. Each latching pin may comprise a recess forming the battery latch.

In a further aspect, a materials handling vehicle includes a battery receiving space, and a removable battery assembly, wherein: the removable battery assembly includes a battery body and a battery locking mechanism; the battery locking mechanism includes a spring-loaded battery handle and a spring-loaded locking pin; the battery receiving space includes a battery latch positioned to receive a leading portion of the spring-loaded locking pin with the removable battery assembly seated in the battery receiving space; the spring-loaded battery handle includes a planar handle cam surface and the spring-loaded locking pin includes a planar pin cam surface; the spring-loaded battery handle and the spring-loaded locking pin are configured such that the handle cam surface engages the pin cam surface with movement of the battery handle, relative to the battery body; the spring-loaded battery handle is spring-biased in a locked position; and the spring-loaded locking pin is spring-biased in an extended position and is movable to a retracted position in response to movement of the battery handle from the locked position to an unlocked position, with the handle cam surface engaging the pin cam surface.

A further aspect relates to a materials handling vehicle. The materials handling vehicle may comprise a materials handling mechanism and a drive mechanism. The materials handling vehicle may comprise a battery receiving space and a removable battery assembly.

The materials handling vehicle may be configured to move along an inventory transit surface and engage goods in a warehouse environment. The materials handling mechanism may be configured to engage goods in a warehouse environment and may cooperate with the drive mechanism, under power from the removable battery assembly, to move goods along an inventory transit surface in the warehouse environment.

The removable battery assembly and the battery receiving space may cooperate to define a battery insertion and removal axis. The removable battery assembly may be inserted into and removed from the battery receiving space along the battery insertion and removal axis. The battery receiving space may comprise opposing pairs of battery guide pins, each opposing pair may be arranged on opposite sides of the battery receiving space, and each opposing pair may comprise a latching pin and a guiding pin. The battery receiving space may comprise a battery guide pin that may be arranged on each opposite side of the battery receiving space. Each opposing pair of battery guide pins may comprise the battery guide pin. The battery guide pin may be the guiding pin or vice versa. The battery guide pin may be the latching pin or vice versa.

The removable battery assembly may comprise a battery body. The removable battery assembly may comprise a battery locking mechanism. The battery body may comprise lateral battery faces, each comprising a longitudinal guide structure. The longitudinal guide structure may be sized to accommodate a pair of guide pins as the removable battery assembly is inserted into and removed from a battery receiving space comprising opposing pairs of guide pins. The longitudinal guide structure may be oriented along the battery insertion and removal axis. The longitudinal guide structure may be sized to accommodate the battery guide pins or the battery guide pin that may be arranged on each opposite side of the battery receiving space as the removable battery assembly is inserted into and removed from the battery receiving space.

The battery locking mechanism may comprise spring-loaded locking pins that may be spring-biased in extended positions and may be movable relative to the battery body from the extended positions to respective retracted positions along a latch engagement and disengagement axis. The latching pin of each opposing pair of battery guide pins may comprise a recess forming a battery latch that may be positioned to receive a leading portion of one of the spring-loaded locking pins in the extended position, with the removable battery assembly seated in the battery receiving space.

The latching pin of each opposing pair of battery guide pins may comprise a chamfered engagement face. The spring-loaded locking pins of the battery locking mechanism each may comprise a complementary chamfered engagement face that may be oriented to face the chamfered engagement face of one of the latching pins as the removable battery assembly is inserted into the battery receiving space.

The chamfered engagement face of each latching pin may lead to the recess forming the battery latch of each latching pin.

The latching pin and the guiding pin of each opposing pair of battery guide pins may be positioned along a common guide pin axis, parallel to the battery insertion and removal axis.

The latching pin and the guiding pin of each opposing pair of battery guide pins are separated by a guide pin spacing that may be less than half of a longitudinal dimension of the lateral battery faces, and may be at least about 47.5 mm.

The longitudinal guide structure of the lateral battery faces may be configured as guide channels. The battery guide pins or the battery guide pin that may be arranged on each opposite side of the battery receiving space may extend into the guide channels with the removable battery assembly seated in the battery receiving space.

The longitudinal guide structure of one of the lateral battery faces may be shorter than the longitudinal guide structure of the other lateral battery face, to create free space along one of the lateral battery faces.

The removable battery assembly may further comprise a pair of guide pin stabilizers on each of the lateral battery faces. Each pair of guide pin stabilizers may form a restricted-width guide pin gap along the longitudinal guide structure on each of the lateral battery faces. The restricted-width guide pin gap may be formed for receiving a corresponding one of the battery guide pins. The corresponding one of the battery guide pins may be the battery guide pin that may be arranged on each opposite side of the battery receiving space. The battery guide pins may comprise each battery guide pin that may be arranged on each opposite side of the battery receiving space.

A fastener may extend through each pair of guide pin stabilizers. The fastener may threadedly engage the lateral battery face of the battery body.

Each pair of guide pin stabilizers may be formed from a deformable and/or resilient material. Each pair of guide pin stabilizers may be formed as a unitary structure, in particular as a unitary, one piece polyurethane structure. Each pair of guide pin stabilizers may be configured to deform in a lateral direction perpendicular to the battery insertion and removal axis when a battery guide pin enters the restricted-width guide pin gap.

Each pair of guide pin stabilizers may comprise an alignment feature that may be received within a corresponding slot formed in one of the lateral battery faces, to prevent rotation of each pair of guide pin stabilizers relative to the lateral battery faces.

The guiding pin of each opposing pair of battery guide pins or the guide pin stabilizers may reside at a guiding pin parking position along the longitudinal guide structure on each of the lateral battery faces, with the removable battery assembly seated in the battery receiving space. The restricted-width guide pin gap formed by each pair of guide pin stabilizers may at least partially overlap the guiding pin parking position along the longitudinal guide structure on each of the lateral battery faces. The battery guide pins may have respective diameters that are greater than a width of the restricted-width guide pin gap.

The guide pin stabilizers may be configured to yield in a lateral yielding direction and to maintain a degree of lateral resilience, when a guiding pin enters the restricted-width guide pin gap. The guide pin stabilizers may be configured to yield in a lateral yielding direction perpendicular to the battery insertion and removal axis, and to maintain a degree of lateral resilience, when a guiding pin enters the restricted-width guide pin gap. The guide pin stabilizers may be configured to at least partially yield in a lateral yielding direction perpendicular to the battery insertion and removal axis, and to maintain a degree of lateral resilience, when a guide pin enters the restricted-width guide pin gap.

The longitudinal guide structure of the lateral battery faces may be configured as guide channels. Each guide pin stabilizer may comprise a stabilizer shank that may be anchored in the battery body and a stabilizer cap that may extend partially into or partially over one of the guide channels to reduce an effective width of the guide channel. Each pair of guide pin stabilizers may extend partially into or partially over one of the guide channels to reduce an effective width of the guide channel.

Each pair of guide pin stabilizers may comprise a truncated portion. Each pair of guide pin stabilizers may have a Shore A hardness between 50 Shore A and 90 Shore A. Each pair of guide pin stabilizers may have a Shore A hardness between 60 Shore A and 80 Shore A.

The battery locking mechanism may comprise a spring-loaded battery handle. The spring-loaded battery handle may comprise a planar handle cam surface and the spring-loaded locking pin may comprise a planar pin cam surface that may be parallel to the handle cam surface. The spring-loaded battery handle and the spring-loaded locking pin may be configured such that the handle cam surface engages the pin cam surface with movement of the battery handle, relative to the battery body, along the battery insertion and removal axis.

The battery body may constrain the spring-loaded battery handle and the handle cam surface to linear movement along the battery insertion and removal axis. The battery body may constrain the spring-loaded locking pin and the pin cam surface to linear movement along a latch engagement and disengagement axis that may be perpendicular to the battery insertion and removal axis. The spring-loaded battery handle may be spring-biased in a locked position and may be movable relative to the battery body from the locked position to an unlocked position in a handle lifting direction along the battery insertion and removal axis. The spring-loaded locking pin may be spring-biased in the extended position and is movable relative to the battery body from the extended position to a retracted position along the latch engagement and disengagement axis in response to movement of the battery handle, relative to the battery body, in the handle lifting direction with the handle cam surface engaged with the pin cam surface.

The removable battery assembly may comprise a leading face and an electrical socket on the leading face of the removable battery assembly. The battery receiving space may comprise an electrical connector that complements the electrical socket of the removable battery assembly. The spring-loaded locking pins may be positioned at points along a longitudinal dimension of the battery body that results in locking pin engagement with the latching pins simultaneously with engagement of the electrical socket on the leading face of the removable battery assembly with the electrical connector in the battery receiving space, as the removable battery assembly is inserted into the battery receiving space, with the spring-loaded battery handle in the locked position.

The leading face of the removable battery assembly may rest on a bottom surface of the battery receiving space with the spring-loaded locking pins engaged with the latching pins, and the electrical socket engaged with the electrical connector.

A further aspect relates to a removable battery assembly. The removable battery assembly may comprise a battery body. The removable battery assembly may comprise a battery locking mechanism. The removable battery assembly may be configured according to the previous aspect.

The battery body may comprise lateral battery faces, each comprising a longitudinal guide structure that may be sized to accommodate a pair of guide pins as the removable battery assembly is inserted into and removed from a battery receiving space comprising opposing pairs of guide pins.

The removable battery assembly may further comprise a pair of guide pin stabilizers on each of the lateral battery faces. The pair of guide pin stabilizers may be configured according to the previous aspect. Each pair of guide pin stabilizers may form a restricted-width guide pin gap along the longitudinal guide structure on each of the lateral battery faces and may be configured to yield in a lateral yielding direction and to maintain a degree of lateral resilience, when a guiding pin enters the restricted-width guide pin gap.

The removable battery assembly and the battery receiving space may cooperate to define a battery insertion and removal axis. The removable battery assembly may be inserted into and removed from the battery receiving space along the battery insertion and removal axis.

The longitudinal guide structure may be oriented along the battery insertion and removal axis. The longitudinal guide structure may be sized to accommodate the opposing pairs of guide pins as the removable battery assembly is inserted into and removed from the battery receiving space.

The battery locking mechanism may comprise spring-loaded locking pins that may be spring-biased in extended positions and may be movable relative to the battery body from the extended positions to respective retracted positions along a latch engagement and disengagement axis. A latching pin of each opposing pair of guide pins may comprise a recess forming a battery latch that may be positioned to receive a leading portion of one of the spring-loaded locking pins in the extended position, with the removable battery assembly seated in the battery receiving space.

The latching pin of each opposing pair of guide pins may comprise a chamfered engagement face. The spring-loaded locking pins of the battery locking mechanism each may comprise a complementary chamfered engagement face that may be oriented to face the chamfered engagement face of one of the latching pins as the removable battery assembly is inserted into the battery receiving space.

The chamfered engagement face of each latching pin may lead to the recess forming the battery latch of each latching pin.

The latching pin and the guiding pin of each opposing pair of guide pins may be positioned along a common guide pin axis, parallel to the battery insertion and removal axis.

The latching pin and the guiding pin of each opposing pair of guide pins are separated by a guide pin spacing that may be less than half of a longitudinal dimension of the lateral battery faces, and may be at least about 47.5 mm.

The longitudinal guide structure of the lateral battery faces may be configured as guide channels. The opposing pairs of guide pins may extend into the guide channels with the removable battery assembly seated in the battery receiving space.

The longitudinal guide structure of one of the lateral battery faces may be shorter than the longitudinal guide structure of the other lateral battery face, to create free space along one of the lateral battery faces.

The removable battery assembly may further comprise a pair of guide pin stabilizers on each of the lateral battery faces. Each pair of guide pin stabilizers may form a restricted-width guide pin gap along the longitudinal guide structure on each of the lateral battery faces.

The guiding pin of each opposing pair of guide pins may reside at a guiding pin parking position along the longitudinal guide structure on each of the lateral battery faces, with the removable battery assembly seated in the battery receiving space. The restricted-width guide pin gap formed by each pair of guide pin stabilizers may at least partially overlap the guiding pin parking position along the longitudinal guide structure on each of the lateral battery faces.

The guide pin stabilizers may be configured to yield in a lateral yielding direction and to maintain a degree of lateral resilience, when a guiding pin enters the restricted-width guide pin gap. The guide pin stabilizers may be configured to yield in a lateral yielding direction perpendicular to the battery insertion and removal axis, and to maintain a degree of lateral resilience, when a guiding pin enters the restricted-width guide pin gap.

The longitudinal guide structure of the lateral battery faces may be configured as guide channels. The opposing pairs of guide pins may extend into the guide channels with the removable battery assembly seated in the battery receiving space.

The longitudinal guide structure of one of the lateral battery faces may be shorter than the longitudinal guide structure of the other lateral battery face, to create free space along one of the lateral battery faces.

The removable battery assembly may further comprise a pair of guide pin stabilizers on each of the lateral battery faces. Each pair of guide pin stabilizers may form a restricted-width guide pin gap along the longitudinal guide structure on each of the lateral battery faces.

The guiding pin of each opposing pair of guide pins may reside at a guiding pin parking position along the longitudinal guide structure on each of the lateral battery faces, with the removable battery assembly seated in the battery receiving space. The restricted-width guide pin gap formed by each pair of guide pin stabilizers may at least partially overlap the guiding pin parking position along the longitudinal guide structure on each of the lateral battery faces.

The guide pin stabilizers may be configured to yield in a lateral yielding direction and to maintain a degree of lateral resilience, when a guiding pin enters the restricted-width guide pin gap. The guide pin stabilizers may be configured to yield in a lateral yielding direction perpendicular to the battery insertion and removal axis, and to maintain a degree of lateral resilience, when a guiding pin enters the restricted-width guide pin gap.

The longitudinal guide structure of the lateral battery faces may be configured as guide channels. Each guide pin stabilizer may comprise a stabilizer shank that may be anchored in the battery body and a stabilizer cap that may extend partially into or partially over one of the guide channels to reduce an effective width of the guide channel.

The battery locking mechanism may comprise a spring-loaded battery handle. The spring-loaded battery handle may comprise a planar handle cam surface and the spring-loaded locking pin may comprise a planar pin cam surface that may be parallel to the handle cam surface. The spring-loaded battery handle and the spring-loaded locking pin may be configured such that the handle cam surface engages the pin cam surface with movement of the battery handle, relative to the battery body, along the battery insertion and removal axis.

The battery body may constrain the spring-loaded battery handle and the handle cam surface to linear movement along the battery insertion and removal axis. The battery body may constrain the spring-loaded locking pin and the pin cam surface to linear movement along a latch engagement and disengagement axis that may be perpendicular to the battery insertion and removal axis. The spring-loaded battery handle may be spring-biased in a locked position and may be movable relative to the battery body from the locked position to an unlocked position in a handle lifting direction along the battery insertion and removal axis. The spring-loaded locking pin may be spring-biased in the extended position and is movable relative to the battery body from the extended position to a retracted position along the latch engagement and disengagement axis in response to movement of the battery handle, relative to the battery body, in the handle lifting direction with the handle cam surface engaged with the pin cam surface.

The removable battery assembly may comprise a leading face and an electrical socket on the leading face of the removable battery assembly. The battery receiving space may comprise an electrical connector that complements the electrical socket of the removable battery assembly. The spring-loaded locking pins may be positioned at points along a longitudinal dimension of the battery body that results in locking pin engagement with the latching pins simultaneously with engagement of the electrical socket on the leading face of the removable battery assembly with the electrical connector in the battery receiving space, as the removable battery assembly is inserted into the battery receiving space, with the spring-loaded battery handle in the locked position.

The leading face of the removable battery assembly may rest on a bottom surface of the battery receiving space with the spring-loaded locking pins engaged with the latching pins, and the electrical socket engaged with the electrical connector.

In a further aspect, a materials handling vehicle includes a battery receiving space, and a removable battery assembly, wherein: the battery receiving space includes opposing pairs of battery guide pins, each opposing pair arranged on opposite sides of the battery receiving space, and each opposing pair includes a latching pin and a guiding pin; the removable battery assembly includes a battery locking mechanism; the battery locking mechanism includes spring-loaded locking pins that are spring-biased in extended positions and are movable from the extended positions to respective retracted positions; the latching pin of each opposing pair of battery guide pins includes a recess forming a battery latch that is positioned to receive a leading portion of one of the spring-loaded locking pins in the extended position.

A further aspect relates to a materials handling vehicle. The materials handling vehicle may comprise a materials handling mechanism and a drive mechanism. The materials handling vehicle may comprise a battery receiving space and a removable battery assembly.

The materials handling vehicle may be configured to move along an inventory transit surface and engage goods in a warehouse environment. The materials handling mechanism may be configured to engage goods in a warehouse environment and may cooperate with the drive mechanism, under power from the removable battery assembly, to move goods along an inventory transit surface in the warehouse environment.

The removable battery assembly and the battery receiving space may cooperate to define a battery insertion and removal axis. The removable battery assembly may be inserted into and removed from the battery receiving space along the battery insertion and removal axis. The removable battery assembly may comprise lateral battery faces, each comprising a longitudinal guide structure that may be oriented along the battery insertion and removal axis. The removable battery assembly may comprise a battery body and a battery locking mechanism. The battery body may define a longitudinal battery insertion and removal axis along which the removable battery assembly can be inserted into and removed from a battery receiving space of a materials handling vehicle. The battery body may comprise lateral battery faces. Each lateral battery face may comprise a longitudinal guide structure that may be oriented along the battery insertion and removal axis.

The battery receiving space may comprise opposing guide blocks, each arranged on opposite sides of the battery receiving space, and each comprising a securement portion and a replaceable portion. The replaceable portion of each guide block may comprise a friction-inducing surface and a guiding surface. Each friction-inducing surface may extend along the battery insertion and removal axis, parallel to and facing an opposing one of the lateral battery faces, with the removable battery assembly seated in the battery receiving space. Each guiding surface may extend along the battery insertion and removal axis, perpendicular to the lateral battery faces and/or facing an opposing surface of the longitudinal guide structure, with the removable battery assembly seated in the battery receiving space.

The friction-inducing and guiding surfaces of each replaceable portion of each guide block may face an opposing surface of the removable battery assembly or the longitudinal guide structure without interference from the securement portions of each guide block, with the removable battery assembly seated in the battery receiving space.

The friction-inducing surface of each replaceable portion of each guide block may extend discontinuously in a direction along the battery insertion and removal axis and may face the opposing lateral battery face in a perpendicular direction, with the removable battery assembly seated in the battery receiving space. The guiding surface of each replaceable portion of each guide block may extend continuously in the direction and may face the opposing surface of the longitudinal guide structure in a perpendicular direction, with the removable battery assembly seated in the battery receiving space.

The longitudinal guide structure of the lateral battery face may be configured as a stepped guide channel comprising a one-sided channel portion that may transition to a two-sided channel portion at a channel shoulder. The replaceable portion of each guide block may comprise a chamfered leading portion, the chamfered leading portion may face the channel shoulder in the longitudinal guide structure. The one and two-sided channel portions of the longitudinal guide structure may extend along the battery insertion and removal axis.

The replaceable portion of each guide block may comprise a lower surface hardness and higher surface friction, relative to the securement portion.

The friction-inducing surfaces of each replaceable portion of each guide block may be raised, relative to the securement portions and remaining portions of the replaceable portions of each guide block, in the direction of the opposing the lateral battery faces.

The friction-inducing surfaces of each replaceable portion of each guide block may comprise a series of friction-inducing ridges oriented across the battery insertion and removal axis.

The securement portion of each guide block may be secured to the materials handling vehicle. The replaceable portion of each guide block may be seated within the securement portion, and may be removable from the securement portion without destruction of the securement portion.

The securement portion of each guide block may be configured as a bracket from which the replaceable portion of each guide block may extend to define the friction-inducing and guiding surfaces.

The longitudinal guide structure of the lateral battery face may be configured as a stepped guide channel comprising a one-sided channel portion that may transition to a two-sided channel portion at a channel shoulder. The replaceable portion of each guide block may comprise a chamfered leading portion, the chamfered leading portion facing the channel shoulder in the longitudinal guide structure.

Each longitudinal guide structure of the lateral battery faces may comprise a one-sided channel portion that may comprise the opposing surface facing the guiding surface of the guide block, with the removable battery assembly seated in the battery receiving space.

The one-sided and two-sided channel portions of the longitudinal guide structure may extend in a direction along the battery insertion and removal axis. Each friction-inducing surface may face an opposing one of the lateral battery faces in a perpendicular direction, with the removable battery assembly seated in the battery receiving space. Each guiding surface may face an opposing surface of the longitudinal guide structure in a perpendicular direction, with the removable battery assembly seated in the battery receiving space. The replaceable portion of each guide block may comprise a chamfered leading portion that may face a channel shoulder of the longitudinal guide structure, in the direction.

The removable battery assembly or the locking mechanism may further comprise a pair of spring-loaded locking pins, each disposed in one of the two-sided channel portions of the longitudinal guide structure.

The battery receiving space may comprise a pair of battery latches positioned on opposite sides of the battery receiving space, to receive a leading portion of a corresponding one of the pair of spring-loaded locking pins with the removable battery assembly seated in the battery receiving space.

Each opposing guide block may be positioned along the battery insertion and removal axis to engage the channel shoulder of one of the longitudinal guide structures with the removable battery assembly seated in the battery receiving space and the leading portions of the pair of spring-loaded locking pins received within the pair of battery latches.

A further aspect relates to a removable battery assembly. The removable battery assembly may comprise a battery body. The removable battery assembly may comprise a battery locking mechanism.

The battery body may define a longitudinal battery insertion and removal axis along which the removable battery assembly can be inserted into and removed from a battery receiving space of a materials handling vehicle. The battery body may comprise lateral battery faces. Each lateral battery face may comprise a longitudinal guide structure that may be oriented along the battery insertion and removal axis. The longitudinal guide structures of the lateral battery faces may be configured as a stepped guide channel comprising a one-sided channel portion that may transition to a two-sided channel portion at a channel shoulder. The one and two-sided channel portions of the longitudinal guide structure may extend along the battery insertion and removal axis. The locking mechanism may comprise a pair of spring-loaded locking pins, each disposed in one of the two-sided channel portions of the longitudinal guide structure.

The battery receiving space may comprise opposing guide blocks, each arranged on opposite sides of the battery receiving space, and each comprising a securement portion and a replaceable portion. The replaceable portion of each guide block may comprise a friction-inducing surface and a guiding surface. Each friction-inducing surface may extend along the battery insertion and removal axis, parallel to and facing an opposing one of the lateral battery faces, with the removable battery assembly seated in the battery receiving space. Each guiding surface may extend along the battery insertion and removal axis, perpendicular to the lateral battery faces and/or facing an opposing surface of the longitudinal guide structure, with the removable battery assembly seated in the battery receiving space.

The friction-inducing and guiding surfaces of each replaceable portion of each guide block may face an opposing surface of the removable battery assembly or the longitudinal guide structure without interference from the securement portions of each guide block, with the removable battery assembly seated in the battery receiving space.

The friction-inducing surface of each replaceable portion of each guide block may extend discontinuously in a direction along the battery insertion and removal axis and may face the opposing lateral battery face in a perpendicular direction, with the removable battery assembly seated in the battery receiving space. The guiding surface of each replaceable portion of each guide block may extend continuously in the direction and may face the opposing surface of the longitudinal guide structure in a perpendicular direction, with the removable battery assembly seated in the battery receiving space.

The replaceable portion of each guide block may comprise a chamfered leading portion, the chamfered leading portion may face the channel shoulder in the longitudinal guide structure. The one and two-sided channel portions of the longitudinal guide structure may extend along the battery insertion and removal axis.

The replaceable portion of each guide block may comprise a lower surface hardness and higher surface friction, relative to the securement portion.

The friction-inducing surfaces of each replaceable portion of each guide block may be raised, relative to the securement portions and remaining portions of the replaceable portions of each guide block, in the direction of the opposing the lateral battery faces.

The friction-inducing surfaces of each replaceable portion of each guide block may comprise a series of friction-inducing ridges oriented across the battery insertion and removal axis.

The securement portion of each guide block may be secured to the materials handling vehicle. The replaceable portion of each guide block may be seated within the securement portion, and may be removable from the securement portion without destruction of the securement portion.

The securement portion of each guide block may be configured as a bracket from which the replaceable portion of each guide block may extend to define the friction-inducing and guiding surfaces.

Each longitudinal guide structure of the lateral battery faces may comprise a one-sided channel portion that may comprise the opposing surface facing the guiding surface of the guide block, with the removable battery assembly seated in the battery receiving space.

The longitudinal guide structure of the lateral battery face may be configured as a stepped guide channel comprising a one-sided channel portion that may transition to a two-sided channel portion at a channel shoulder. The one-sided channel portion of the longitudinal guide structure may comprise the opposing surface facing the guiding surface of the guide block, with the removable battery assembly seated in the battery receiving space.

The one-sided and two-sided channel portions of the longitudinal guide structure may extend in a direction along the battery insertion and removal axis. Each friction-inducing surface may face an opposing one of the lateral battery faces in a perpendicular direction, with the removable battery assembly seated in the battery receiving space. Each guiding surface may face an opposing surface of the longitudinal guide structure in a perpendicular direction, with the removable battery assembly seated in the battery receiving space. The replaceable portion of each guide block may comprise a chamfered leading portion that may face a channel shoulder of the longitudinal guide structure, in the direction.

The removable battery assembly or the locking mechanism may further comprise a pair of spring-loaded locking pins, each disposed in one of the two-sided channel portions of the longitudinal guide structure.

The battery receiving space may comprise a pair of battery latches positioned on opposite sides of the battery receiving space, to receive a leading portion of a corresponding one of the pair of spring-loaded locking pins with the removable battery assembly seated in the battery receiving space.

Each opposing guide block may be positioned along the battery insertion and removal axis to engage the channel shoulder of one of the longitudinal guide structures with the removable battery assembly seated in the battery receiving space and the leading portions of the pair of spring-loaded locking pins received within the pair of battery latches.

In a further aspect, a materials handling vehicle includes a battery receiving space, and a removable battery assembly, wherein: the removable battery assembly includes lateral battery faces, each including a longitudinal guide structure; the battery receiving space includes opposing guide blocks, each arranged on opposite sides of the battery receiving space, and each including a securement portion and a replaceable portion; the replaceable portion of each guide block including a friction-inducing surface and a guiding surface; each friction-inducing surface facing an opposing one of the lateral battery faces; and each guiding surface facing an opposing surface of the longitudinal guide structure, with the removable battery assembly seated in the battery receiving space.

A further aspect relates to a materials handling vehicle. The materials handling vehicle may comprise a materials handling mechanism and a drive mechanism. The materials handling vehicle may comprise a battery receiving space and a removable battery assembly.

The materials handling vehicle may be configured to move along an inventory transit surface and engage goods in a warehouse environment. The materials handling mechanism may be configured to engage goods in a warehouse environment and cooperates with the drive mechanism, under power from the removable battery assembly, to move goods along an inventory transit surface in the warehouse environment.

The removable battery assembly may comprise a battery body. The battery body may define a longitudinal battery insertion and removal axis along which the battery assembly can be inserted into and removed from a battery receiving space of a materials handling vehicle. The removable battery assembly and the battery receiving space may cooperate to define a battery insertion and removal axis. The removable battery assembly may be inserted into and removed from the battery receiving space along the battery insertion and removal axis. The removable battery assembly may comprise lateral battery faces, each comprising a longitudinal guide structure that may be oriented along the battery insertion and removal axis.

The battery receiving space may comprise opposing retention blocks, each arranged on opposite sides of the battery receiving space, and each comprising a retention lever comprising a fixed end and a distal end. The longitudinal guide structure of each lateral battery face may comprise a lever-receiving detent that is configured to receive the distal end of one of the retention levers, with the removable battery assembly seated in the battery receiving space.

Each retention lever may be configured to lie in a state of flexion when received in the lever-receiving detent of the longitudinal guide structure.

Each retention block may comprise a planar guiding surface facing an opposing surface of the longitudinal guide structure. The planar guiding surface of the retention block may comprise a retention lever recess. Each retention lever may be configured for increased flexion as it moves progressively towards the retention lever recess.

Each retention block may comprise a planar guiding surface facing an opposing surface of the longitudinal guide structure. The planar guiding surface of the retention block may comprise a retention lever recess. The fixed end of each retention lever may be positioned in the retention lever recess to avoid contact with the opposing surface of the longitudinal guide structure.

The distal end of each retention lever may comprise a terminal lobe. The lever-receiving detent and the terminal lobe may define mating rounded profiles.

Each retention block may comprise a metal backing plate and a plastic retention lever plate.

The removable battery assembly may comprise a leading face and an electrical socket on the leading face of the removable battery assembly. The battery receiving space may comprise an electrical connector that complements the electrical socket of the removable battery assembly. Each retention lever may be positioned such that each of the lever-receiving detents receives a distal end of one of the retention levers simultaneously with engagement of the electrical socket on the leading face of the removable battery assembly with the electrical connector in the battery receiving space, as the removable battery assembly is inserted into the battery receiving space.

Each longitudinal guide structure of the lateral battery faces may comprise a one-sided channel portion that comprises the opposing surface facing the guiding surface of the retention block, with the removable battery assembly seated in the battery receiving space. The one-sided channel portion of the longitudinal guide structure may comprise a lever-receiving detent that is configured to receive the distal end of a retention lever, with the removable battery assembly seated in the battery receiving space.

The one-sided channel portion may terminate in a channel shoulder of the longitudinal guide structure. Each guide block may comprise a chamfered leading portion that faces the channel shoulder of the longitudinal guide structure, with the removable battery assembly seated in the battery receiving space.

A further aspect relates to a removable battery assembly. The removable battery assembly may comprise a battery body.

The battery body may define a longitudinal battery insertion and removal axis along which the battery assembly can be inserted into and removed from a battery receiving space of a materials handling vehicle. The removable battery assembly may comprise lateral battery faces, each comprising a longitudinal guide structure that may be oriented along the battery insertion and removal axis. The longitudinal guide structure of each lateral battery face may comprise a one-sided channel portion that may terminate in a channel shoulder of the longitudinal guide structure. The one-sided channel portion of the longitudinal guide structure may comprise a lever-receiving detent that may be configured to receive the distal end of retention levers, with the removable battery assembly seated in the battery receiving space.

The battery receiving space may comprise opposing retention blocks, each arranged on opposite sides of the battery receiving space, and each comprising a retention lever comprising a fixed end and a distal end. The longitudinal guide structure of each lateral battery face may comprise a lever-receiving detent that is configured to receive the distal end of one of the retention levers, with the removable battery assembly seated in the battery receiving space.

Each retention lever may be configured to lie in a state of flexion when received in the lever-receiving detent of the longitudinal guide structure.

Each retention block may comprise a planar guiding surface facing an opposing surface of the longitudinal guide structure. The planar guiding surface of the retention block may comprise a retention lever recess. Each retention lever may be configured for increased flexion as it moves progressively towards the retention lever recess.

Each retention block may comprise a planar guiding surface facing an opposing surface of the longitudinal guide structure. The planar guiding surface of the retention block may comprise a retention lever recess. The fixed end of each retention lever may be positioned in the retention lever recess to avoid contact with the opposing surface of the longitudinal guide structure.

The distal end of each retention lever may comprise a terminal lobe. The lever-receiving detent and the terminal lobe may define mating rounded profiles.

Each retention block may comprise a metal backing plate and a plastic retention lever plate.

The removable battery assembly may comprise a leading face and an electrical socket on the leading face of the removable battery assembly. The battery receiving space may comprise an electrical connector that complements the electrical socket of the removable battery assembly. Each retention lever may be positioned such that each of the lever-receiving detents receives a distal end of one of the retention levers simultaneously with engagement of the electrical socket on the leading face of the removable battery assembly with the electrical connector in the battery receiving space, as the removable battery assembly is inserted into the battery receiving space.

Each longitudinal guide structure of the lateral battery faces may comprise a one-sided channel portion that comprises the opposing surface facing the guiding surface of the retention block, with the removable battery assembly seated in the battery receiving space. The one-sided channel portion of the longitudinal guide structure may comprise a lever-receiving detent that is configured to receive the distal end of a retention lever, with the removable battery assembly seated in the battery receiving space.

The one-sided channel portion may terminate in a channel shoulder of the longitudinal guide structure. Each guide block may comprise a chamfered leading portion that faces the channel shoulder of the longitudinal guide structure, with the removable battery assembly seated in the battery receiving space.

In a further aspect, a materials handling vehicle includes a battery receiving space, and a removable battery assembly, wherein: the removable battery assembly includes lateral battery faces, each including a longitudinal guide structure; the battery receiving space includes opposing retention blocks, each arranged on opposite sides of the battery receiving space, and each comprising a retention lever including a fixed end and a distal end; and the longitudinal guide structure of each lateral battery face includes a lever-receiving detent that is configured to receive the distal end of one of the retention levers.

A further aspect relates to a materials handling vehicle. The materials handling vehicle may comprise a materials handling mechanism, a drive mechanism, a battery receiving space, and a removable battery assembly.

The materials handling mechanism may be configured to engage goods in a warehouse environment and may cooperate with the drive mechanism, under power from the removable battery assembly, to move goods along an inventory transit surface in the warehouse environment.

The removable battery assembly and the battery receiving space may cooperate to define a battery insertion and removal axis along which the removable battery assembly may be inserted into and removed from the battery receiving space. The removable battery assembly may comprise a battery body, a leading face, an electrical socket on the leading face of the removable battery assembly, and a battery locking mechanism. The battery receiving space may comprise an electrical connector that may complement the electrical socket of the removable battery assembly, and a battery latch that may engage the battery locking mechanism simultaneously with engagement of the electrical socket on the leading face of the removable battery assembly with the electrical connector in the battery receiving space, as the removable battery assembly is inserted into the battery receiving space. The leading face of the removable battery assembly may rest on a bottom surface of the battery receiving space with the battery locking mechanism engaged with the battery latch, and/or with the electrical socket engaged with the electrical connector. The electrical socket, the electrical connector, the battery body, and the battery receiving space may be configured to define a standoff gap extending along the battery insertion and removal axis between opposing surfaces of the electrical socket and the electrical connector, with the leading face of the removable battery assembly resting on the bottom surface of the battery receiving space.

The electrical connector in the battery receiving space may comprise a connector housing comprising an outer wall that may be tapered to a reduced-size footprint as it extends away from the bottom surface of the battery receiving space. The electrical socket on the leading face of the removable battery assembly may comprise a socket housing comprising an inner wall that may be tapered to an increased-size footprint as it extends away from the leading face of the removable battery assembly. The inner wall that may be tapered to complement and contact the taper of the outer wall of the connector housing with the leading face of the removable battery assembly resting on the bottom surface of the battery receiving space, and with the standoff gap between opposing surfaces of the electrical socket and the electrical connector.

The opposing surfaces of the electrical socket and the electrical connector may be horizontally oriented opposing surfaces that may be perpendicular to the battery insertion and removal axis and may be spaced apart by the standoff gap.

The standoff gap, or a gap larger than the standoff gap, may be maintained between substantially all horizontally oriented opposing surfaces of the electrical socket and the electrical connector.

The standoff gap (414) may be at least about 0.2 mm. The standoff gap may be between about 0.2 mm and about 1.7 mm.

The battery-side electrical socket may be recessed in the leading face of the battery assembly with a socket housing. The vehicle-side electrical connector may project upwardly from the bottom surface of the battery receiving space with a connector housing. The battery-side electrical socket may comprise a rim portion that may be enclosed by the socket housing and may extend generally parallel to the leading face of the battery assembly. The vehicle-side electrical connector may comprise a shoulder portion that may be enclosed by the connector housing and may extend generally parallel to the bottom surface of the battery receiving space.

The rim portion of the battery-side electrical socket may extend parallel to the shoulder portion of the vehicle-side electrical connector, with the removable battery assembly seated in the battery receiving space, and is spaced from the shoulder portion by the standoff gap.

The battery-side electrical socket may be recessed in the leading face of the battery assembly with a socket housing. The vehicle-side electrical connector may project upwardly from the bottom surface of the battery receiving space with a connector housing.

The connector housing may comprise an outer wall that may be tapered to a reduced-size footprint as it extends away from the bottom surface of the battery receiving space. The socket housing may comprise an inner wall that may be tapered to an increased-size footprint as it extends away from the leading face of the removable battery assembly.

The battery-side electrical socket may comprise a rim portion that may be enclosed by the socket housing and may extend generally parallel to the leading face of the battery assembly. The vehicle-side electrical connector may comprise a shoulder portion that may be enclosed by the connector housing and may extend generally parallel to the bottom surface of the battery receiving space.

The rim portion of the battery-side electrical socket may extend parallel to the shoulder portion of the vehicle-side electrical connector, with the removable battery assembly seated in the battery receiving space, and may be spaced from the shoulder portion by the standoff gap.

The electrical connector in the battery receiving space may comprise a connector housing comprising an outer wall that may be tapered to a reduced-size footprint as it extends away from the bottom surface of the battery receiving space. The electrical socket on the leading face of the removable battery assembly may comprise a socket housing comprising an inner wall that may be tapered to an increased-size footprint as it extends away from the leading face of the removable battery assembly.

The electrical connector in the battery receiving space may comprise a connector housing comprising an outer wall that may be tapered to a reduced-size footprint as it extends away from the bottom surface of the battery receiving space. The electrical socket on the leading face of the removable battery assembly may comprise a socket housing comprising an inner wall that may be tapered to an increased-size footprint as it extends away from the leading face of the removable battery assembly; and the inner wall of the electrical socket may be tapered to complement and contact the taper of the outer wall of the connector housing with the leading face of the removable battery assembly resting on the bottom surface of the battery receiving space.

The electrical socket may comprise a set of electrically conductive pin receptacles and the electrical connector may comprise a set of complementary electrically conductive connector pins. An outermost portion of the standoff gap may surround the set of electrically conductive pin receptacles and the set of complementary electrically conductive connector pins, with the leading face of the removable battery assembly resting on the bottom surface of the battery receiving space and a set of electrically conductive pin receptacles engaging the set of complementary electrically conductive connector pins.

The socket housing of the electrical socket and the connector housing of the electrical connector may cooperate to enclose the set of electrically conductive pin receptacles and the set of complementary electrically conductive connector pins to form a barrier between the outermost portion of the standoff gap and the engaged sets of pin receptacles and connector pins, with the leading face of the removable battery assembly resting on the bottom surface of the battery receiving space.

The electrical connector in the battery receiving space comprises a connector housing comprising an outer wall that may be tapered to a reduced-size footprint as it extends away from the bottom surface of the battery receiving space. The electrical socket on the leading face of the removable battery assembly may comprise a socket housing comprising an inner wall that may be tapered to an increased-size footprint as it extends away from the leading face of the removable battery assembly. The inner wall of the electrical socket may be tapered to complement and contact the taper of the outer wall of the connector housing with the leading face of the removable battery assembly resting on the bottom surface of the battery receiving space. The inner wall of the electrical socket may contact the outer wall of the connector housing at a tapered contact boundary surrounding the outermost portion of the standoff gap.

The set of electrically conductive pin receptacles and the set of complementary electrically conductive connector pins form an eight pin configuration comprising: positive and negative battery terminals B+/B−; a CANH signal pin for a CAN Bus High Signal; a CANL signal pin for a CAN Bus Low Signal; a SIG1 signal pin for a battery discharge start signal; a SIG2 signal pin for a battery charge start signal; a SIG3 signal pin for a discharge select signal; and/or a SIG4 signal pin for an Auxiliary Signal.

In a further aspect, a materials handling vehicle includes a battery receiving space, and a removable battery assembly, wherein: the removable battery assembly includes a battery body, a leading face, and an electrical socket on the leading face of the removable battery assembly; the battery receiving space includes an electrical connector; the leading face of the removable battery assembly rests on a bottom surface of the battery receiving space with the electrical socket engaged with the electrical connector; and the electrical socket, the electrical connector, the battery body, and the battery receiving space are configured to define a standoff gap between opposing surfaces of the electrical socket and the electrical connector, with the leading face of the removable battery assembly resting on the bottom surface of the battery receiving space.

Embodiments and features from one aspect may be embodiments and features from another aspect. Additional features and advantages may be gleaned by the person skilled in the art from the following description of exemplary embodiments with respect to the appended figures. The embodiments as shown and described are exemplary embodiments only and shall not be construed as limiting the invention, which is defined by the appended claims.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
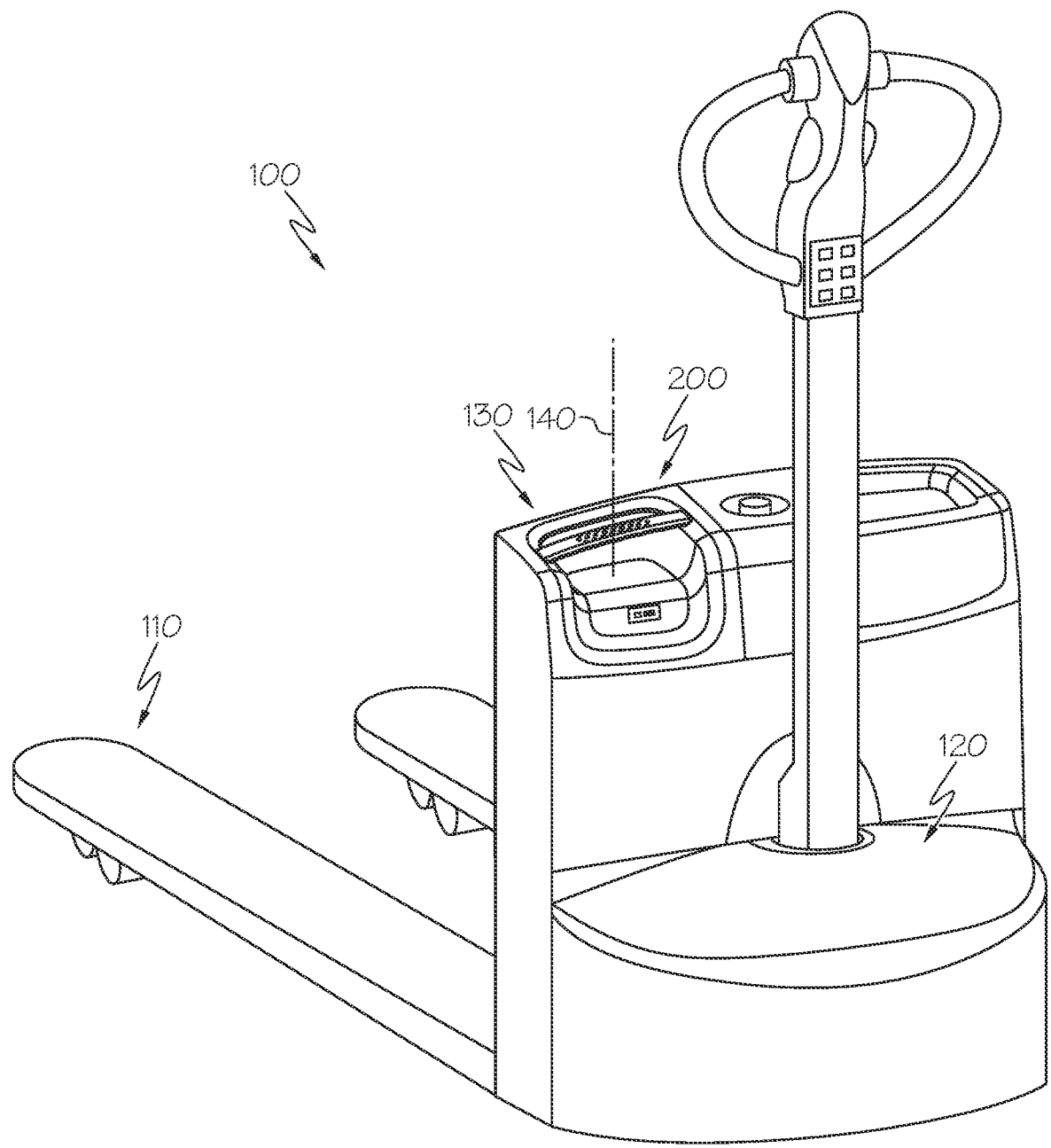
FIG. 1 schematically depicts a perspective view of a materials handling vehicle, according to one or more embodiments shown and described herein.

Referring initially to FIG. 1, a materials handling vehicle 100 is shown. The materials handling vehicle 100 includes a materials handling mechanism 110, a drive mechanism 120, a battery receiving space 130, and a removable battery assembly 200. The materials handling mechanism 110 is configured to engage goods in a warehouse environment and cooperates with the drive mechanism 120, under power from the removable battery assembly 200, to move goods along an inventory transit surface in the warehouse environment.

For the purposes of defining and describing the concepts and scope of the present disclosure, it is noted that a "warehouse" encompasses any indoor or outdoor industrial facility in which materials handling vehicles transport goods including, but not limited to, indoor or outdoor industrial facilities that are intended primarily for the storage of goods, such as those where multi-level racks are arranged in aisles, and manufacturing facilities where goods are transported about the facility by materials handling vehicles for use in one or more manufacturing processes.

The drive mechanism 120 is merely illustrated schematically in FIG. 1, and it is noted that a variety of conventional and yet-to-be developed drive mechanisms will be suitable for operation with materials handling vehicles of the present disclosure. For example, and not by way of limitation, in the context of a pallet truck, the drive mechanism 120 may comprise an electric motor that is integrated with the steerable wheel of the pallet truck, as is disclosed in U.S. Pat. No. 6,343,907, and other similar patent literature.

The removable battery assembly 200 and the battery receiving space 130 cooperate to define a battery insertion and removal axis 140 along which the removable battery assembly 200 is inserted into and removed from the battery receiving space 130. It is noted that the present description and claims refer to movement of various components "along" respective axes. This movement "along" an axis encompasses movement that is directly co-linear with the associated axis and movement that is displaced from but parallel to the associated axis.

Figure 2:
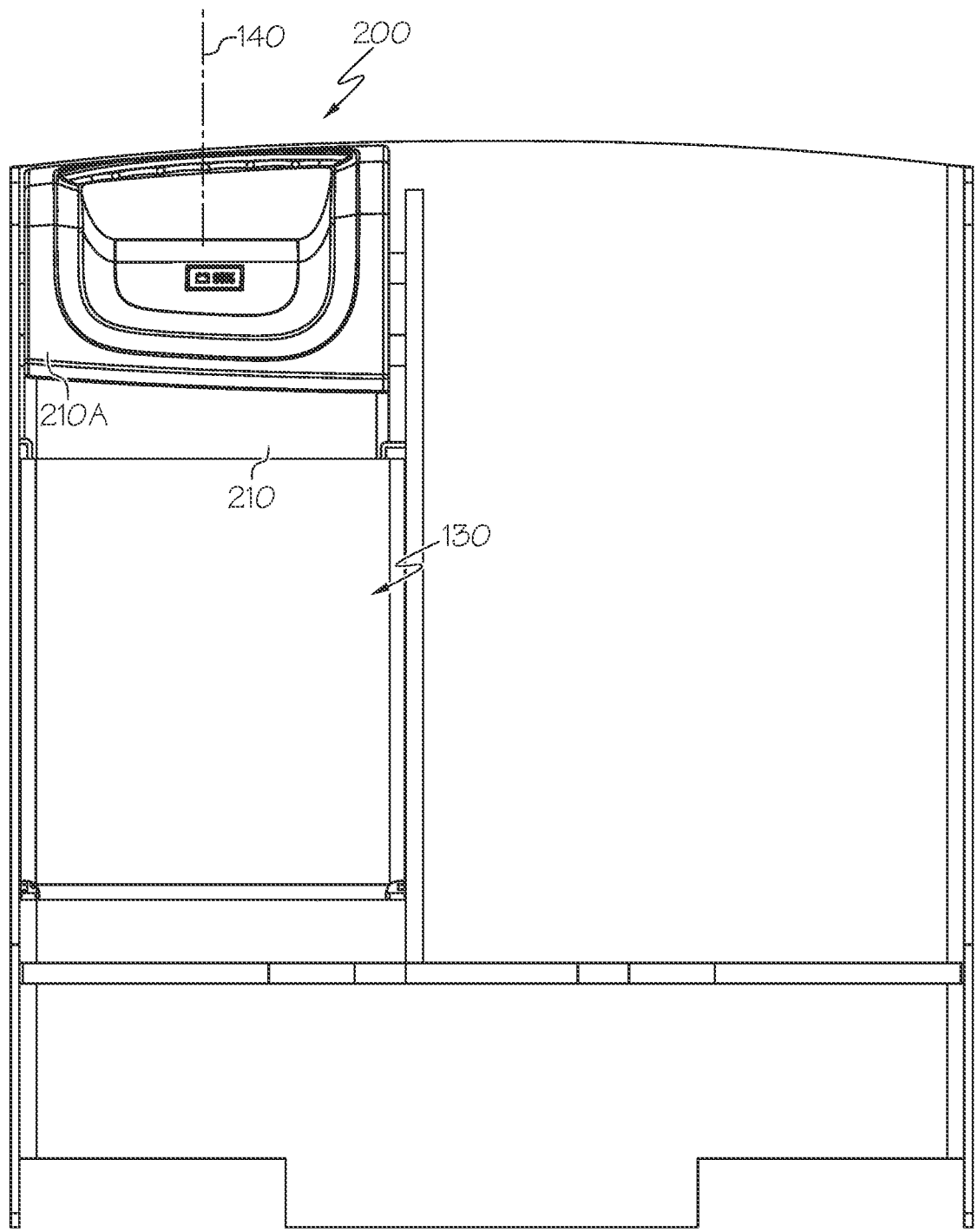
FIG. 2 schematically depicts a removable battery assembly of the materials handling vehicle of FIG. 1, according to one or more embodiments shown and described herein.
Figure 3:
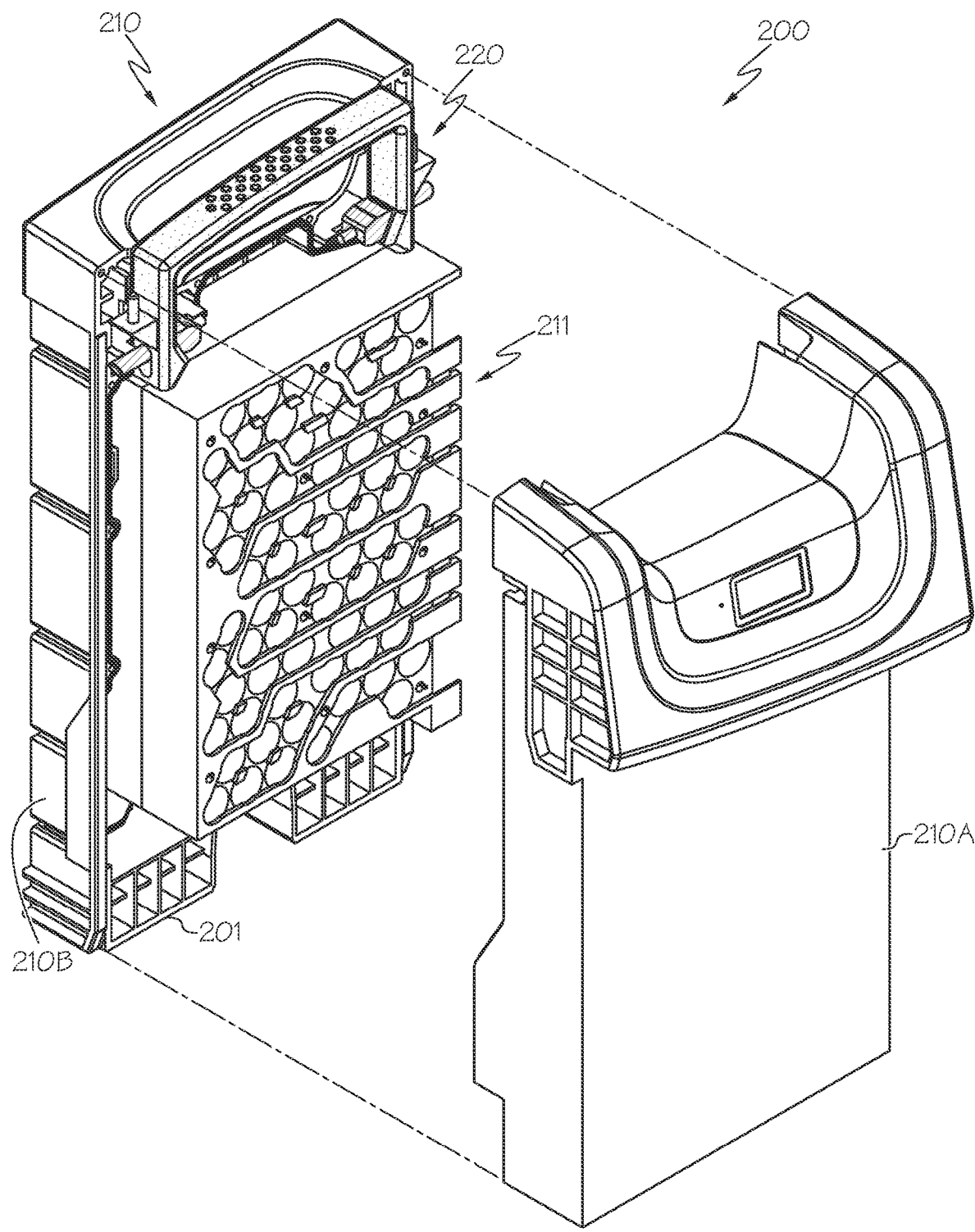
FIG. 3 schematically depicts an exploded perspective view of the removable battery assembly of FIG. 2, according to one or more embodiments shown and described herein.
Figure 4:
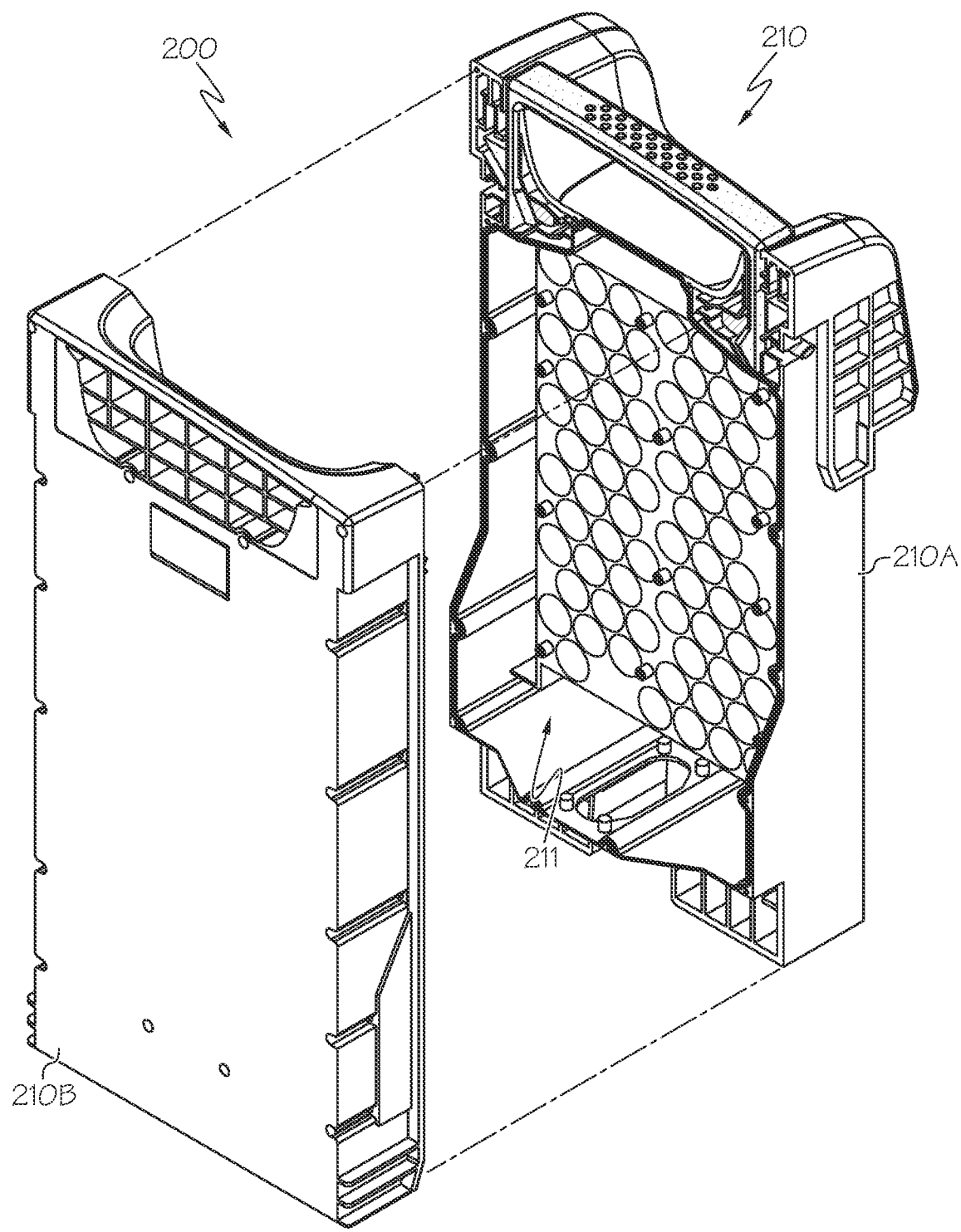
FIG. 4 schematically depicts another exploded perspective view of the removable battery assembly of FIG. 2, according to one or more embodiments shown and described herein.

Referring now to FIGS. 2-4, the removable battery assembly 200 comprises a battery body 210 and a battery locking mechanism 220. The battery body 210 of the removable battery assembly 200 comprises a plurality of rechargeable battery cells 211, a front case 210A, and a rear case 210B. The front and rear cases 210A, 210B cooperate to contain the plurality of rechargeable battery cells 211 therein. As described in more detail herein, the front and rear cases 210A, 210B cooperate to contain portions of the battery locking mechanism 220. The removable battery assembly 200 comprises a leading face 201 provided at a lower end of the front and rear cases 210A, 210B.

It should be appreciated that only one of the front and rear cases 210A, 210B will need to be designed with particular attention to the tolerances required for proper constrainment of the linear movement of the locking mechanism parts, as described herein. In addition, battery assembly is optimized by allowing for the complete installation of the battery locking mechanism 220 in one of front and rear cases 210A, 210B prior to assembly of the front and rear cases 210A, 210B with appropriate securing hardware, adhesive, and/or other bonding technology. The battery body 210 may comprise unitarily integrated hardware, multi-component hardware, or a combination thereof, for constraining the battery locking mechanism 220 and individual components thereof to linear movement.

Figure 25:
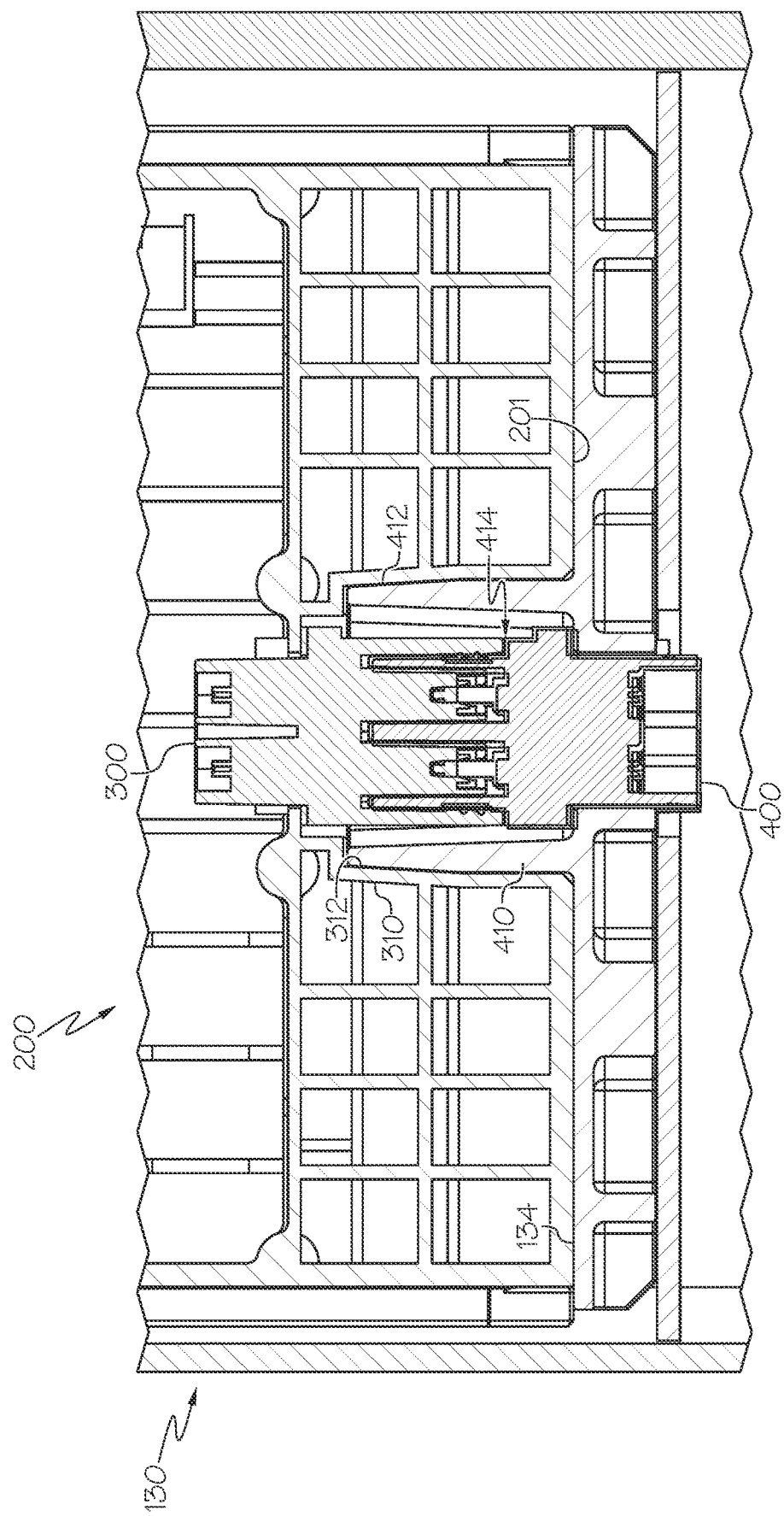
FIG. 25 schematically depicts a cross-section view of an electrical socket of the removable battery assembly mating with an electrical connector of the battery receiving space, according to one or more embodiments shown and described herein.
Figure 26:
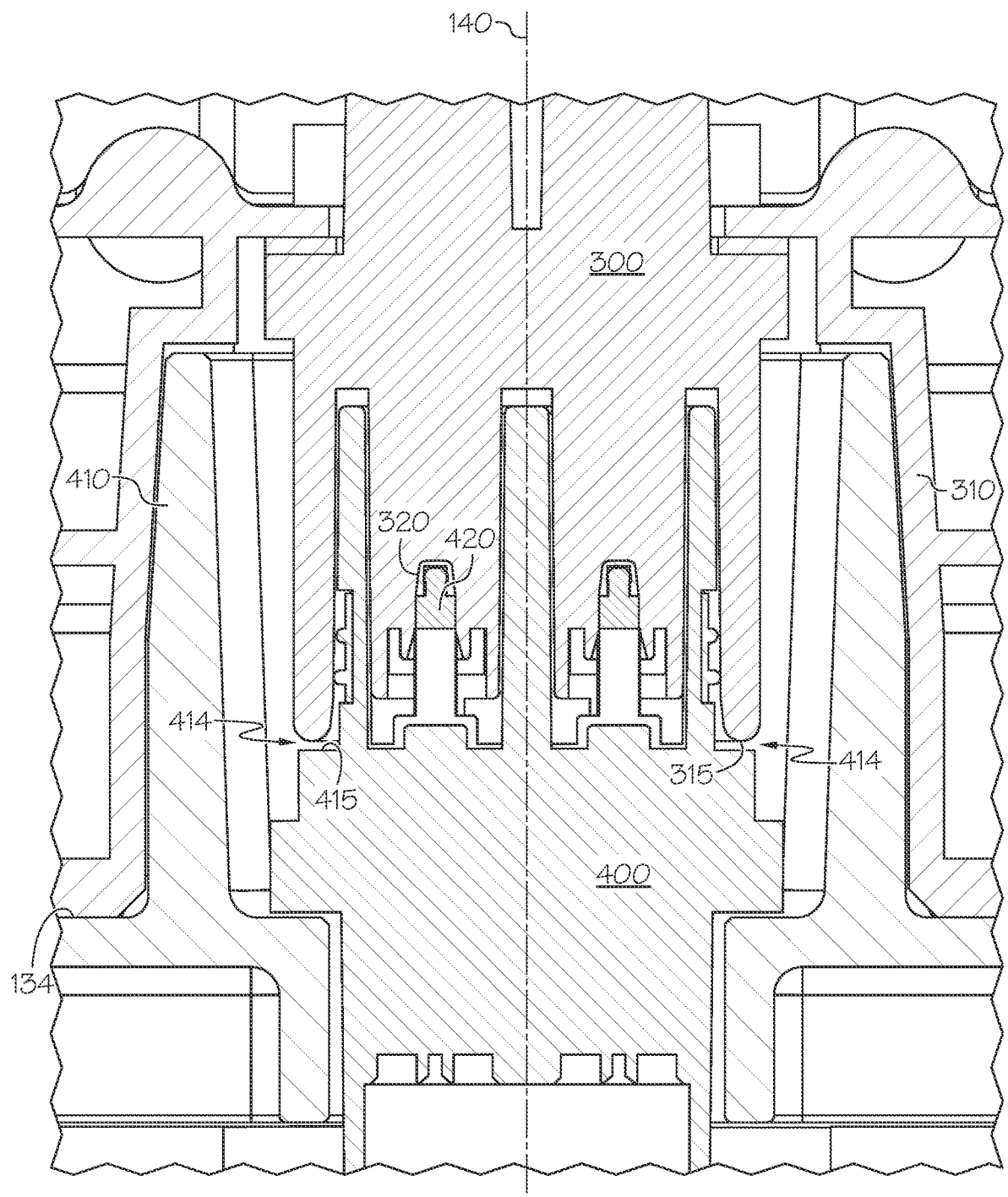
FIG. 26 schematically depicts an enlarged cross-section view of the electrical socket of FIG. 21 mating with the electrical connector of FIG. 25, according to one or more embodiments shown and described herein.
Figure 27:
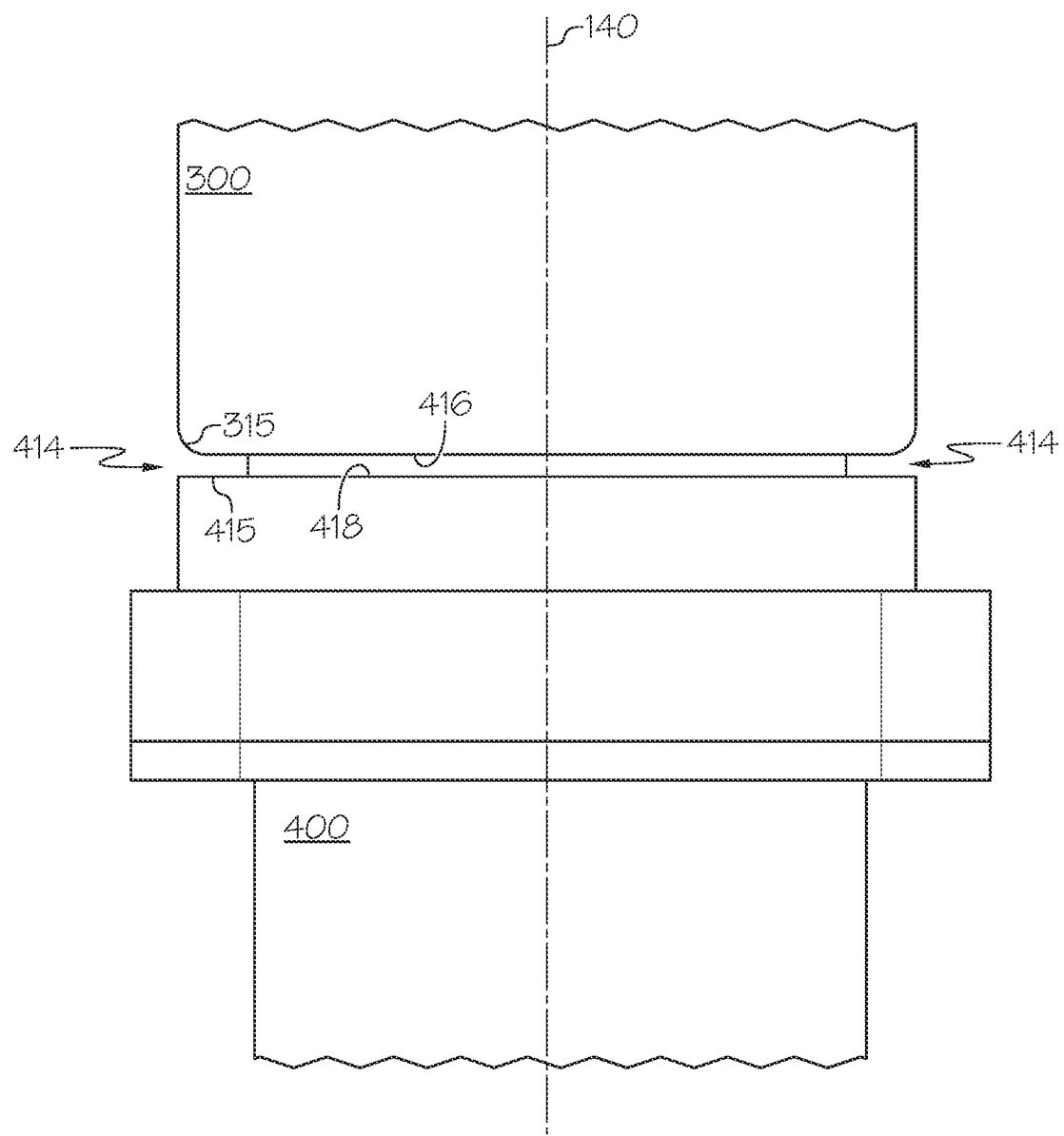
FIG. 27 schematically depicts an enlarged front view of the electrical socket of FIG. 21 mating with the electrical connector of FIG. 25, according to one or more embodiments shown and described herein.
Figure 28:
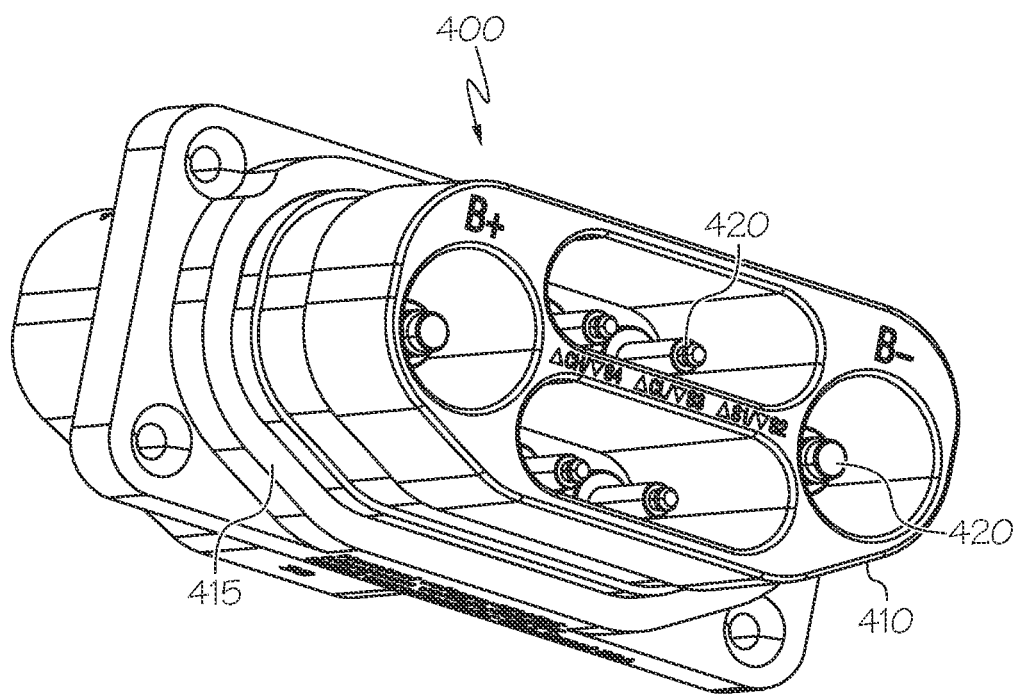
FIG. 28 schematically depicts a perspective view of the electrical connector of FIG. 25, according to one or more embodiments shown and described herein.
Figure 29:
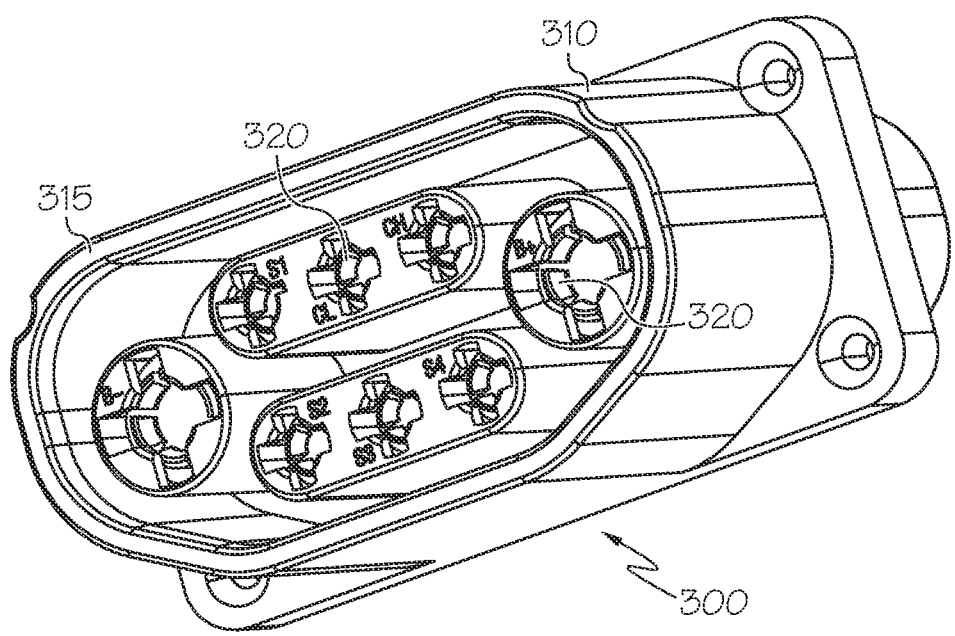
FIG. 29 schematically depicts another perspective view of the electrical connector of FIG. 25, according to one or more embodiments shown and described herein.

As shown in FIG. 25, the removable battery assembly 200 comprises an electrical socket 300 on the leading face 201 of the removable battery assembly 200. The battery receiving space 130 comprises an electrical connector 400 that complements the electrical socket 300 of the removable battery assembly 200. The leading face 201 is the side of the removable battery assembly 200 facing the battery receiving space 130 as the removable battery assembly 200 is inserted into the battery receiving space 130 in a direction opposite the handle lifting direction 255 along the battery insertion and removal axis 140.

Figure 6:
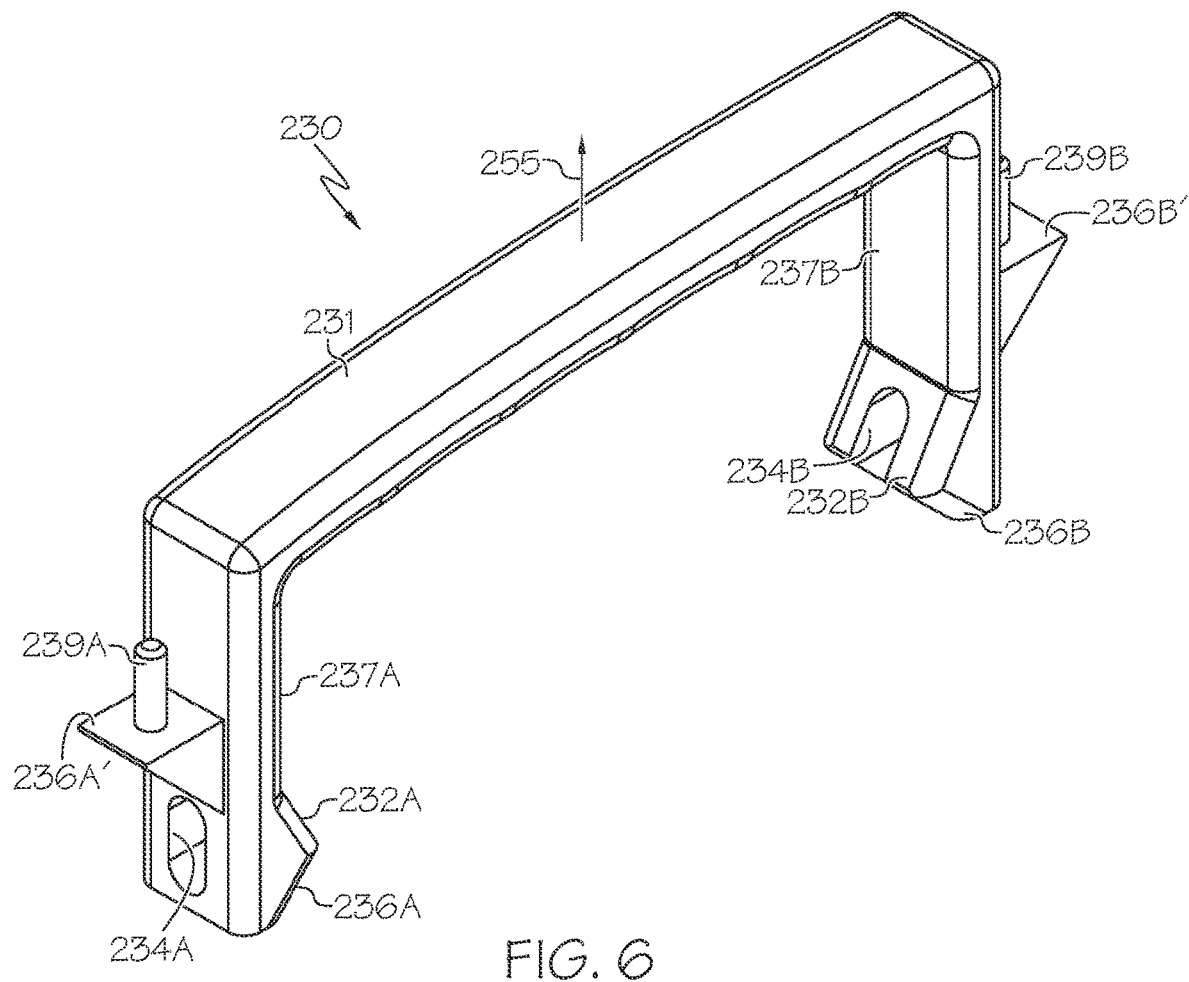
FIG. 6 schematically depicts a perspective view of a spring-loaded battery handle of the removable battery assembly of FIG. 2, according to one or more embodiments shown and described herein.

As shown in FIG. 6, the battery locking mechanism 220 comprises a spring-loaded battery handle 230 including a grip portion 231 and one or more arm portions 237A, 237B extending in a handle lifting direction 255. As shown, the spring-loaded battery handle 230 includes a pair of spaced-apart arm portions provided at opposite ends of the grip portion 231. The spring-loaded battery handle 230 comprises a planar handle cam surface 232A, 232B provided at an end of at least one of the spaced apart arm portions. In embodiments, each arm portion 237A, 237B comprises a planar handle cam surface 232A, 232B. The spring-loaded battery handle 230 comprises a locking pin passage 234A, 234B formed in the planar handle cam surface 232A, 232B. In embodiments, the spring-loaded battery handle 230 includes a locking pin passage 234A, 234B formed in each of the planar handle cam surfaces 232A, 232B. The spring-loaded battery handle 230 may comprise one or more handle-side limiting surfaces 236A, 236B independent of the planar handle cam surface 232A, 232B of the battery handle 230. As shown, each spaced-apart arm portion includes a handle-side limiting surface 236A, 236B. The handle-side limiting surfaces 236A, 236B are inclined relative to the handle lifting direction 255. The battery handle 230 may additionally comprise one or more handle-side limiting surfaces 236A', 236B' that are oriented perpendicular to the handle lifting direction 255. The spring-loaded battery handle 230 further may comprise one or more spring-engaging fingers 239A, 239B extending from the handle-side limiting surfaces 236A', 236B' of the battery handle 230 in the handle lifting direction 255, along the battery insertion and removal axis 140. As shown, the spring-loaded battery handle 230 comprises a pair of spring-engaging fingers 239A, 239B. The spring-loaded battery handle 230 may be unitary elements, as would be the case for a molded structure, or may be formed of multiple components.

Figure 7:
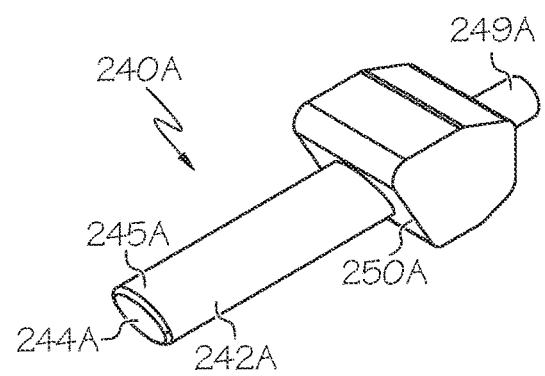
FIG. 7 schematically depicts a perspective view of a spring-loaded locking pin of the removable battery assembly of FIG. 2, according to one or more embodiments shown and described herein.

As shown in FIG. 7, the battery locking mechanism 220 comprises one or more spring-loaded locking pins 240A, 240B. As described in more detail herein, the battery locking mechanism 220 may comprise a pair of spring-loaded locking pins 240A, 240B each having identical structure and being a mirror image of one another. Referring to FIG. 7 which illustrates a single spring-loaded locking pin 240A and FIG. 8 which illustrates the pair of spring-loaded locking pins 240A, 240B, the structure of the spring-loaded locking pins 240A, 240B is discussed in more detail. The spring-loaded locking pins 240A, 240B comprise a planar pin cam surface 250A, 250B that is parallel to the planar handle cam surface 232A, 232B. The planar pin cam surface 232A, 232B and corresponding planar pin cam surface 250A, 250B of one of the arm portions 237A, 237B is configured as a mirror image of the planar handle cam surface 232A, 232B and corresponding planar pin cam surface 250A, 250B of the other of the arm portions 237A, 237B. The spring-loaded locking pin 237A, 237B comprises a locking pin extension 242A, 242B that extends along a latch engagement and disengagement axis 152A, 152B. The spring-loaded locking pin 240A, 240B comprises a locking pin extension 242A, 242B extending from the planar pin cam surface 250A, 250B and through the locking pin passage 234A, 234B formed in the planar handle cam surface 232A, 232B. The spring-loaded locking pins 240A, 240B of the battery locking mechanism 220 may each comprise a complementary chamfered engagement face 244A, 244B. The spring-loaded locking pin 240A, 240B may comprise a spring-engaging finger 249A, 249B extending in a direction opposite the locking pin extension 242A, 242B and perpendicular to the battery insertion and removal axis 140. The spring-loaded locking pin 240A, 240B may be a unitary element, as would be the case for a molded structure, or may be formed of multiple components.

As used herein. "planar" surfaces may include non-planar portions. This is shown, for example in FIGS. 6 and 7, where the planar pin cam surface 250A, 250B and the planar handle cam surface 232A, 232B terminate with rounded shoulder portions.

Figure 5:
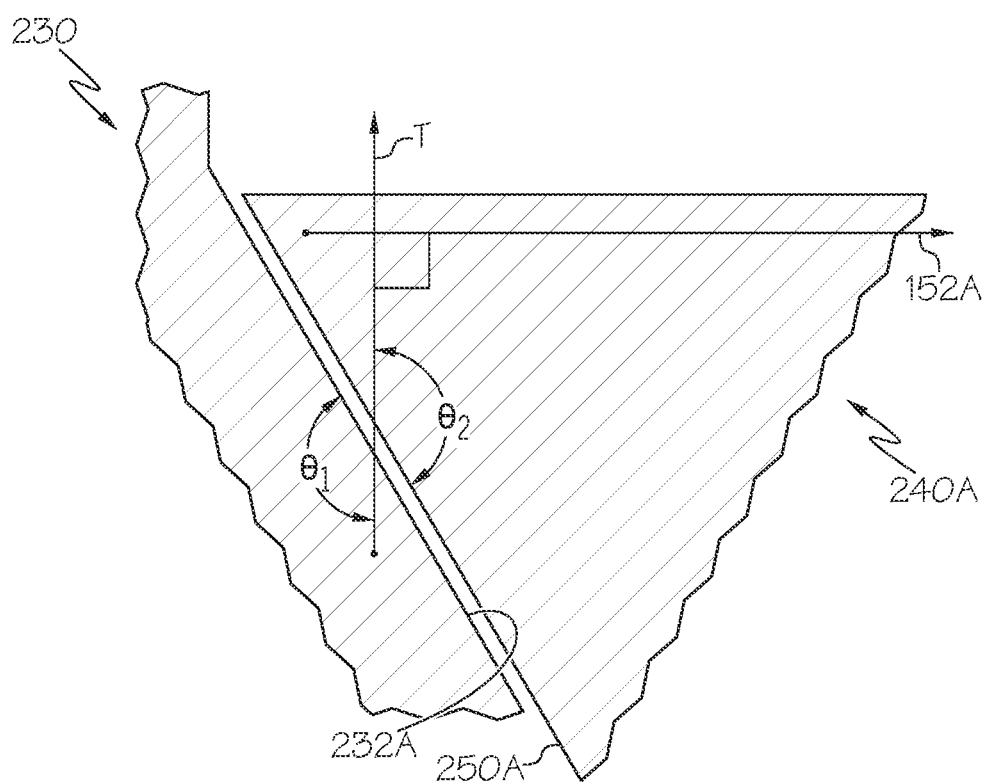
FIG. 5 schematically depicts an enlarged cross-section view of cam surfaces of the removable battery assembly of FIG. 2, according to one or more embodiments shown and described herein.

As shown in FIG. 5, the planar handle cam surface 232A of the spring-loaded battery handle 230 and the planar pin cam surface 250A of the spring-loaded locking pin 240 are shown. An exterior angle $\theta_1$ is defined between the planar handle cam surface 232A and a cam surface traversal T extending in the handle lifting direction 255 along the battery insertion and removal axis 140. The cam surface traversal T is perpendicular to the latch engagement and disengagement axis 152A. Additionally, an exterior angle $\theta_2$ is defined between the planar pin cam surface 250A and the cam surface traversal T. As such, the exterior angles $\theta_1$, $\theta_2$ are equal and alternate of one another relative to the cam surface traversal T.

Figure 8:
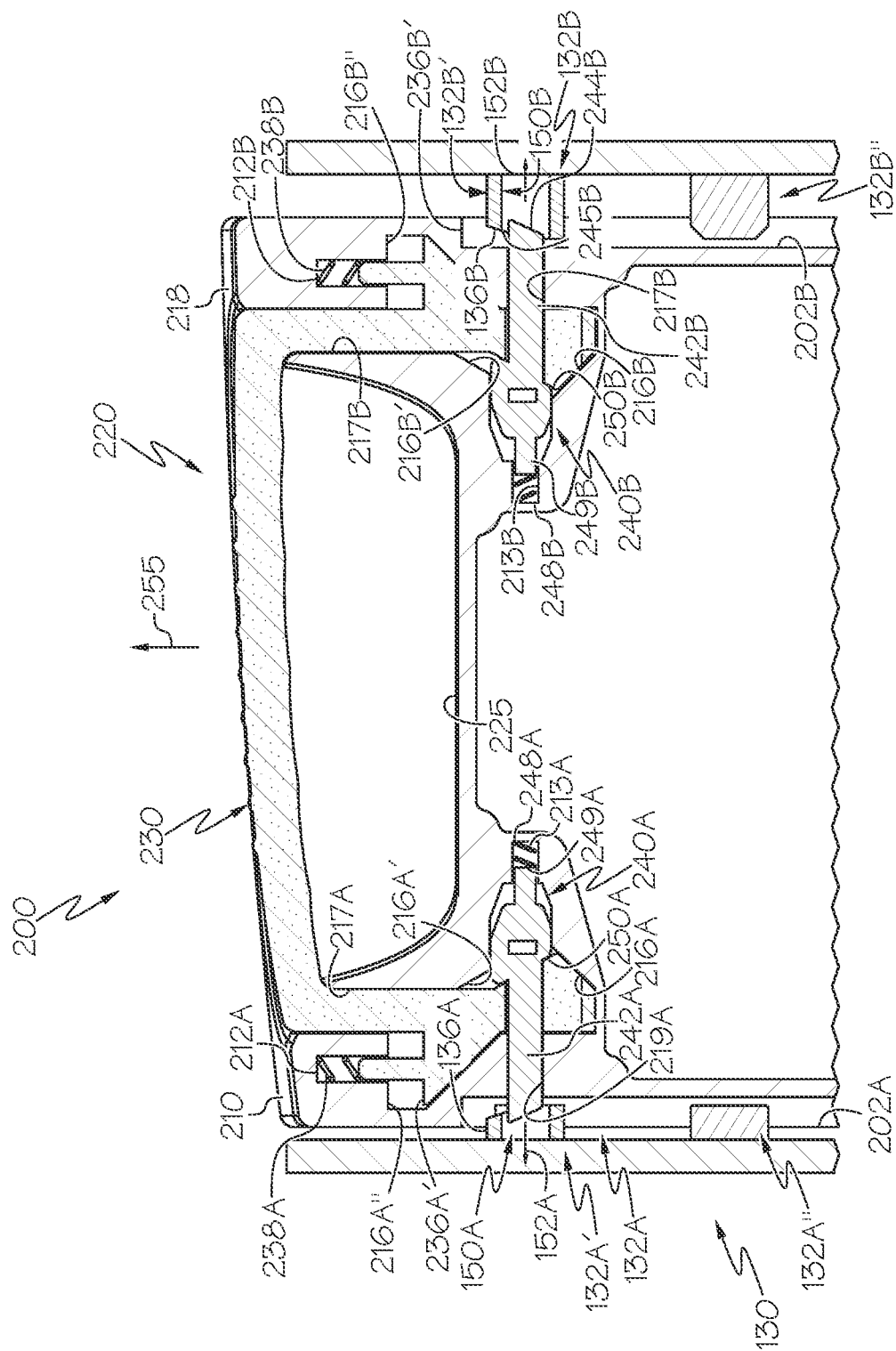
FIG. 8 schematically depicts a partial cross-section view of the removable battery assembly of FIG. 2, according to one or more embodiments shown and described herein.
Figure 9:
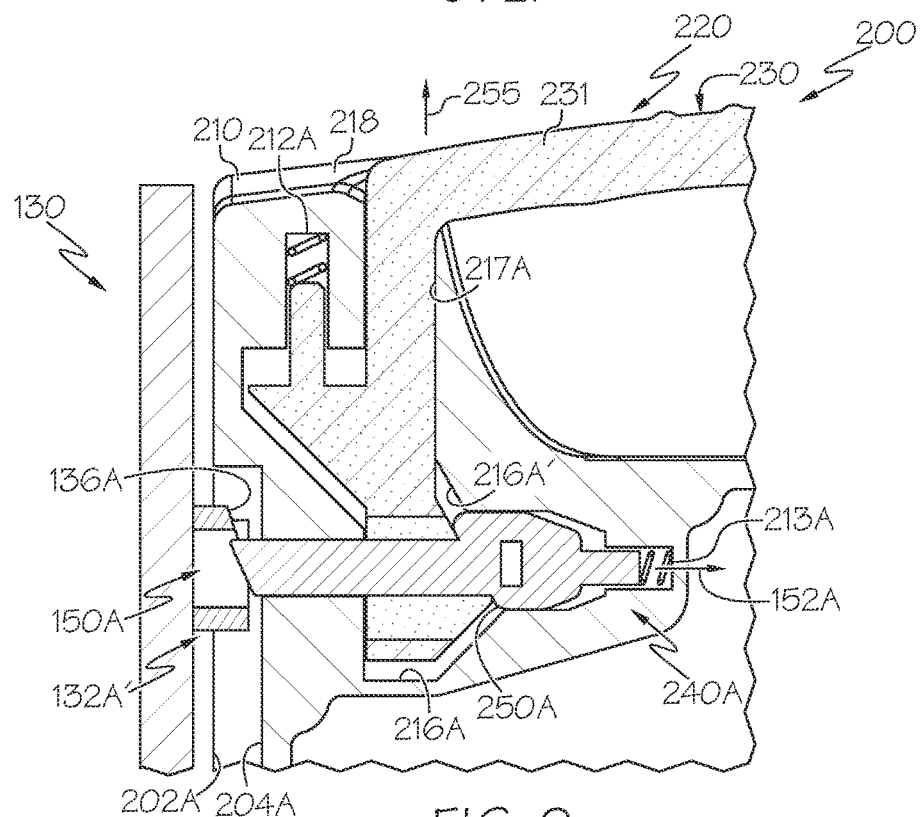
FIG. 9 schematically depicts an enlarged partial cross-section view of the removable battery assembly of FIG. 2 in a locked position, according to one or more embodiments shown and described herein.
Figure 10:
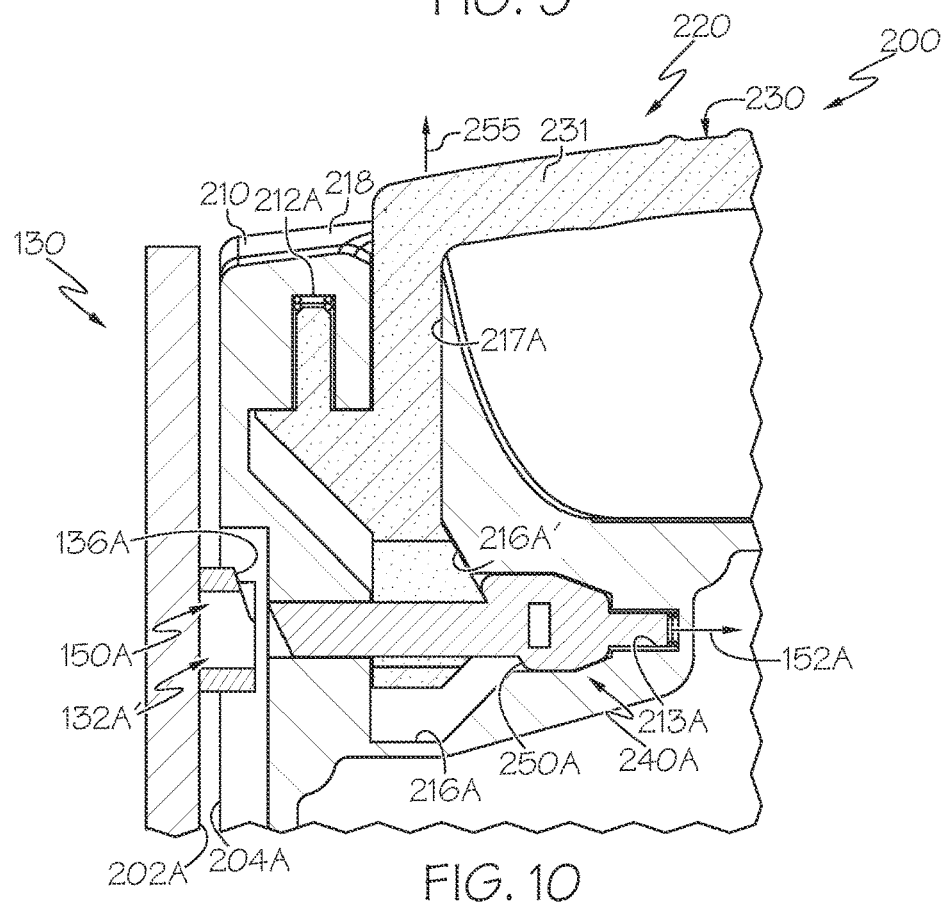
FIG. 10 schematically depicts an enlarged partial cross-section view of the removable battery assembly of FIG. 2 in an unlocked position, according to one or more embodiments shown and described herein.

As described in more detail herein, the battery locking mechanism 220 is positionable between a locked position, shown in FIG. 8, an intermediate position, shown in FIG. 9, and an unlocked position, shown in FIG. 10. It should be appreciated that when the battery locking mechanism 220 is in the locked position, the removable battery assembly 200 is locked within the battery receiving space 130. Alternatively, when the battery locking mechanism 220 is in the unlocked position, the removable battery assembly 200 is permitted to be removed from the battery receiving space 130.

The battery receiving space 130 comprises one or more battery latches 150A, 150B.

As shown, the battery receiving space 130 may comprise a pair of battery latches 150A, 150B positioned to receive a corresponding leading portion 245A, 245B of the spring-loaded locking pins 240A, 240B when the spring-loaded locking pins 240A, 240B are in an extended position and the removable battery assembly 200 is seated in the battery receiving space 130.

In embodiments, the battery receiving space 130 may comprise opposing pairs of battery guide pins 132A, 132B, each opposing pair arranged on opposite sides of the battery receiving space 130. Each opposing pair of guide pins 132A, 132B comprises a latching pin 132A', 132B' and a guiding pin 132A", 132B". The latching pin 132A', 132B' and the guiding pin 132A", 132B" of each opposing pair of battery guide pins 132A, 132B are positioned along a common guide pin axis, parallel to the battery insertion and removal axis 140. The latching pin 132A', 132B' of each opposing pair of battery guide pins 132A, 132B comprises a recess forming the battery latch 150A, 150B that is positioned to receive the leading portion 245A, 245B of one of the spring-loaded locking pins 237A, 237B when in the extended position, with the removable battery assembly 200 seated in the battery receiving space 130. As used herein, the term "pin" can take a variety of forms, and need only be seated in the battery receiving space 130 while presenting structure that can extend into longitudinal guide structures 204A, 204B of the battery body 210, as discussed herein. It is also noted that a "pin" may be a monolithic element or may comprise multiple components.

Figure 14:
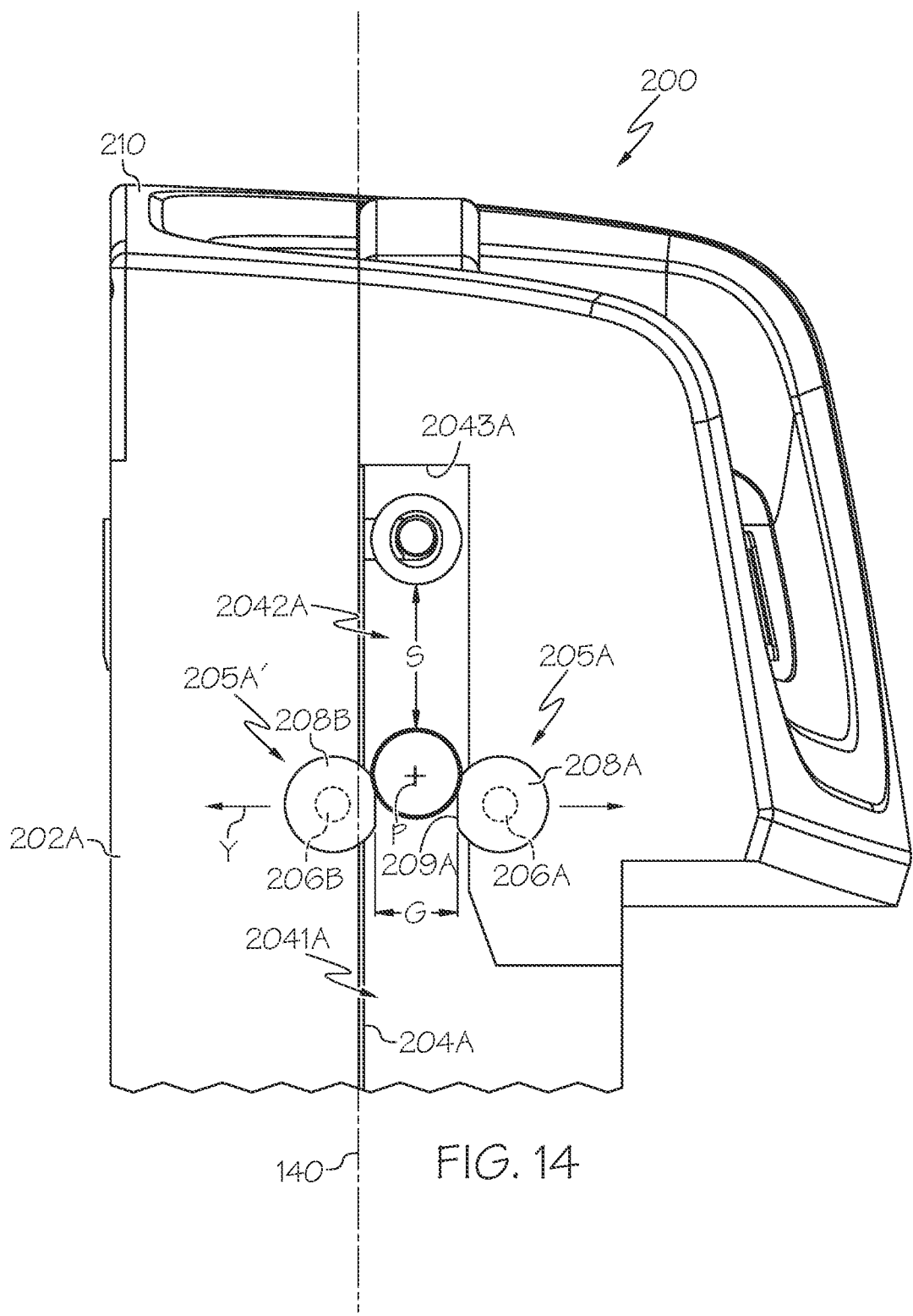
FIG. 14 schematically depicts a side view of the removable battery assembly of FIG. 11 received within the battery receiving space, according to one or more embodiments shown and described herein.
Figure 15:
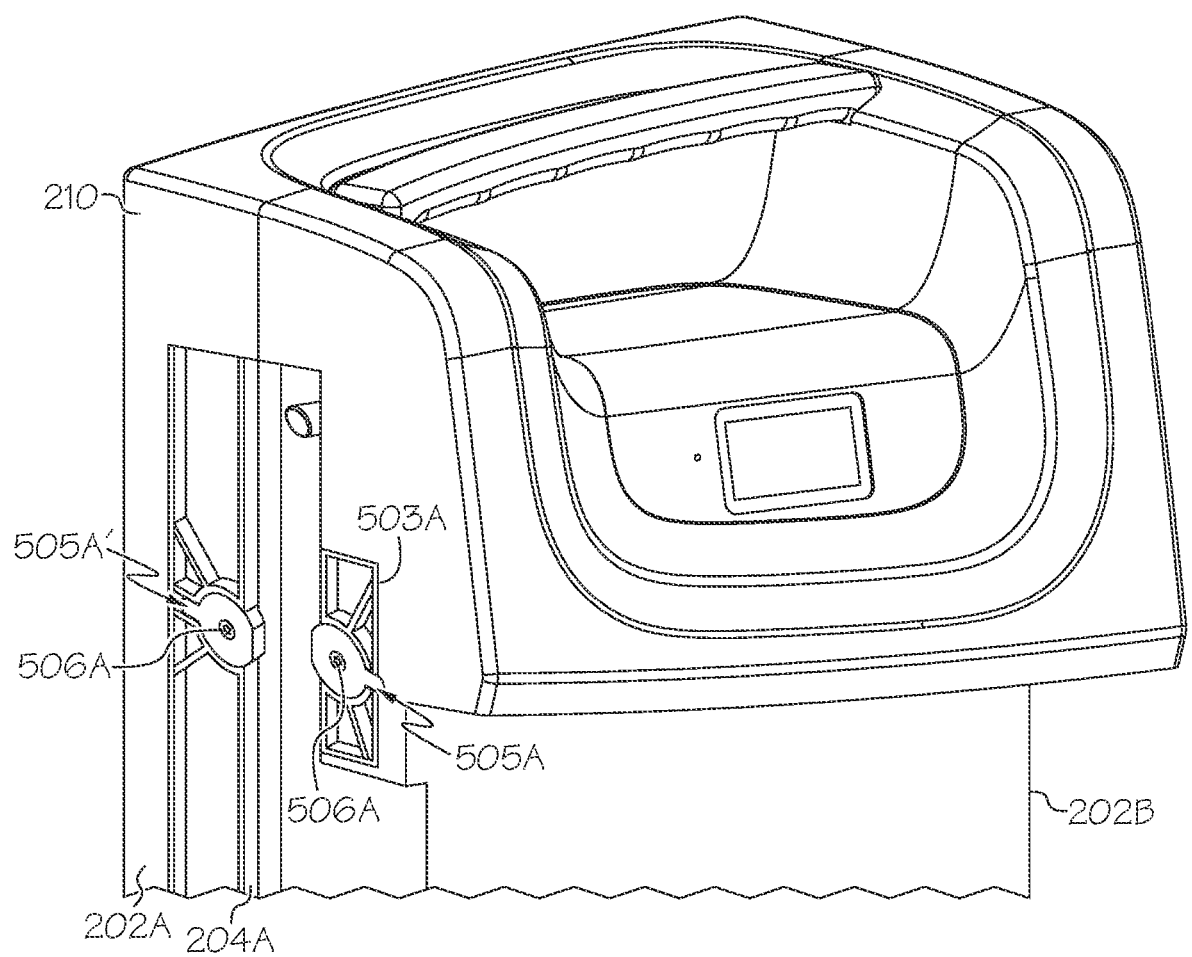
FIG. 15 schematically depicts an embodiment of a removable battery assembly including a pair of guide pin stabilizers, according to one or more embodiments shown and described herein.

Although, in the illustrated embodiment, the latching pin 132A', 132B' is positioned closer to an open end of the battery receiving space 130, it is contemplated that the guiding pin 132A", 132B" may alternatively be positioned closer to an open end of the battery receiving space 130. As shown in FIG. 14, the latching pin 132A', 132B' and the guiding pin 132A", 132B" of each opposing pair of battery guide pins 132A, 132B are separated by a guide pin spacing S. Although this guide pin spacing may vary across different embodiments, in some cases it will be advantageous to ensure that the guide pin spacing S is less than half of a longitudinal dimension L, shown in FIG. 12, of the lateral battery faces 202A, 202B, and is at least about 47.5 mm. The aforementioned upper limit on the guide pin spacing S helps ensure that the battery assembly 200 will not stick during insertion and removal, while the aforementioned minimum spacing helps ensure that the guide pins 132A, 132B will provide sufficient resistance to inadvertent battery tilting during insertion and removal.

Although a wide variety of battery dimensions are contemplated within the scope of the present disclosure, in embodiments, battery dimensions will range from between about 400 mm and about 450 mm (height), between about 80 mm and about 120 mm (depth), and between about 200 mm and about 230 mm (width). In embodiments, battery dimensions will range from between about 415 mm and about 416 mm (height), between about 101 mm and about 102 mm (depth), and between about 211 mm and about 212 mm (width). The dimensions of the guide pins 132A, 132B and the longitudinal guide structure 204A, 204B can be taken to scale relative to the aforementioned battery dimensions. To ensure proper insertion and removal of the removable battery assembly 200 to and from the battery receiving space 130, as discussed in more detail herein, a minimum amount of clearance should be maintained between the periphery of the guide pins 132A, 132B and inside walls of the longitudinal guide structure 204A, 204B. In many cases, a clearance of between about 0.5 mm and about 5 mm will suffice. In many cases, a clearance of between about 1 mm and about 1.5 mm will suffice.

Referring again to FIGS. 8-10, the latching pin 132A', 132B' of each opposing pair of battery guide pins 132A, 132B may comprise a chamfered engagement face 136A, 136B. The chamfered engagement face 136A, 136B of each latching pin 132A', 132B' leads to the recess forming the battery latch 150A, 150B of each latching pin 132A', 132B'. Each complementary chamfered engagement face 244A, 244B of the spring-loaded locking pins 240A, 240B is oriented to face the chamfered engagement face 136A, 136B of one of the latching pins 132A', 132B' as the removable battery assembly 200 is inserted into the battery receiving space 130.

Figure 11:
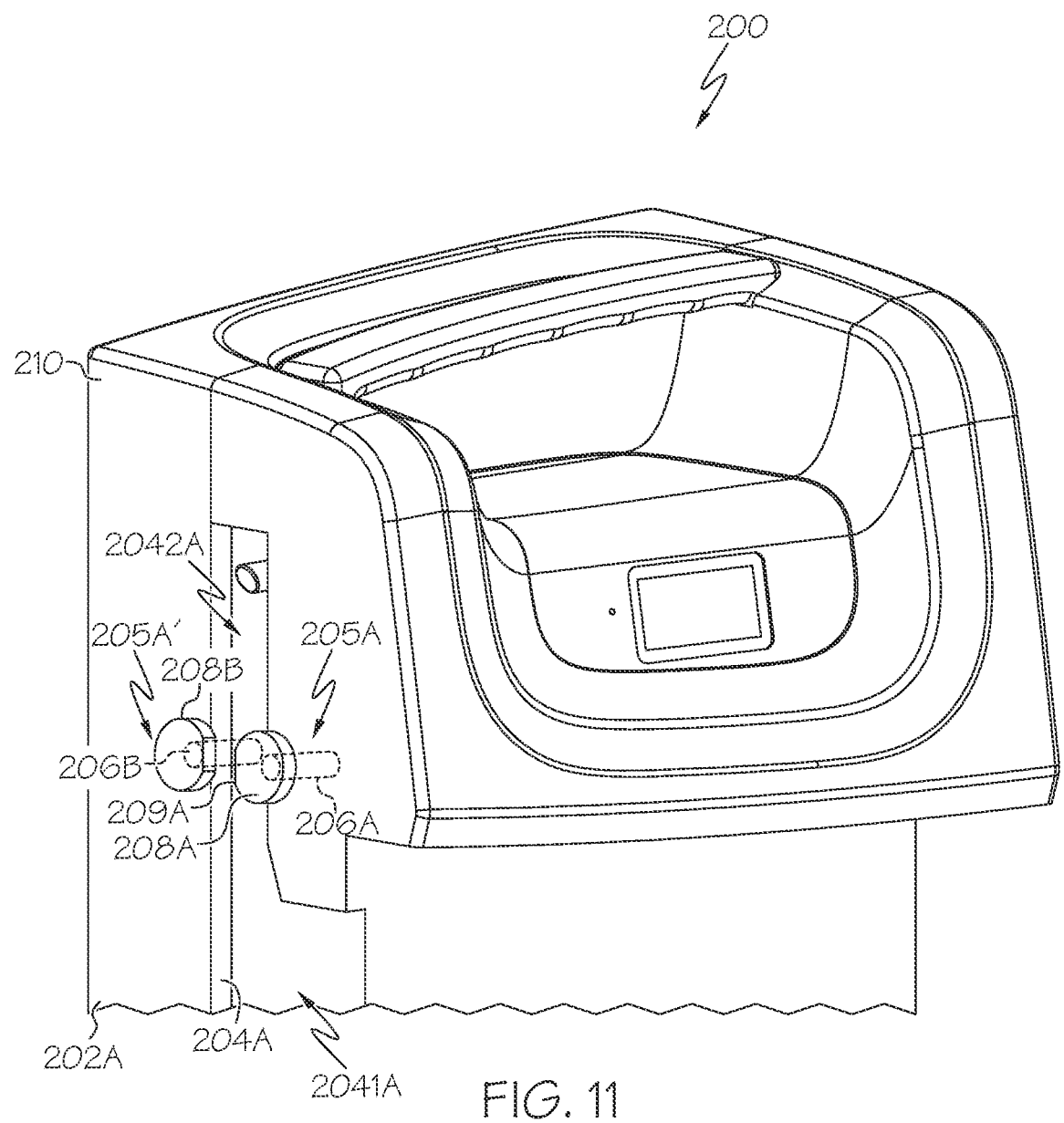
FIG. 11 schematically depicts an embodiment of a removable battery assembly including a pair of guide pin stabilizers, according to one or more embodiments shown and described herein.
Figure 12:
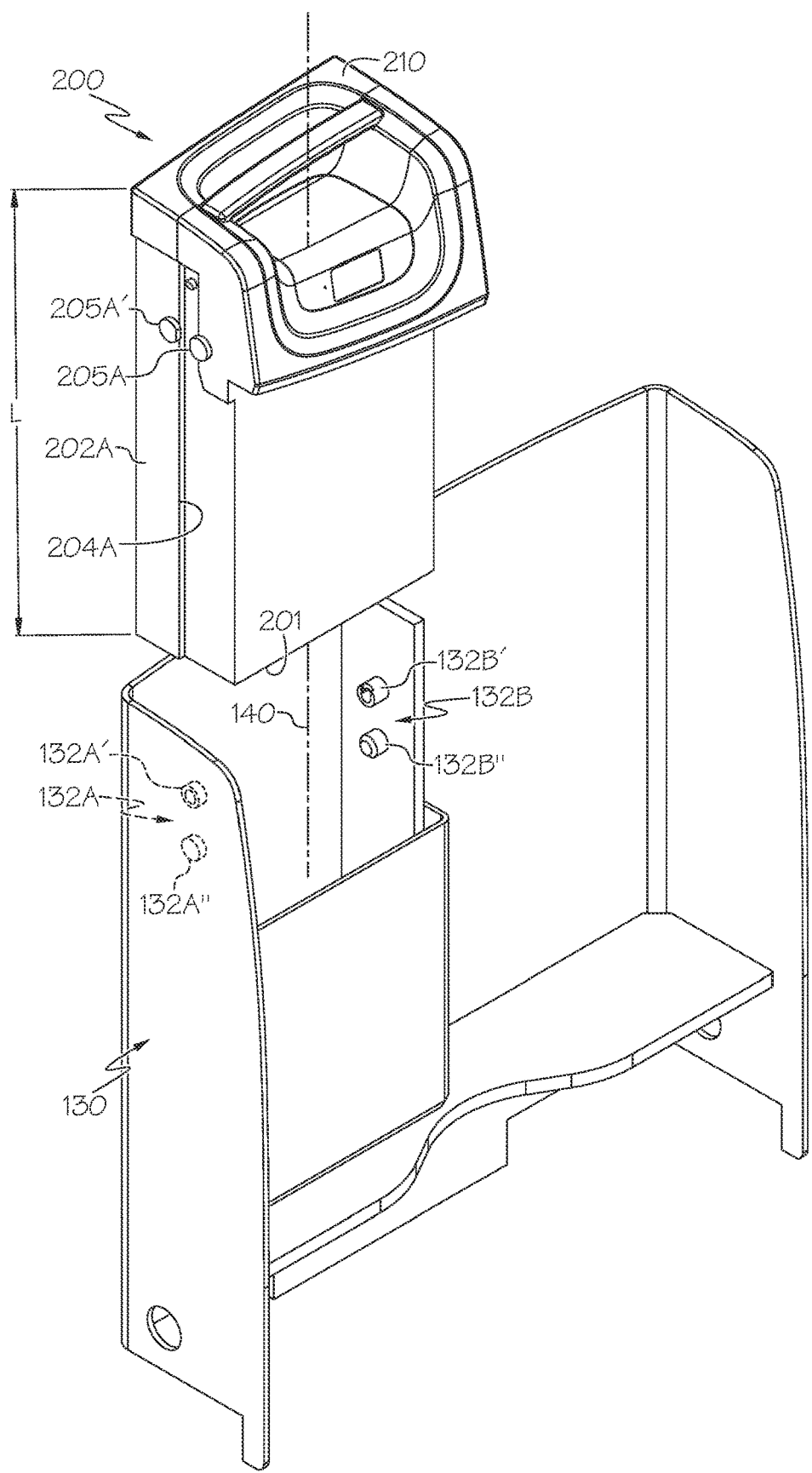
FIG. 12 schematically depicts a perspective view of the removable battery assembly of FIG. 11 being inserted into a battery receiving space, according to one or more embodiments shown and described herein.
Figure 13:
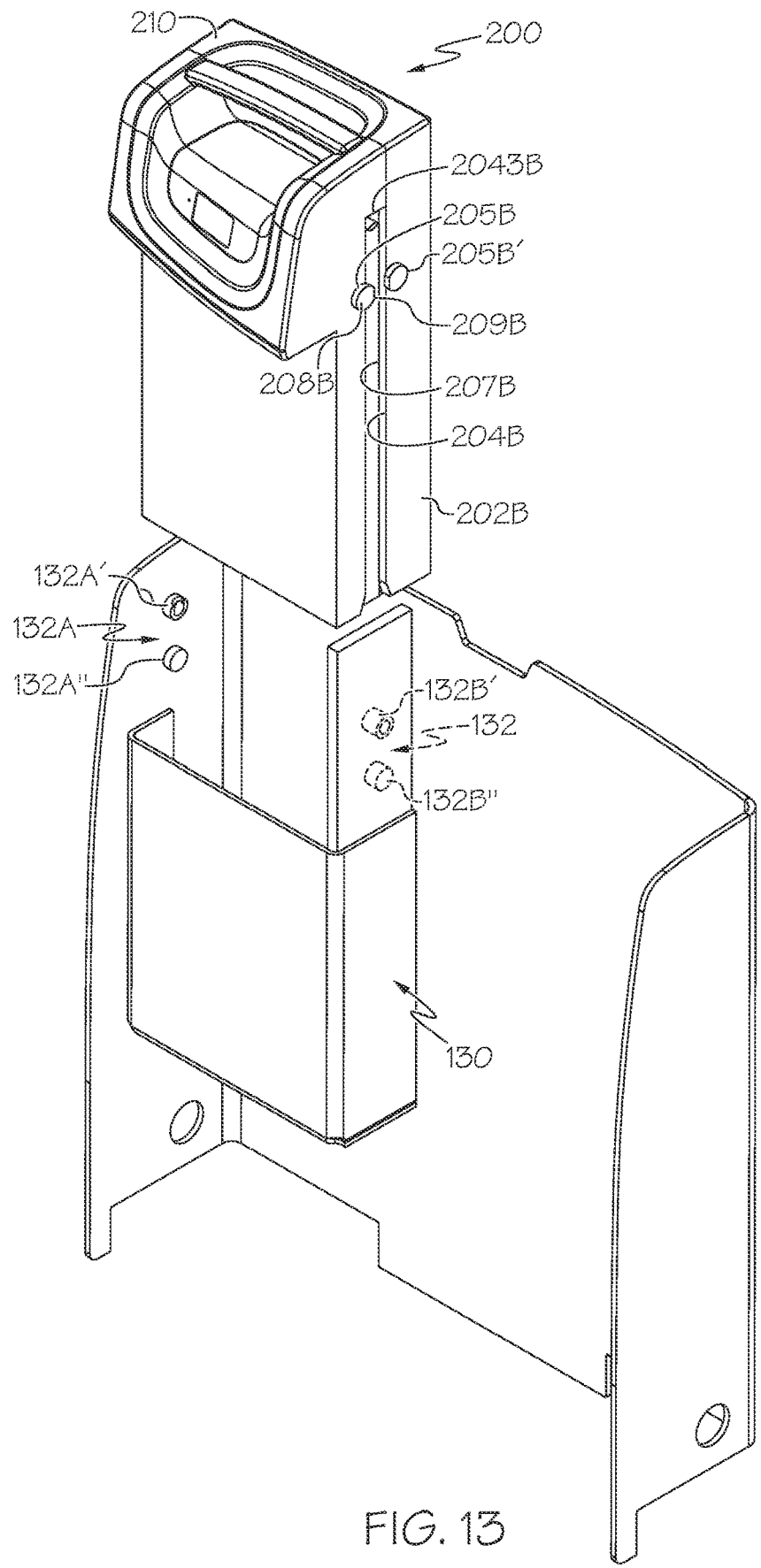
FIG. 13 schematically depicts another perspective view of the removable battery assembly of FIG. 11 being inserted into the battery receiving space, according to one or more embodiments shown and described herein.

As shown in FIGS. 12 and 13, the battery body 210 comprises lateral battery faces 202A, 202B, each comprising a longitudinal guide structure 204A, 204B that is oriented along the battery insertion and removal axis 140. The longitudinal guide structure 204A, 204B is sized to accommodate the opposing pairs of guide pins 132A, 132B, including the latching pin 132A', 132B' and the guiding pin 132A", 132B", as the removable battery assembly 200 is inserted into and removed from the battery receiving space 130. The longitudinal guide structure 204A, 204B of the lateral battery faces 202A, 202B is configured as guide channels. In embodiments, the longitudinal guide structure 204A of one of the lateral battery faces 202A is shorter than the longitudinal guide structure 204B of the other lateral battery face 202B, to create free space along one of the lateral battery faces 202B. As is illustrated in FIGS. 11 and 12, this free space can be used to create room for hardware that forms part of the battery receiving space 130 of the materials handling vehicle 100.

Referring again to FIG. 8, the battery body 210 may comprise one or more handle passages 217A, 217B and one or more locking pin passages 219A, 219B. The battery body 210 may also comprise a handle grip recess 225. As shown, the handle grip recess 225 is formed below the grip portion 231 of the spring-loaded battery handle 230 and may extend at least approximately 6.5 mm along the battery insertion and removal axis 140. In this manner, the aforementioned handle grip recess 225 provides sufficient freedom of movement to allow a user to grasp the grip portion 231 of the spring-loaded battery handle 230 with one or two hands and initiate a battery removal operation.

The battery body 210 further may comprise one or more body-side limiting surfaces 216A, 216B that are positioned parallel to corresponding handle-side limiting surfaces 236A, 236B of the spring-loaded battery handle 230, to engage the corresponding handle-side limiting surfaces 236A, 236B of the spring-loaded battery handle 230 when the battery locking assembly 220 is in the locked position. The battery body 210 may further comprise one or more body-side limiting surfaces 216A', 216B' that are inclined relative to the handle lifting direction 255 and dedicated for engagement of a corresponding one of the handle cam surfaces 232A, 232B when the battery locking assembly 220 is in the unlocked position.

In the illustrated embodiment, for example, each body-side limiting surface 216A', 216B' is inclined at an angle of approximately 45 degrees, relative to the handle lifting direction 255. In this manner, the absolute surface area of the body-side limiting surface 216A', 216B' is increased, as compared to cases where the body-side limiting surface 216A', 216B' would be perpendicular to the handle lifting direction 255, to increase stopping power in the battery locking mechanism 220, and to reduce wear. However, it should be appreciated that variations of the illustrated 45 degree limiting surface angle are contemplated.

The battery body 210 may additionally comprise one or more body-side limiting surfaces 216A", 216B" that are oriented perpendicular to the handle lifting direction 255, and may be positioned for engagement with a corresponding one of the handle-side limiting surfaces 236A', 236B' when the battery locking assembly 220 is in the locked position. This perpendicular orientation helps optimize the movement limiting capacity of the battery locking mechanism 220.

The battery body 210 further may comprise one or more handle-facing, spring-receiving cavities 212A, 212B. A handle spring 238A, 238B may be positioned within each handle-facing, spring-receiving cavity 212A, 212B. Corresponding spring-engaging fingers 239A, 239B of the battery handle 230 extend into the handle-facing, spring-receiving cavity 212A, 212B along a longitudinal axis of the handle-facing, spring-receiving cavity 212A, 212B. In this manner, the handle-facing, spring-receiving cavity 212A, 212B and the spring-engaging finger 239A, 239B of the battery handle 230 cooperate to help maintain the orientation of the spring-loaded battery handle 230 along the battery insertion and removal axis 140 as the battery handle 230 moves between a lowered or locked position, when the battery locking assembly 220 is in the locked position, and a raised or unlocked position, when the battery locking assembly 220 is in the unlocked position.

The battery body 210 may comprise one or more pin-facing, spring-receiving cavities 213A, 213B. A locking pin spring 248A, 248B may be positioned within each spring-receiving cavity 213A, 213B. Corresponding spring-engaging fingers 249A, 249B of the spring-loaded locking pins 240A, 240B extend into the pin-facing, spring-receiving cavities 213A, 213B along a longitudinal axis of the pin-facing, spring-receiving cavities 213A, 213B. In this manner, the pin-facing, spring-receiving cavity 213A, 213B and the spring-engaging finger 249A, 249B of each spring-loaded locking pin 240A, 240B cooperate to help maintain the orientation of the spring-loaded locking pin 240A, 240B perpendicular to the battery insertion and removal axis 140 as the spring-loaded battery handle 230 moves between the locked position and the unlocked position.

As shown in FIG. 9, when the battery locking mechanism 220 is in the locked position, the grip portion 231 of the battery handle 230 may be flush with a top surface 218 of the battery body 210. Alternatively, as shown in FIGS. 9 and 10, when the battery locking mechanism is in the intermediate position or the unlocked position, respectively, the grip portion 231 extends above a top surface 218 of the battery body 210. In this manner, the grip portion 231 is accessible from an exterior of the battery body 210 to be gripped by a user to move the spring-loaded battery handle 230 toward the unlocked position and remove the removable battery assembly 200 from the battery receiving space 130. It is noted that the spring-loaded battery handle 230 may be considered to be "flush" with the top surface 218 of the battery body 210 when within an acceptable degree of tolerance, e.g., within approximately 0.2 mm to about 0.5 mm.

The spring-loaded battery handle 230 and the spring-loaded locking pin 240A, 240B are configured such that the handle cam surface 232A, 232B engages the pin cam surface 250A, 250B with movement of the battery handle 230, relative to the battery body 210, along the battery insertion and removal axis 140. More particularly, the spring-loaded battery handle 230 and the spring-loaded locking pin 240A, 240B engage at the handle cam surface 232A, 232B and the pin cam surface 250A, 250B such that movement of the battery handle 230 from the locked position to the unlocked position through the handle passage 217A, 217B in the handle lifting direction 255 causes movement of the locking pin extension 242A, 242B of the spring-loaded locking pin 240A, 240B through the locking pin passage 234A, 234B from an extended position, when the battery locking assembly 220 is in the locked position, to a retracted position, when the battery locking assembly 220 is in the unlocked position, along the latch engagement and disengagement axis 152A, 152B. As discussed herein, the battery body 210 constrains the spring-loaded battery handle 230 and the handle cam surface 232A, 232B to linear movement along the battery insertion and removal axis 140. Additionally, the battery body 210 constrains the spring-loaded locking pin 240A, 240B and thus the pin cam surface 250A, 250B to linear movement along a latch engagement and disengagement axis 152A, 152B that is perpendicular to the battery insertion and removal axis 140. In embodiments, either the front case 210A or the rear case 210B of the battery body 210 exclusively constrains the spring-loaded battery handle 230 and the handle cam surfaces 232A, 232B to linear movement along the battery insertion and removal axis 140.

As described herein, the spring-loaded battery handle 230 is spring-biased in the locked position by the handle springs 238A, 238B and is movable relative to the battery body 210 from the locked position to an unlocked position in the handle lifting direction 255 along the battery insertion and removal axis 140. Additionally, the spring-loaded locking pins 240A, 240B are also spring-biased by the locking pin springs 248A, 248B in the extended position and are movable relative to the battery body 210 from the extended position to the retracted position along the latch engagement and disengagement axis 152A, 152B in response to movement of the battery handle 230, relative to the battery body 210, in the handle lifting direction 255 with the handle cam surface 232A, 232B engaged with the pin cam surface 250A, 250B. However, it should be appreciated that the removable battery assembly 200 may include one of a handle spring 238A, 238B in direct contact with the spring-loaded battery handle 230 to bias the battery handle 230 toward the locked position, a locking pin spring 248A, 248B in direct contact with the spring-loaded locking pin 240A, 240B to bias the spring-loaded locking pin 240A, 240B toward the extended position, or both the handle spring 238A, 238B and the locking pin spring 248A, 248B.

This movement of the spring-loaded battery handle 230 in the handle lifting direction 255 forces movement of the spring-loaded locking pin 240A, 240B along the latch engagement and disengagement axis 140 because the respective planar handle cam surfaces 232A, 232B and the planar pin cam surfaces 250A, 250B are relatively low friction surfaces, which are slideably engaged, and which are constrained by the battery body 210 to move linearly along their respective axes of movement. In this manner, the pair of locking pins 240A, 240B will move simultaneously, in opposite directions, along the latch engagement and disengagement axis 152A, 152B, as the spring-loaded battery handle 230 moves between the locked position and the unlocked position.

It should be appreciated that the spring-loaded locking pin 240A, 240B is positioned at a point along a longitudinal dimension L, shown in FIG. 12, of the battery body 210 that results in locking pin engagement with the battery latch 150A, 150B simultaneously with engagement of an electrical socket 300, shown in FIG. 25, on the leading face 201 of the removable battery assembly 200 with an electrical connector 400 in the battery receiving space 130, as the removable battery assembly 200 is inserted into the battery receiving space 130, with the spring-loaded battery handle 230 in the locked position. The leading face 201 of the removable battery assembly 200 rests on a bottom surface 134 of the battery receiving space 130 with the spring-loaded locking pin 240A, 240B engaged with the battery latch 150A, 150B, and the electrical socket 300 engaged with the electrical connector 400. With the battery assembly and the battery receiving space 130 so designed, locking is not enabled until the electrical connections on the vehicle are properly seated in the electrical socket 300.

Referring now to FIGS. 11-14, in embodiments, the removable battery assembly 200 further comprises a pair of guide pin stabilizers 205A, 205A', 205B, 205B' on each of the lateral battery faces 202A, 202B. Each guide pin stabilizer 205A, 205A', 205B, 205B' comprises a stabilizer shank 206A that is anchored in the battery body 210 and a stabilizer cap 208A, 208B that extends partially into or partially over one of the guide channels of the longitudinal guide structure 204A, 204B to reduce an effective width of the guide channel.

As shown in FIG. 14, each pair of guide pin stabilizers 205A, 205A', 205B, 205B' forms a restricted-width guide pin gap G along the longitudinal guide structure 204A, 204B on each of the lateral battery faces 202A, 202B. The guiding pin 132A", 132B" of each opposing pair of guide pins 132A, 132B resides at a guiding pin parking position P along the longitudinal guide structure 204A, 204B on each of the lateral battery faces 202A, 202B, with the removable battery assembly 200 seated in the battery receiving space 130. The restricted-width guide pin gap G formed by each pair of guide pin stabilizers 205A, 205A', 205B, 205B' at least partially overlaps the guiding pin parking position P along the longitudinal guide structure 204A, 204B on each of the lateral battery faces 202A, 202B. The guiding pins 132A", 132B" have a diameter greater than a width of the restricted-width guide pin gap G. The guide pin stabilizers 205A, 205A', 205B, 205B' are configured to yield in a lateral yielding direction Y perpendicular to the battery insertion and removal axis 140, and to maintain a degree of lateral resilience, when a guiding pin 132A", 132B" enters the restricted-width guide pin gap G. FIG. 14 illustrates the lateral yielding direction Y for each guide pin stabilizer 205A, 205A', on one side of the battery body 210, e.g., on the lateral battery face 202A.

To facilitate the aforementioned resilient yielding action, each guide pin stabilizer 205A, 205A', 205B, 205B' should define a degree of structural flexibility and rigidity. In the embodiment illustrated in FIGS. 11 to 14, the aforementioned yielding action may be provided primarily where the shank 206A, 206B meets the cap 208A, 208B. To this end, each guide pin stabilizer 205A, 205A', 205B, 205B' may be formed as a unitary, one piece polyurethane structure with a shank 206A, 206B that is relatively thin, when compared to the lateral dimensions of the cap 208A, 208B. To reduce wear, the guide pin cap 208A, 208B, which would otherwise define a circular footprint, may comprise a truncated portion 209A, 209B, as shown in FIG. 14.

Referring now to FIGS. 15-18, in embodiments, the removable battery assembly 200 further comprises a pair of guide pin stabilizers 505A, 505A' on each of the lateral battery faces 202A, 202B, as opposed to the guide pin stabilizers 205A, 205A', 205B, 205B' discussed herein. Although only a pair of guide pin stabilizers 505A, 505A' are illustrated on the lateral battery face 202A, it should be appreciated that a pair of guide pin stabilizers are also provided on the other lateral battery face 202B. Each guide pin stabilizer 505A, 505A' can be secured to the battery body 210 with a fastener 506A and extends partially into or partially over one of the guide channels of the longitudinal guide structure 204A, 204B to reduce an effective width of the guide channel.

Figure 18:
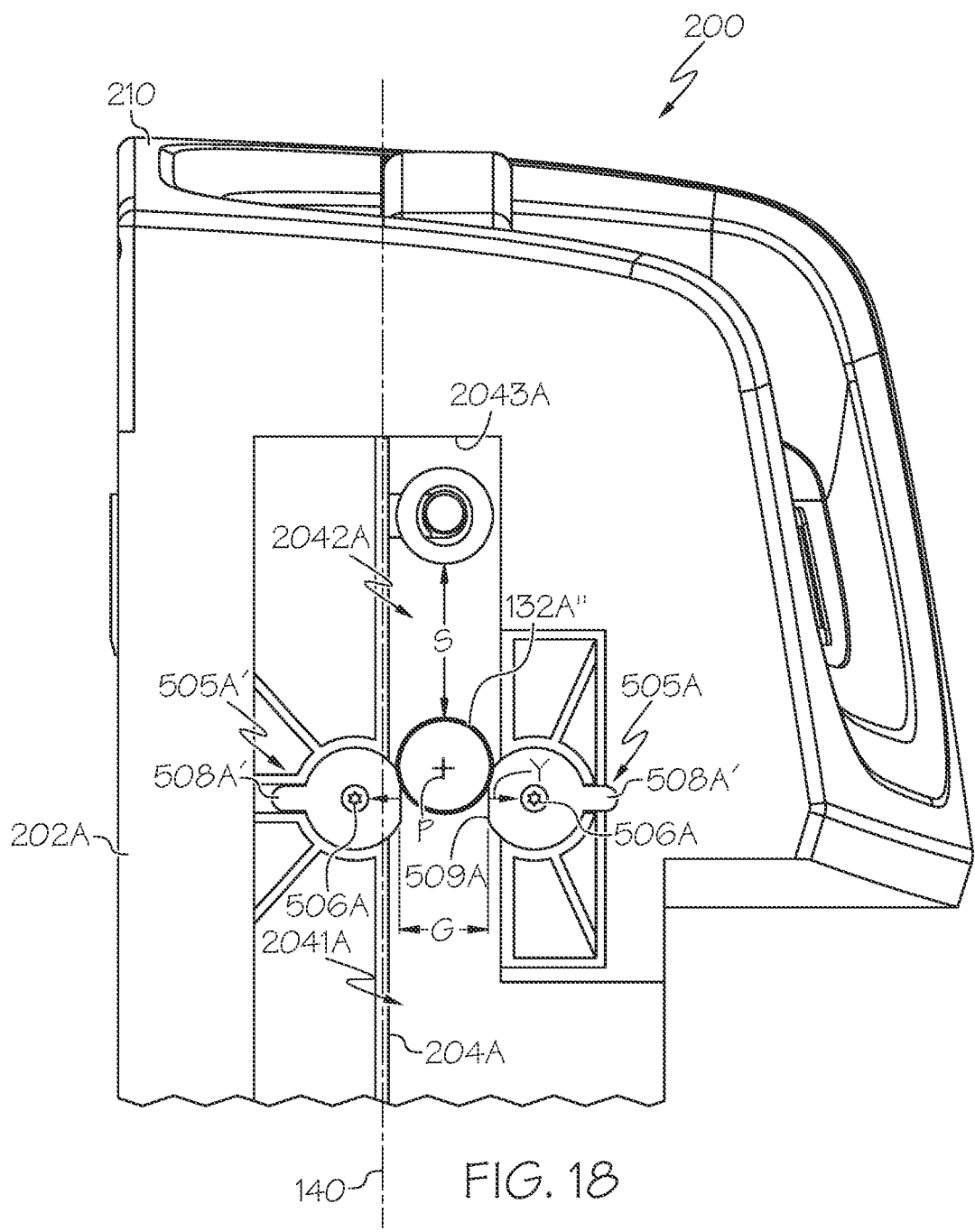
FIG. 18 schematically depicts a side view of the removable battery assembly of FIG. 15 received within the battery receiving space, according to one or more embodiments shown and described herein.

As shown in FIG. 18, each pair of guide pin stabilizers 505A, 505A' forms a restricted-width guide pin gap G along the longitudinal guide structure 204A, 204B on each of the lateral battery faces 202A, 202B. The guiding pin 132A", 132B" of each opposing pair of guide pins 132A. 132B resides at a guiding pin parking position P along the longitudinal guide structure 204A, 204B on each of the lateral battery faces 202A, 202B, with the removable battery assembly 200 seated in the battery receiving space 130. The restricted-width guide pin gap G formed by each pair of guide pin stabilizers 505A, 505A' at least partially overlaps the guiding pin parking position P along the longitudinal guide structure 204A, 204B on each of the lateral battery faces 202A, 202B. To reduce wear, the guide pin stabilizers 505A, 505A' which would otherwise define a circular footprint, may comprise the truncated portion 509A, as shown in FIG. 18. The guide pin stabilizers 505A, 505A', or at least a portion of the guide pin stabilizers 505A, 505A', are configured to yield in a lateral yielding direction Y perpendicular to the battery insertion and removal axis 140, and to maintain a degree of lateral resilience, when a guiding pin 132A", 132B" enters the restricted-width guide pin gap G. FIG. 18 illustrates the lateral yielding direction Y for each guide pin stabilizer 505A, 505A', on one side of the battery body 210, e.g., on the lateral battery face 202A. In this embodiment, "yield" may be used herein to refer to a partial compression of the guide pin stabilizers 505A, 505A' such that a truncated portion 509A of the guide pin stabilizers 505A, 505A' compresses by partially deforming in the lateral yielding direction Y as the guiding pin 132A", 132B" enters the restricted-width guide pin gap G.

To facilitate the aforementioned resilient yielding action, each guide pin stabilizer 505A, 505A' should define a degree of structural flexibility and rigidity, most advantageously at the truncated portion 509A of the guide pin stabilizers 505A, 505A'. To this end, each guide pin stabilizer 505A, 505A' may be formed as a unitary polyurethane structure. More particularly, the guide pin stabilizers 505A, 505A' may be formed from any suitable deformable, resilient material having a Shore A hardness between 50 Shore A and 90 Shore A. The guide pin stabilizers 505A. 505A' deform as pressure or a force is applied to one side of the guide pin stabilizers 505A, 505A' such as, for example, a force in the lateral yielding direction Y perpendicular to the battery insertion and removal axis 140 by contact with the guiding pin 132A", 132B". In embodiments, the guide pin stabilizers 505A, 505A' may have a Shore A hardness between 50 Shore A and 70 Shore A. In other embodiments, the guide pin stabilizers 505A, 505A' may have a Shore A hardness between 60 Shore A and 80 Shore A. In still further embodiments, the guide pin stabilizers 505A, 505A' may have a Shore A hardness between 70 Shore A and 90 Shore A.

Figure 16:
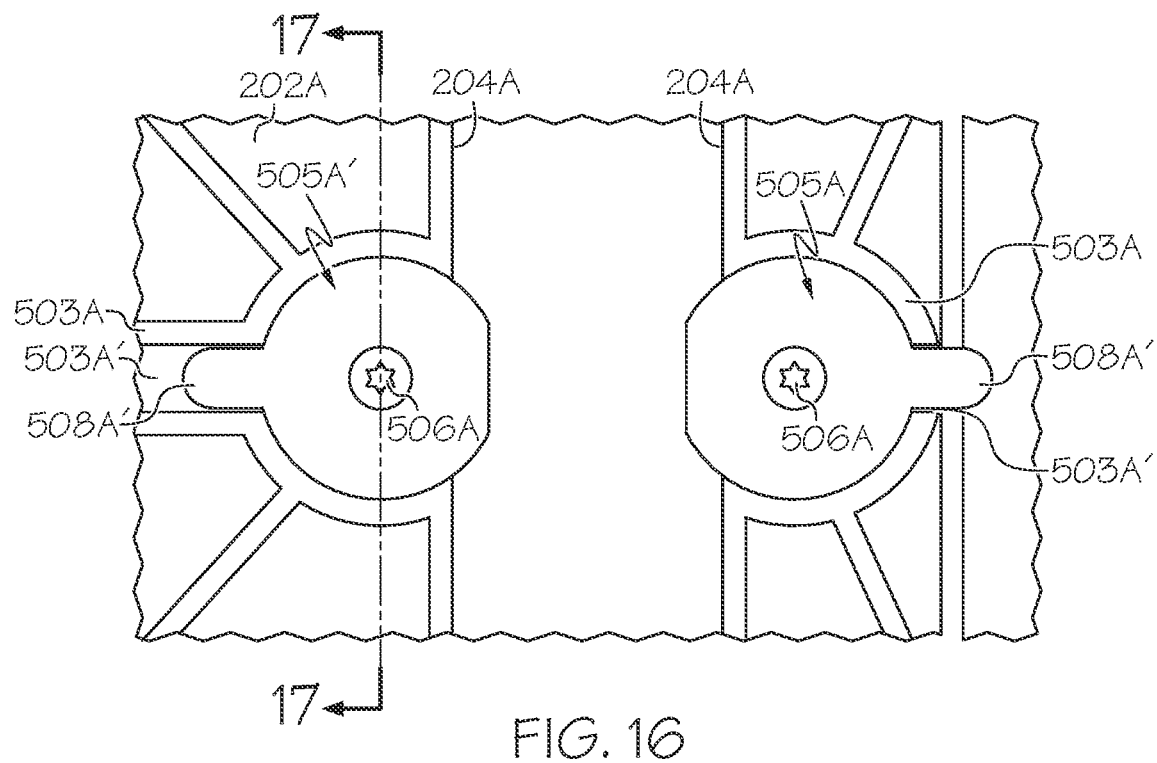
FIG. 16 schematically depicts an enlarged view of the removable battery assembly of FIG. 15 including the pair of guide pin stabilizers, according to one or more embodiments shown and described herein.

As shown in FIG. 16, the longitudinal guide structure 204A of the lateral battery face 202A comprises raised tracks 503A that receive the guide pin stabilizers 505A, 505A'. Although not shown, it should be appreciated that the lateral battery face 202B similarly comprises raised tracks that receive the other pair of guide pin stabilizers. The raised tracks 503A define a slot 503A' for receiving an alignment feature 508A' extending from the guide pin stabilizers 505A, 505A'. As shown in FIG. 16, the alignment feature 508A' of each guide pin stabilizer 505A, 505A' is received within a corresponding slot 503A' to facilitate installation of the guide pin stabilizers 505A, 505A' in the proper orientation, and to help prevent the guide pin stabilizers 505A, 505A' from rotating relative to the lateral battery face 202A.

Figure 17:
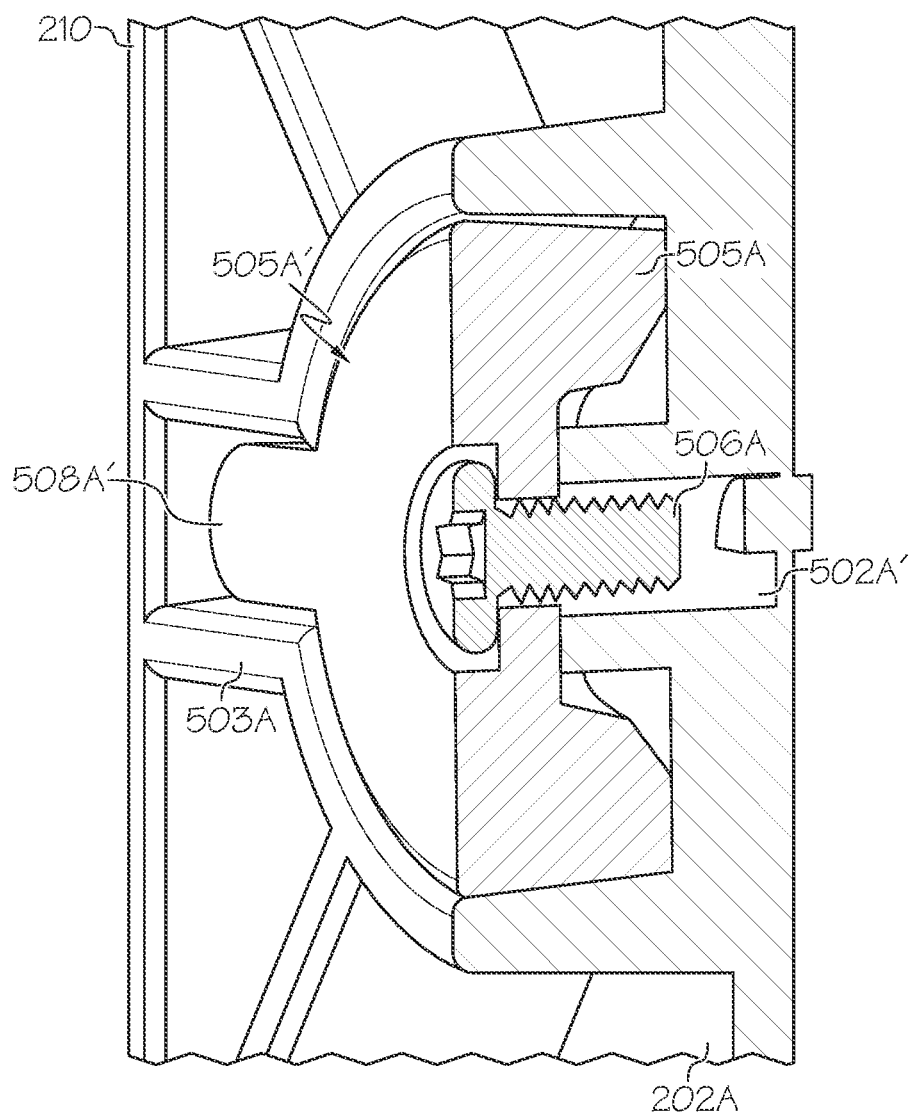
FIG. 17 schematically depicts a partial cross-section view of the removable battery assembly of FIG. 15 taken along line 17-17, according to one or more embodiments shown and described herein.

As shown in FIG. 17, a cross-section view of the guide pin stabilizer 505A' is shown illustrating the fastener 506A extending through the guide pin stabilizers 505A' and received within a channel 502A' formed in the battery face 202A. The fastener 506A may be a rigid member extending through the guide pin stabilizer 505A' and including external threads configured to threadedly engage with internal threads formed in the channel 502A'. The fastener 506A is formed from a material having a hardness greater than a hardness of the guide pin stabilizer 505A'. In use, the guide pin stabilizers 505A, 505A' may be positioned to be received within the raised tracks 503A and the slot 503A' and, subsequently, the fastener 506A engages the battery face 202A to secure the guide pin stabilizers 505A, 505A'. The alignment feature 508A' of the guide pin stabilizers 505A, 505A' prevents rotation of the guide pin stabilizers 505A, 505A' as the fastener 506A rotates to engage the battery face 202A. In other embodiments, the guide pin stabilizers 505A, 505A' may be secured to the battery face 202A using an adhesive or other suitable fastening member other than a mechanical fastener such as the fastener 506A.

Referring now to FIGS. 19-22, in embodiments, the battery receiving space 130 comprises opposing guide blocks 160A, 160B, each arranged on opposite sides of the battery receiving space 130. Each opposing guide block 160A, 160B is positioned along the battery insertion and removal axis 140 to engage the channel shoulder 2043A, 2043B of one of the longitudinal guide structures 204A, 204B with the removable battery assembly 200 seated in the battery receiving space 130 and the leading portions 245A, 245B of the pair of spring-loaded locking pins 237A, 237B received within the pair of battery latches 150A, 150B.

Each opposing guide block 160A, 160B comprises a securement portion 162A, 162B and a replaceable portion 164A, 164B. The securement portion 162A, 162B of each guide block 160A, 160B is secured to the materials handling vehicle 100. The replaceable portion 164A, 164B of each guide block 160A, 160B is seated within the securement portion 162A, 162B, and is removable from the securement portion 162A, 162B without destruction of the securement portion 162A, 162B. The securement portion 162A, 162B of each guide block 160A, 160B is configured as a bracket from which the replaceable portion 164A, 164B of each guide block 160A, 160B extends to define friction-inducing surfaces 166A, 166B and guiding surfaces 168A, 168B, as discussed herein. In this manner, the replaceable portion 164A, 164B of each guide block 160A. 160B can be removed and replaced many times over the lifetime of the materials handling vehicle 100. In particular embodiments, the replaceable portion 164A, 164B may be fabricated from, a machined polyurethane block and may be fastened to the securement portion 162A, 162B, or press fit into a space formed by the securement portion 162A, 162B. The securement portion 162A. 162B may be fabricated from stamped steel or other metal, and can be secured to the materials handling vehicle 100 in a variety of ways. e.g., by welding it to an interior housing 135 of the battery receiving space 130, or by using fasteners to secure it to the interior housing, or another component of the materials handling vehicle.

The replaceable portion 164A, 164B of each guide block 160A, 160B comprises a lower surface hardness and higher surface friction, relative to the securement portion 162A, 162B. As noted above, the replaceable portion 164A, 164B of each guide block 160A, 160B comprises a friction-inducing surface 166A, 166B and a guiding surface 168A, 168B. The friction-inducing surface 166A, 166B and the guiding surface 168A, 168B of each replaceable portion 164A, 164B of each guide block 160A, 160B face an opposing surface 207A, 207B of the removable battery assembly 200 or the longitudinal guide structure 204A, 204B without interference from the securement portions 162A, 162B of each guide block 160A, 160B, with the removable battery assembly 200 seated in the battery receiving space 130. The replaceable portion 164A, 164B of each guide block 160A, 160B may comprise a chamfered leading portion 165A, 165B.

Each friction-inducing surface 166A, 166B extends along the battery insertion and removal axis 140, parallel to and facing an opposing one of the lateral battery faces 202A, 202B, with the removable battery assembly 200 seated in the battery receiving space 130. More particularly, the friction-inducing surface 166A, 166B of each replaceable portion 164A, 164B of each guide block 160A, 160B extends discontinuously in a direction Z along the battery insertion and removal axis 140 and faces the opposing lateral battery face 202A, 202B in a perpendicular direction X, with the removable battery assembly 200 seated in the battery receiving space 130. The friction-inducing surfaces 166A, 166B of each replaceable portion 164A, 164B of each guide block 160A, 160B are raised, relative to the securement portions 162A, 162B and remaining portions of the replaceable portions 164A, 164B of each guide block 160A, 160B, in the direction of the opposing lateral battery faces 202A, 202B. The friction-inducing surfaces 166A, 166B of each replaceable portion 164A, 164B of each guide block 160A, 160B comprise a series of friction-inducing ridges oriented across the battery insertion and removal axis 140.

Each guiding surface 168A, 168B extends along the battery insertion and removal axis 140, perpendicular to the lateral battery faces 202A, 202B and facing an opposing surface 207A, 207B of the longitudinal guide structure 204A, 204B, with the removable battery assembly 200 seated in the battery receiving space 130. More particularly, the guiding surface 168A, 168B of each replaceable portion 164A, 164B of each guide block 160A, 160B extends continuously in the direction Z and faces the opposing surface 207A, 207B of the longitudinal guide structure 204A, 204B in a perpendicular direction Y, with the removable battery assembly 200 seated in the battery receiving space 130.

The aforementioned discontinuities in the friction-inducing surfaces 166A, 166B of the guide blocks 160A, 160B create surfaces that will more readily resist overly rapid insertion of the removable battery assembly 200 into the battery receiving space 130. Conversely, the aforementioned continuity in the guiding surfaces of the guide blocks 160A, 160B create surfaces that will more readily guide movement of the removable battery assembly 200 as it is inserted/removed, without undue resistance.

Figure 19:
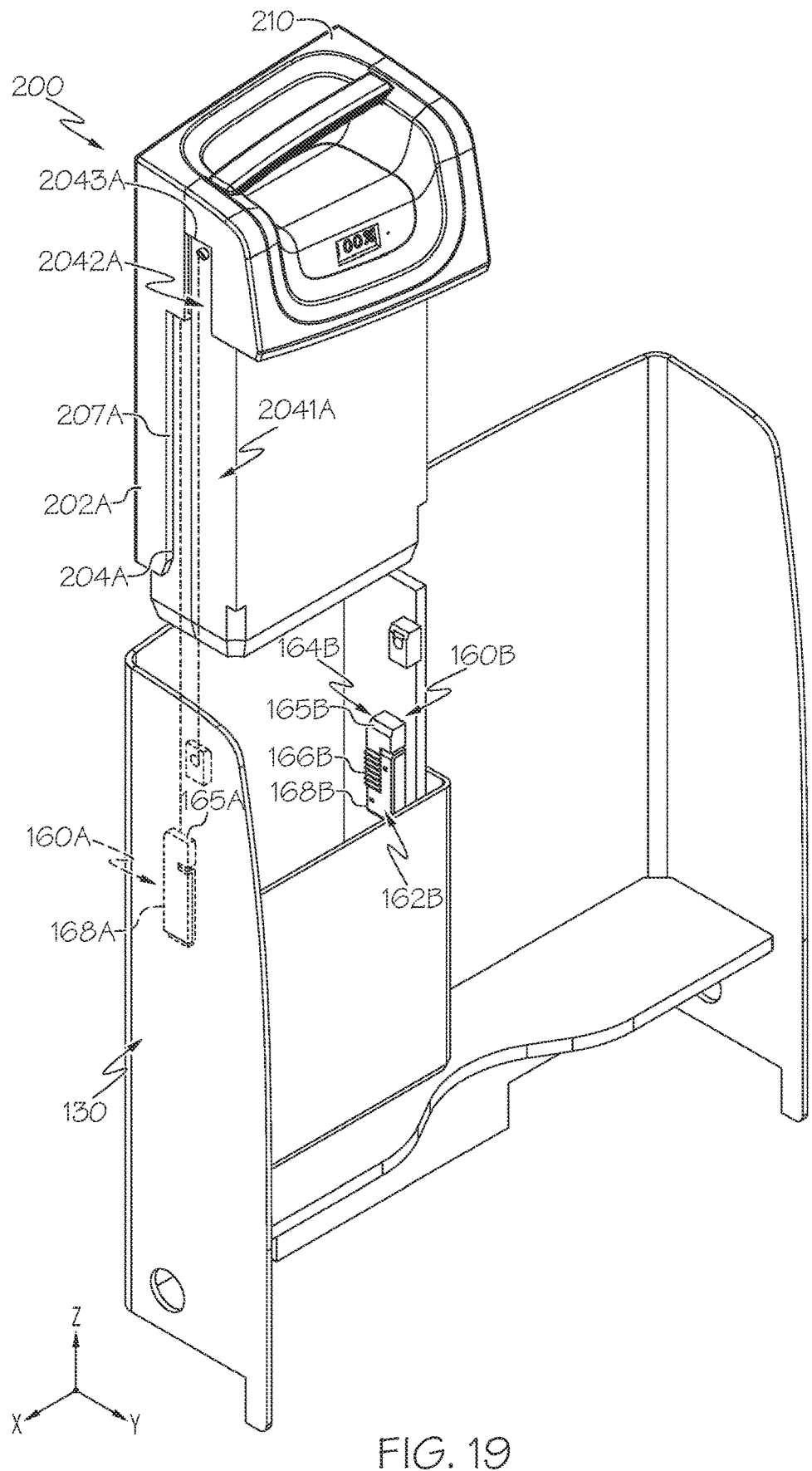
FIG. 19 schematically depicts a perspective view of another embodiment of a removable battery assembly being inserted into the battery receiving space including a guide block, according to one or more embodiments shown and described herein.
Figure 20:
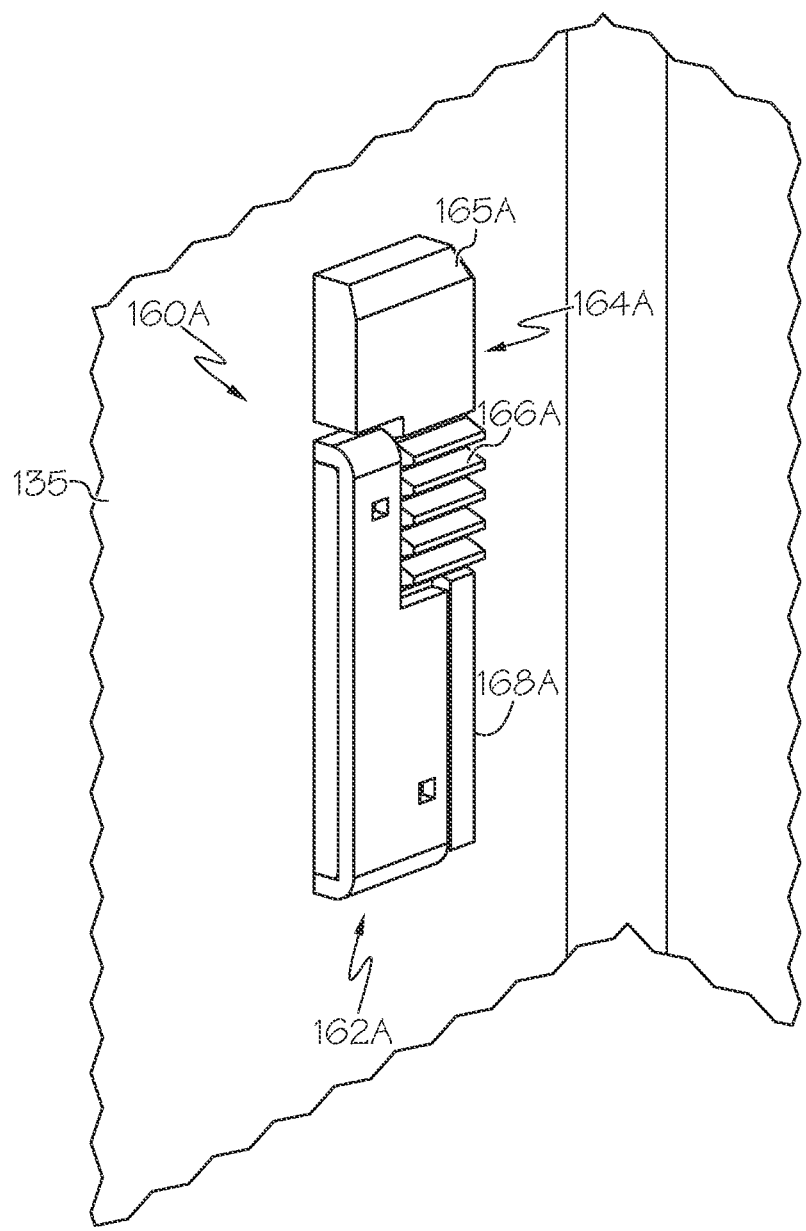
FIG. 20 schematically depicts a perspective view of the guide block of FIG. 19, according to one or more embodiments shown and described herein.
Figure 21:
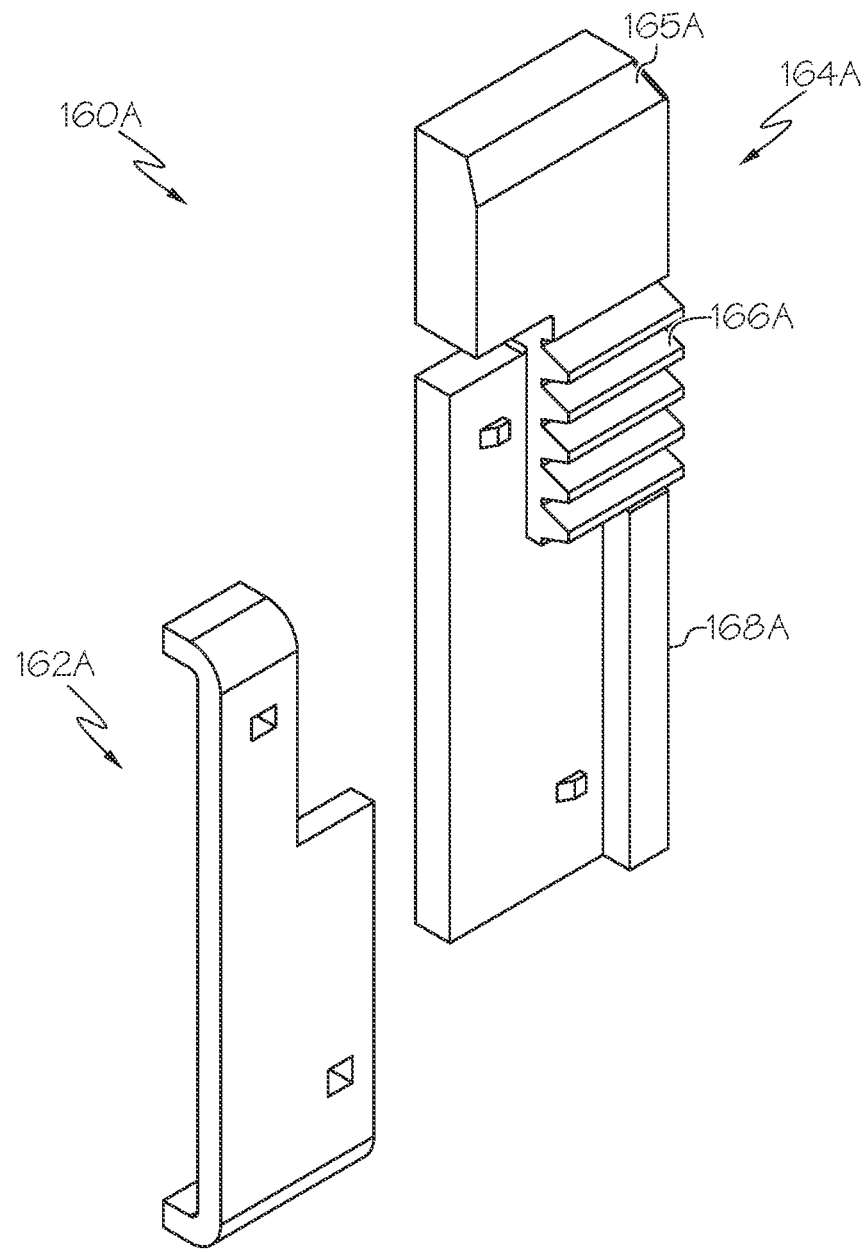
FIG. 21 schematically depicts an exploded perspective view of the guide block of FIG. 19, according to one or more embodiments shown and described herein.

As shown in FIG. 19, in embodiments, the longitudinal guide structure 204A of the lateral battery face 202A may be configured as a stepped guide channel comprising a one-sided channel portion 2041A that transitions to a two-sided channel portion 2042A at a channel shoulder 2043A. The chamfered leading portion 165A faces the channel shoulder 2043A in the longitudinal guide structure 204A. Although not shown, a stepped guide channel may be formed on both lateral battery faces 202A, 202B.

By configuring the replaceable portion of each guide block 160A, 160B in this manner, the replaceable portions 164A, 164B of each guide block 160A, 160B functionally optimize the sliding contact that occurs between the battery assembly 200 and the battery receiving space 130 as the battery assembly 200 is inserted into and removed from the battery receiving space 130, while extending the life of the removable battery assembly 200 and minimizing wear to the components of the battery receiving space 130. During insertion in particular, the guide blocks 160A, 160B help limit excessively rapid insertion of the removable battery assembly 200 into the battery receiving space 130.

Figure 22:
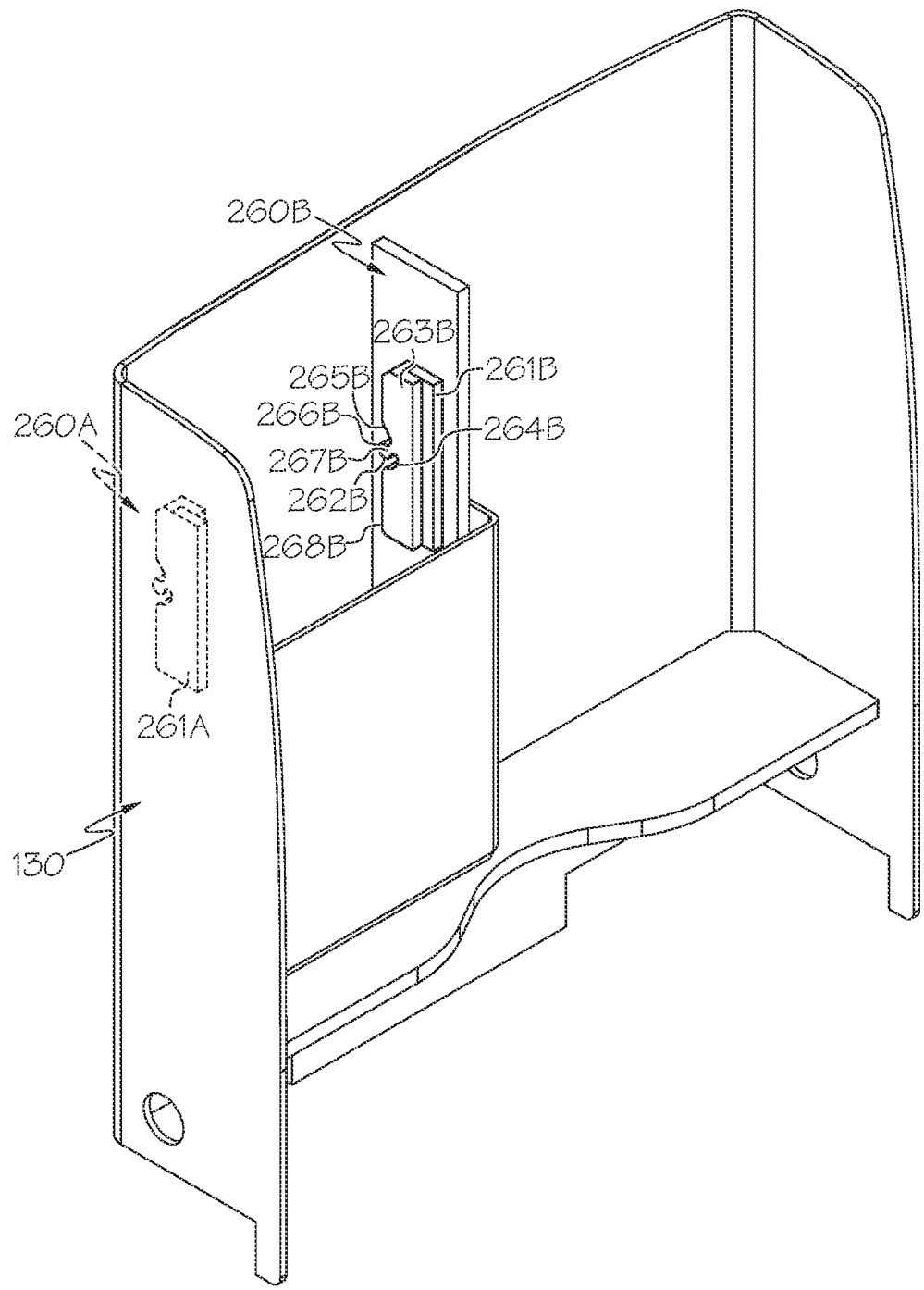
FIG. 22 schematically depicts a perspective view of the battery receiving space including a pair of retention blocks, according to one or more embodiments shown and described herein.
Figure 23:
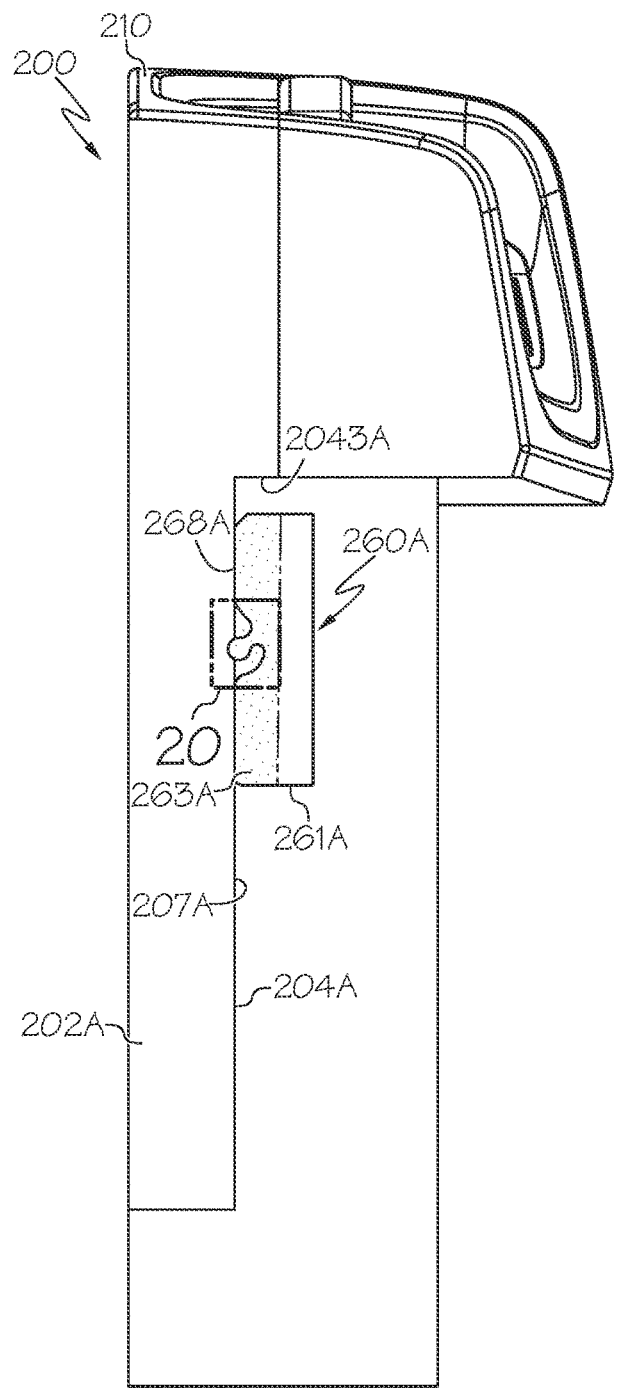
FIG. 23 schematically depicts a side view of one of the retention blocks engaging the removable battery assembly, according to one or more embodiments shown and described herein.
Figure 24:
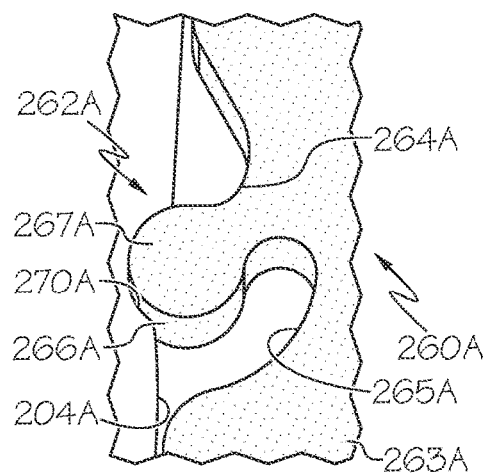
FIG. 24 schematically depicts an enlarged side view of the retention block of FIG. 22, according to one or more embodiments shown and described herein.

Referring now to FIGS. 22-24, in embodiments, the battery receiving space 130 comprises opposing retention blocks 260A, 260B. Each retention block 260A, 260B is arranged on opposite sides of the battery receiving space 130. Each retention block 260A, 260B may comprise a metal backing plate 261A, 261B and a plastic retention lever plate 263A, 263B. Although each retention block 260A, 260B illustrated in FIG. 22 is presented as a two-piece assembly comprising a backing plate 261A, 261B fabricated from a relatively high strength and rigid metal, and a separate lever plate 263A, 263B fabricated from a material that is flexible enough to facilitate the formation of a functional retention lever, as described herein, it is contemplated that the suitable plastics and other relatively flexible materials with sufficient strength may be used to fabricate a monolithic retention block.

Each retention block 260A, 260B comprises a retention lever 262A, 262B comprising a fixed end 264A, 264B and a distal end 266A, 266B. The distal end 266A, 266B of each retention lever 262A, 262B comprises a terminal lobe 267A, 267B.

In embodiments, each longitudinal guide structure 204A, 204B of the lateral battery faces 202A, 202B comprises a one-sided channel portion 2041A, 2041B that comprises the opposing surface 207A, 207B facing the guiding surface 268A, 268B of the retention block 260A, 260B, with the removable battery assembly 200 seated in the battery receiving space 130. As shown in FIG. 23, the one-sided channel portion 2041A, 2041B terminates in a channel shoulder 2043A, 2043B of the longitudinal guide structure 204A, 204B. Each guide block 160A, 160B may comprise a chamfered leading portion 165A, 165B that faces the channel shoulder 2043A, 2043B of the longitudinal guide structure 204A, 204B, with the removable battery assembly 200 seated in the battery receiving space 130.

In embodiments, the longitudinal guide structure 204A, 204B of each lateral battery face 202A, 202B comprises a lever-receiving detent 270A that is configured to receive the distal end 266A, 266B of one of the retention levers 262A, 262B, with the removable battery assembly 200 seated in the battery receiving space 130. Each retention lever 262A, 262B is configured to lie in a state of flexion when received in the lever-receiving detent 270A of the longitudinal guide structure 204A, 204B. More particularly, each retention lever 262A, 262B is positioned such that each of the lever-receiving detents 270A receives a distal end 266A, 266B of one of the retention levers 262A, 262B simultaneously with engagement of the electrical socket 300 on the leading face 201 of the removable battery assembly 200 with the electrical connector 400 in the battery receiving space 130, as the removable battery assembly 200 is inserted into the battery receiving space 130. In embodiments, the lever-receiving detent 270A and the terminal lobe 267A, 267B define mating rounded profiles.

Each retention block 260A, 260B comprises a planar guiding surface 268A, 268B facing an opposing surface 207A, 207B of the longitudinal guide structure 204A, 204B. The planar guiding surface 268A, 268B of the retention block 260A, 260B comprises a retention lever recess 265A, 265B. The fixed end 264A, 264B of each retention lever 262A, 262B is positioned in the retention lever recess 265A, 265B to avoid contact with the opposing surface 207A, 207B of the longitudinal guide structure 204A, 204B. Accordingly, each retention lever 262A, 262B is configured for increased flexion as it moves progressively towards the retention lever recess 265A, 265B.

Although the retention lever recess illustrated in FIG. 22 is defined by upper and lower arcuate surfaces, it is contemplated that the retention levers 262A, 262B, and the associated retention lever recesses 265A, 265B, according to the present disclosure may be formed in a variety of ways including, for example, by utilizing planar surfaces to form the retention levers 262A, 262B and the retention lever recesses 265A, 265B.

Referring to FIGS. 25-29, as is noted above, the removable battery assembly 200 and the battery receiving space 130 cooperate to define a battery insertion and removal axis 140 along which the removable battery assembly 200 is inserted into and removed from the battery receiving space 130. The removable battery assembly 200 comprises a battery body 210, a leading face 201, an electrical socket 300 on the leading face 201 of the removable battery assembly 200, and a battery locking mechanism 220.

The battery receiving space 130 comprises an electrical connector 400 that complements the electrical socket 300 of the removable battery assembly 200, and a battery latch 150A, 150B that engages the battery locking mechanism 220 simultaneously with engagement of the electrical socket 300 on the leading face 201 of the removable battery assembly 200 with the electrical connector 400 in the battery receiving space 130, as the removable battery assembly 200 is inserted into the battery receiving space 130.

The leading face 201 of the removable battery assembly 200 rests on a bottom surface 134 of the battery receiving space 130 with the battery locking mechanism 22 engaged with the battery latch 150A, 150B, and with the electrical socket 300 engaged with the electrical connector 400. The electrical socket 300 may be recessed on the leading face 201 of the removable battery assembly 200.

The electrical socket 300, the electrical connector 400, the battery body 210, and the battery receiving space 130 are configured to define a standoff gap 414 extending along the battery insertion and removal axis 140 between opposing surfaces 416, 418 of the electrical socket 300 and the electrical connector 400, with the leading face 201 of the removable battery assembly 200 resting on the bottom surface 134 of the battery receiving space 130. A reliable electrical connection can be maintained between the electrical socket 300 and the electrical connector 400, even after repeated insertion and removal of the battery assembly 200, by maintaining this standoff gap 414, and by ensuring that the leading face 201 of the removable battery assembly 200 rests on the bottom surface 134 of the battery receiving space 130, under the weight of the battery assembly 200. This is possible because the relatively sturdy and physically substantial leading face 201 of the removable battery assembly 200 and bottom surface 134 of the battery receiving space 130 oppose further engagement of the mating connector components under the weight of the battery, instead of components of the less substantial electrical socket 300 and the electrical connector 400.

The aforementioned reliable electrical connection across the electrical socket 300 and the electrical connector 400 is particularly significant in the context of materials handling vehicles where significant data is transferred back and forth across the connection. This data may include, for example, general CAN bus data that is transmitted between a "smart" battery controller and one or more of the vehicle controllers, data representing vehicle or battery errors, command data, and, display data, for embodiments where the battery assembly 200 includes a battery display. Each of these types of data transmission require a stable and reliable electrical connection across the electrical socket 300 and the electrical connector 400 for proper vehicle operation.

In some embodiments, to enhance the aforementioned insertion and removal operations, the electrical connector 400 in the battery receiving space 130 may comprise a connector housing 410 comprising an outer wall 412 that is tapered to a reduced-size footprint as it extends away from the bottom surface 134 of the battery receiving space 130. Similarly, the electrical socket 300 on the leading face 201 of the removable battery assembly 200 comprises a socket housing 310 comprising an inner wall 312 that is tapered to an increased-size footprint as it extends away from the leading face 201 of the removable battery assembly. The inner wall 312 that is tapered to complement and contact the taper of the outer wall 412 of the connector housing 410 with the leading face 201 of the removable battery assembly 200 resting on the bottom surface 134 of the battery receiving space 130, and with the standoff gap 414 between opposing surfaces 416, 418 of the electrical socket 300 and the electrical connector 400.

The opposing surfaces 416, 418 of the electrical socket 300 and the electrical connector 400 are horizontally oriented opposing surfaces that are perpendicular to the battery insertion and removal axis 140 and are spaced apart by the standoff gap 414. Preferably, either the standoff gap 414, or a gap larger than the standoff gap 414, is maintained between substantially all horizontally oriented opposing surfaces of the electrical socket 300 and the electrical connector 400. In some embodiments, it may be preferable to ensure that the standoff gap 414 is at least about 0.2 mm. In more particular embodiments, the standoff gap 414 is between about 0.2 mm and about 1.7 mm.

The battery-side electrical socket 300 can be recessed in the leading face 201 of the battery assembly 200 with a socket housing 310. In this manner, the battery assembly 200 may be removed from the battery receiving space 130 and placed, leading face 201 down, on a warehouse floor or other surface, without causing damage to, or receiving interference from, the electrical socket 300. The vehicle-side electrical connector 400 can be configured to complement the battery-side electrical socket 300 by projecting upwardly from the bottom surface 134 of the battery receiving space 130 with a connector housing 410.

The battery-side electrical socket 300 may comprise a rim portion 315 that is enclosed by the socket housing 310 and extends generally parallel to the leading face 201 of the battery assembly. Similarly, the vehicle-side electrical connector 400 may comprise a shoulder portion 415 that is enclosed by the connector housing 410 and extends generally parallel to the bottom surface 134 of the battery receiving space 130. The rim portion 315 of the battery-side electrical socket extends parallel to the shoulder portion 415 of the vehicle-side electrical connector 400, with the removable battery assembly 200 seated in the battery receiving space 130, and is spaced from the shoulder portion 415 by the standoff gap 414.

The electrical socket 300 may comprise a set of electrically conductive pin receptacles 320 and the electrical connector 400 may comprise a set of complementary electrically conductive connector pins 420, or vice-versa. An outermost portion of the standoff gap 414 can be configured to surround the set of electrically conductive pin receptacles 320 and the set of complementary electrically conductive connector pins 420, with the leading face 201 of the removable battery assembly 200 resting on the bottom surface 134 of the battery receiving space 130, and with the a set of electrically conductive pin receptacles 320 engaging the set of complementary electrically conductive connector pins 420.

The socket housing 310 of the electrical socket 300 and the connector housing 410 of the electrical connector cooperate to enclose the set of electrically conductive pin receptacles 320 and the set of complementary electrically conductive connector pins 420 to form a protective barrier between the outermost portion of the standoff gap 414 and the engaged sets of pin receptacles and connector pins, with the leading face 201 of the removable battery assembly 200 resting on the bottom surface 134 of the battery receiving space 130.

Figure 30:
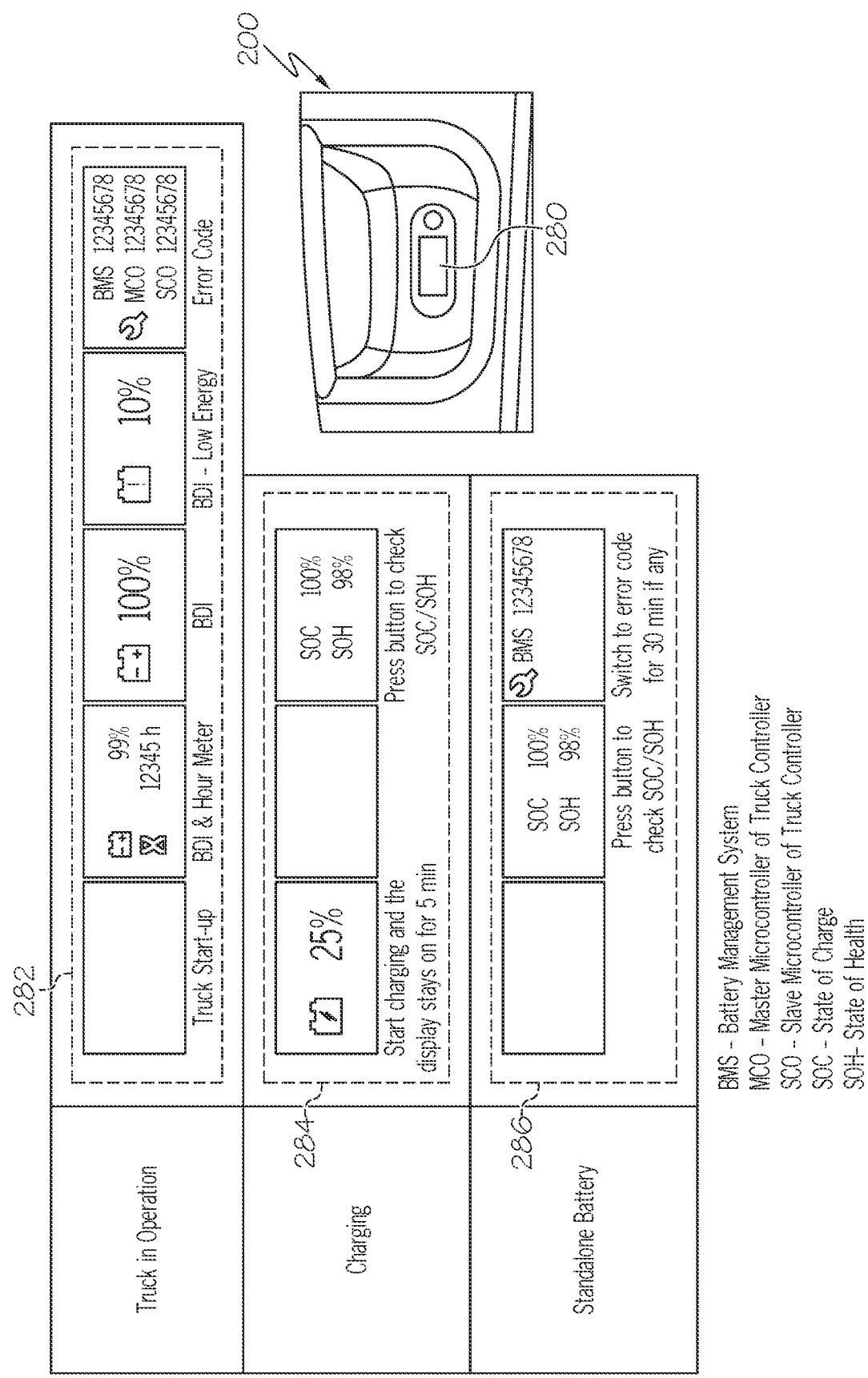
FIG. 30 schematically depicts a plurality of display screens to be displayed on a battery display of the removable battery assembly, according to one or more embodiments shown and described herein.

FIG. 30 depicts a plurality of display screens that may be displayed on an on board battery display 280 of the removable battery assembly 200. Battery errors such as, for example, communication errors, input/output errors, and/or battery errors, may be detected, as discussed in more detail herein, and an associated error message may be displayed on the battery display 280 to alert an operator. Further, a status of the charge of the intelligent battery may be shown on the battery display 280 when coupled to or removed from the materials handling vehicle 100. As such, the battery display 280 may be configured to show one or more operation status display screens 282, one or more charging status display screens 284, one or more standalone battery screens 286, and/or one or more error display screens associated with each status. Operation status may illustrate a vehicle start-up display, such as a logo, a vehicle standby display including battery charge and vehicle run life, or a blinking display when the battery charge is under a threshold, such as 10%, such that a low energy icon may blink to indicate need to charge the battery. Charging status may illustrate a logo icon upon charging initiation and a charging icon that may blink upon the battery being charged. An error status may illustrate vehicle and battery error event codes detected.

As a result, the battery display 280 may thus provide a joint display of battery information and vehicle information on the removable battery assembly 200 when the removable battery assembly 200 is connected to the vehicle 100. A joint display is advantageous when using a battery that may be reused across a plurality of vehicles to show joint battery and vehicle information at a single location on the removable battery assembly 200 when the removable battery assembly 200 is connected to a specific vehicle.

Figure 31:
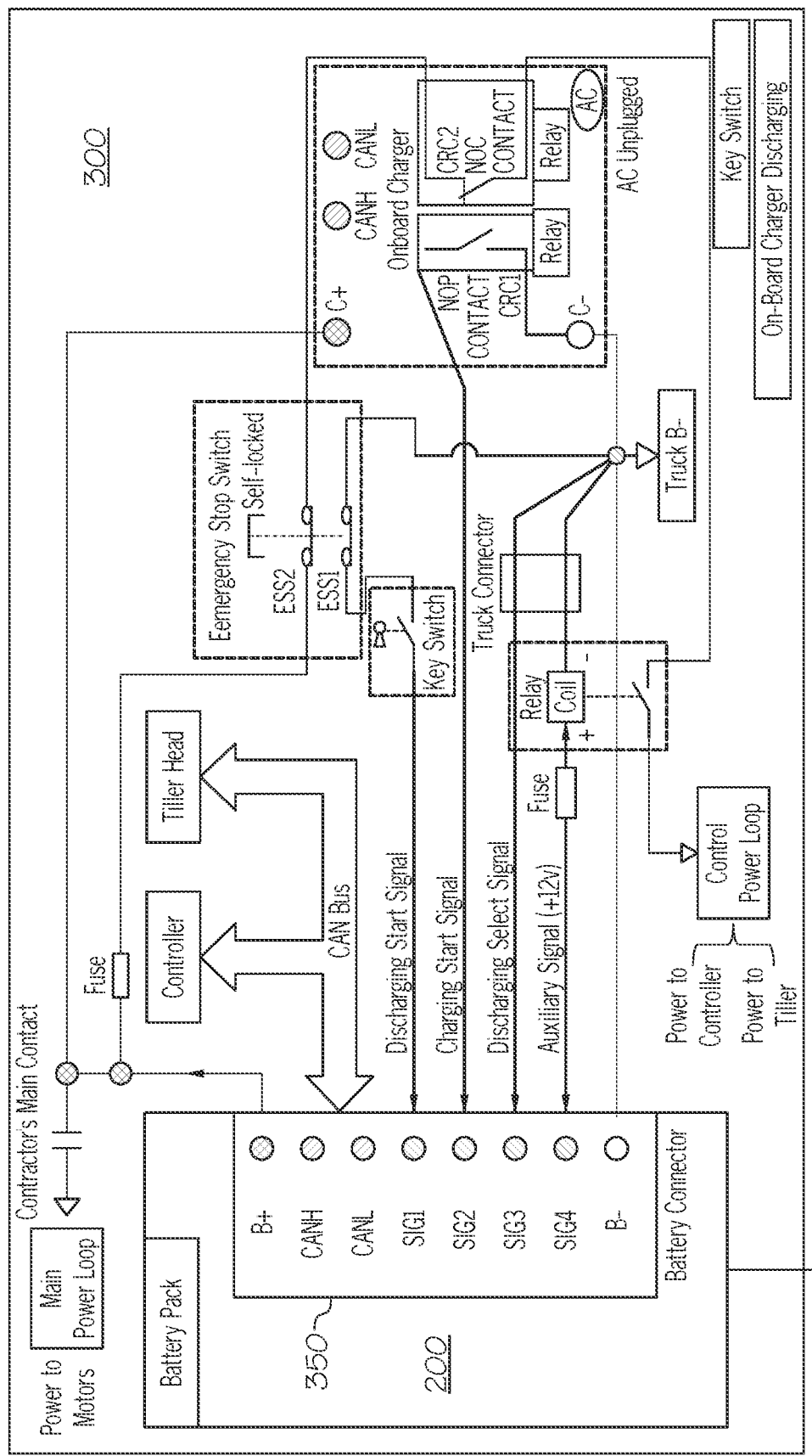
FIG. 31 schematically depicts a circuit schematic illustrating complementary socket/connector pin assignments for the battery coupling of a battery powered materials handling vehicle, according to one or more embodiments shown and described herein.

FIG. 31 is a circuit schematic illustrating complementary socket/connector pin assignments for the battery coupling 350 of a battery powered materials handling vehicle 100 comprising a removable battery assembly 200, according to embodiments of the present disclosure. In some embodiments, the set of electrically conductive pin receptacles 320 and the set of complementary electrically conductive connector pins 420 may be presented in the form of an eight pin configuration comprising, for example:

positive and negative battery terminals B+/B−,
a CANH signal pin for a CAN Bus High Signal,
a CANL signal pin for a CAN Bus Low Signal,
a SIG1 signal pin for a battery discharge start signal,
a SIG2 signal pin for a battery charge start signal,
a SIG3 signal pin for a discharge select signal, and
a SIG4 signal pin for an Auxiliary Signal.

In this manner, a discharge select signal can be initiated across the SIG3 signal pin by accessing, for example, a key switch, keypad, or RFID reader on the vehicle.

Referring further to the schematic of FIG. 31, it is noted that an emergency stop switch may be present and configured to stop providing power upon, for example, detection of one or more vehicle or battery errors as communicated between the CAN bus and the battery assembly 200. It is further contemplated that the battery assembly 200 may receive a charging signal when connected to an AC charger and may be configured to check the charger CAN communication to detect any errors such that the battery may prevent charging should an error be detected until the error is corrected. If no error is detected, the battery may then be ready for charging. The battery may send out a charging request current to the charger via the CAN bus connection. The charger would receive the charging request current and transit the requested charging current to the battery. When the battery state of charge (SOC) reaches 100%, the battery may set the charging request current to zero to send out to the charger via the CAN bus to stop charging the battery.

In the embodiment of FIG. 31, a key switch feature is shown along with an on-board charger discharging scheme in which an on-board charger is configured to charge the battery assembly 200 as described above. In another embodiment of an external charger discharging scheme, the on-board charger may not be present, the SIG2 signal pin may be disconnected, and the battery assembly 200 may operate to be charged by an external charger.

In yet another embodiment, a keypad and/or RFID component feature may be included as part of the circuit diagram for selection rather than the key switch feature. Similar to the embodiment of FIG. 31 showing an on-board charger discharging scheme, the keypad and/or RFID component feature may replace the key switch feature between the SIG1 signal pin and the negative battery terminal of the materials handling vehicle. In an embodiment with the keypad and/or RFID component feature and for an external charger discharging scheme, the on-board charger may not be present, the SIG2 signal pin may be disconnected, and the battery assembly 200 may operate to be charged by an external charger.

The removable battery assembly 200 comprises an on board battery display 280 and battery controller 290, both of which reside with the removable battery assembly 200 and communicate with the vehicle side electronics via the battery coupling 350, which comprises the battery-side electrical socket 300 of the battery assembly 200 and the vehicle-side electrical connector 400. The battery controller 290 of the battery assembly 200 is configured to exchange information with a vehicle controller 170 across the battery coupling, which includes the multi-pin configuration described above.

The battery controller 290 may include a printed/protection circuit board (PCB) including a battery management system (BMS) as an intelligent battery feature. The BMS may provide battery information to the battery as well as to the vehicle when the battery is electrically coupled to the vehicle to safely manage the battery and prolong battery life. The vehicle controller 170 may provide vehicle information (speed, vehicle running hours such as over the life of the vehicle, vehicle errors, etc.) to the battery display 280, which is communicatively coupled to the PCB when the battery 200 is coupled to the vehicle 100 via the battery coupling 350. Such errors may include errors indicated by a vehicle safety standard, as indicated via the vehicle controller 170, such as communication errors, input/output errors, and/or battery errors. The vehicle errors may be associated with vehicle fault codes such as warning errors that warn of an error without affecting vehicle operation and alarm errors that result in the vehicle controller 170 taking an action based on the error. The vehicle controller 170 may transmit vehicle information to the BMS via the CAN bus, and the BMS may transmit this information to the battery display via an internal circuit of the BMS.

Battery errors, such as those discussed herein with reference to FIG. 30, may be transmitted to the vehicle controller 170 for the vehicle controller 170 to take an action, e.g., limiting vehicle speed based on a battery error, to avoid further influence of the battery error on vehicle operation. The vehicle controller 170 may also report these errors for display on the battery display 280. The vehicle controller 170 may further detect a CAN communication error from the battery 200 and send out an associated error message to the battery 200 for display on the battery display 280.

It should be appreciated that the display of vehicle and battery information on a battery display 280 is enabled by the reliable electrical coupling that occurs across the battery coupling 350, which coupling ensures reliable transmission of vehicle information to the battery display 280. Components of the battery assembly 200, including components of the battery-side electrical socket 300, and portions of the battery body 210, and the battery receiving space 130, as described above are designed to include tapered engagement surfaces that become progressively more engaged under weight of the battery assembly 200.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the terms "about" and "approximately" are utilized herein to represent the inherent degree of uncertainty that may be attributed to any quantitative comparison, value, measurement, or other representation. The terms "about" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A materials handling vehicle comprising a materials handling mechanism, a drive mechanism, a battery receiving space, and a removable battery assembly, wherein:
   the materials handling mechanism is configured to engage goods in a warehouse environment and cooperates with the drive mechanism, under power from the removable battery assembly, to move goods along an inventory transit surface in the warehouse environment;

the removable battery assembly and the battery receiving space cooperate to define a battery insertion and removal axis along which the removable battery assembly is inserted into and removed from the battery receiving space;

the battery receiving space comprises a battery guide pin arranged on each opposite side of the battery receiving space;

the removable battery assembly comprises a battery body comprising lateral battery faces, each comprising a longitudinal guide structure that is oriented along the battery insertion and removal axis and is sized to accommodate the battery guide pins as the removable battery assembly is inserted into and removed from the battery receiving space; and the removable battery assembly further comprises a pair of guide pin stabilizers on each of the lateral battery faces, each pair of guide pin stabilizers forms a restricted-width guide pin gap along a longitudinal guide structure on each of the lateral battery faces for receiving a corresponding one of the battery guide pins, the longitudinal guide structure of the lateral battery faces are configured as guide channels, each guide pin stabilizer reducing an effective width of the guide channel.

2. The materials handling vehicle of claim 1, wherein each pair of guide pin stabilizers is formed from a deformable and resilient material.

3. The materials handling vehicle of claim 1, wherein each pair of guide pin stabilizers is formed as a unitary, one piece polyurethane structure.

4. The materials handling vehicle of claim 1, wherein each pair of guide pin stabilizers is configured to deform in a lateral direction perpendicular to the battery insertion and removal axis when a battery guide pin enters the restricted-width guide pin gap.

5. The materials handling vehicle of claim 1, wherein each pair of guide pin stabilizers has a Shore A hardness between 50 Shore A and 90 Shore A.

6. The materials handling vehicle of claim 1, wherein each pair of guide pin stabilizers has a Shore A hardness between 60 Shore A and 80 Shore A.

7. The materials handling vehicle of claim 1, further comprising a fastener, wherein the fastener extends through each pair of guide pin stabilizers and threadedly engages the lateral battery face of the battery body.

8. The materials handling vehicle of claim 1, wherein each pair of guide pin stabilizers comprises an alignment feature received within a corresponding slot formed in one of the lateral battery faces, to prevent rotation of each pair of guide pin stabilizers relative to the lateral battery faces.

9. The materials handling vehicle of claim 1, wherein:
the battery guide pins extend into the guide channels with the removable battery assembly seated in the battery receiving space.

10. The materials handling vehicle of claim 1, wherein:
the guide pin stabilizers reside at a guiding pin parking position along the longitudinal guide structure on each of the lateral battery faces, with the removable battery assembly seated in the battery receiving space; and
the restricted-width guide pin gap formed by each pair of guide pin stabilizers at least partially overlaps the guiding pin parking position along the longitudinal guide structure on each of the lateral battery faces.

11. The materials handling vehicle of claim 1, wherein the battery guide pins have respective diameters that are greater than a width of the restricted-width guide pin gap.

12. The materials handling vehicle of claim 1, wherein the guide pin stabilizers are configured to at least partially yield in a lateral yielding direction perpendicular to the battery insertion and removal axis, and to maintain a degree of lateral resilience, when a guide pin enters the restricted-width guide pin gap.

13. The materials handling vehicle of claim 1, wherein:
each pair of guide pin stabilizers extends partially into or partially over one of the guide channels to reduce the effective width of the guide channel.

14. The materials handling vehicle of claim 1, wherein:
each pair of guide pin stabilizers comprises a truncated portion.

15. The materials handling vehicle of claim 1, wherein:
the battery receiving space comprises opposing pairs of battery guide pins, each opposing pair arranged on opposite sides of the battery receiving space, and each opposing pair comprising a latching pin and a guiding pin;
the removable battery assembly comprises a battery body and a battery locking mechanism;
the battery locking mechanism comprises spring-loaded locking pins that are spring-biased in extended positions and are movable relative to the battery body from the extended positions to respective retracted positions along a latch engagement and disengagement axis;
the latching pin of each opposing pair of battery guide pins comprises a recess forming a battery latch that is positioned to receive a leading portion of one of the spring-loaded locking pins in the extended position, with the removable battery assembly seated in the battery receiving space.

16. A materials handling vehicle comprising a materials handling mechanism, a drive mechanism, a battery receiving space, and a removable battery assembly, wherein:
the materials handling mechanism is configured to engage goods in a warehouse environment and cooperates with the drive mechanism, under power from the removable battery assembly, to move goods along an inventory transit surface in the warehouse environment;
the removable battery assembly and the battery receiving space cooperate to define a battery insertion and removal axis along which the removable battery assembly is inserted into and removed from the battery receiving space;
the battery receiving space comprises opposing pairs of battery guide pins, each opposing pair arranged on opposite sides of the battery receiving space, and each opposing pair comprising a latching pin and a guiding pin;
the removable battery assembly comprises a battery body and a battery locking mechanism;
the battery body comprises lateral battery faces, each comprising a longitudinal guide structure that is oriented along the battery insertion and removal axis and is sized to accommodate the opposing pairs of battery guide pins as the removable battery assembly is inserted into and removed from the battery receiving space;
the battery locking mechanism comprises spring-loaded locking pins that are spring-biased in extended positions and are movable relative to the battery body from the extended positions to respective retracted positions along a latch engagement and disengagement axis; and the latching pin of each opposing pair of battery guide pins comprises a recess forming a battery latch that is positioned to receive a leading portion of one of the spring-loaded locking pins in the extended position, with the removable battery assembly seated in the battery receiving space.

17. The materials handling vehicle of claim 16, wherein:
the latching pin of each opposing pair of battery guide pins comprises a chamfered engagement face; and
the spring-loaded locking pins of the battery locking mechanism each comprise a complementary chamfered engagement face that is oriented to face the chamfered engagement face of one of the latching pins as the removable battery assembly is inserted into the battery receiving space.

18. The materials handling vehicle of claim 17, wherein the chamfered engagement face of each latching pin leads to the recess forming the battery latch of each latching pin.

19. The materials handling vehicle of claim 16, wherein the latching pin and the guiding pin of each opposing pair of battery guide pins are positioned along a common guide pin axis, parallel to the battery insertion and removal axis.

20. The materials handling vehicle of claim 16, wherein the latching pin and the guiding pin of each opposing pair of battery guide pins are separated by a guide pin spacing that is less than half of a longitudinal dimension of the lateral battery faces, and is at least about 47.5 mm.

21. The materials handling vehicle of claim 16, wherein:
the longitudinal guide structure of the lateral battery faces is configured as guide channels; and
the opposing pairs of battery guide pins extend into the guide channels with the removable battery assembly seated in the battery receiving space.

22. The materials handling vehicle of claim 16, wherein the longitudinal guide structure of one of the lateral battery faces is shorter than the longitudinal guide structure of the other lateral battery face, to create free space along one of the lateral battery faces.

23. The materials handling vehicle of claim 16, wherein:
the removable battery assembly further comprises a pair of guide pin stabilizers on each of the lateral battery faces;
each pair of guide pin stabilizers forms a restricted-width guide pin gap along the longitudinal guide structure on each of the lateral battery faces.

24. The materials handling vehicle of claim 23, wherein:
the guiding pin of each opposing pair of battery guide pins resides at a guiding pin parking position along the longitudinal guide structure on each of the lateral battery faces, with the removable battery assembly seated in the battery receiving space;
the restricted-width guide pin gap formed by each pair of guide pin stabilizers at least partially overlaps the guiding pin parking position along the longitudinal guide structure on each of the lateral battery faces.

25. The materials handling vehicle of claim 23, wherein the guide pin stabilizers are configured to yield in a lateral yielding direction perpendicular to the battery insertion and removal axis, and to maintain a degree of lateral resilience, when a guiding pin enters the restricted-width guide pin gap.

26. The materials handling vehicle of claim 23, wherein:
the longitudinal guide structure of the lateral battery faces are configured as guide channels; and
each guide pin stabilizer comprises a stabilizer shank that is anchored in the battery body and a stabilizer cap that extends partially into or partially over one of the guide channels to reduce an effective width of the guide channel.

27. The materials handling vehicle of claim 16, wherein:
the battery locking mechanism comprises a spring-loaded battery handle;
the spring-loaded battery handle comprises a planar handle cam surface and the spring-loaded locking pin comprises a planar pin cam surface that is parallel to the handle cam surface; and
the spring-loaded battery handle and the spring-loaded locking pin are configured such that the handle cam surface engages the pin cam surface with movement of the battery handle, relative to the battery body, along the battery insertion and removal axis.

28. The materials handling vehicle of claim 27, wherein:
the battery body constrains the spring-loaded battery handle and the handle cam surface to linear movement along the battery insertion and removal axis;
the battery body constrains the spring-loaded locking pin and the pin cam surface to linear movement along a latch engagement and disengagement axis that is perpendicular to the battery insertion and removal axis;
the spring-loaded battery handle is spring-biased in a locked position and is movable relative to the battery body from the locked position to an unlocked position in a handle lifting direction along the battery insertion and removal axis; and
the spring-loaded locking pin is spring-biased in the extended position and is movable relative to the battery body from the extended position to a retracted position along the latch engagement and disengagement axis in response to movement of the battery handle, relative to the battery body, in the handle lifting direction with the handle cam surface engaged with the pin cam surface.

29. The materials handling vehicle of claim 16, wherein:
the removable battery assembly comprises a leading face and an electrical socket on the leading face of the removable battery assembly;
the battery receiving space comprises an electrical connector that complements the electrical socket of the removable battery assembly; and
the spring-loaded locking pins are positioned at points along a longitudinal dimension of the battery body that results in locking pin engagement with the latching pins simultaneously with engagement of the electrical socket on the leading face of the removable battery assembly with the electrical connector in the battery receiving space, as the removable battery assembly is inserted into the battery receiving space, with the spring-loaded battery handle in the locked position.

30. The materials handling vehicle of claim 29, wherein the leading face of the removable battery assembly rests on a bottom surface of the battery receiving space with the spring-loaded locking pins engaged with the latching pins, and the electrical socket engaged with the electrical connector.

31. The materials handling vehicle of claim 16, wherein:
the latching pin and the guiding pin of each opposing pair of battery guide pins are positioned along a common guide pin axis, parallel to the battery insertion and removal axis;
the longitudinal guide structure of the lateral battery faces are configured as guide channels; and
the opposing pairs of battery guide pins extend into the guide channels with the removable battery assembly seated in the battery receiving space.

32. The materials handling vehicle of claim 16, wherein:
the longitudinal guide structure of the lateral battery faces are configured as guide channels;
the opposing pairs of battery guide pins extend into the guide channels with the removable battery assembly seated in the battery receiving space;
the removable battery assembly further comprises a pair of guide pin stabilizers on each of the lateral battery faces; and
each pair of guide pin stabilizers forms a restricted-width guide pin gap along the guide channel on each of the lateral battery faces.

33. A materials handling vehicle configured to move along an inventory transit surface and engage goods in a warehouse environment, the materials handling vehicle comprising a battery receiving space, and a removable battery assembly, wherein:
the removable battery assembly and the battery receiving space cooperate to define a battery insertion and removal axis;
the battery receiving space comprises opposing pairs of battery guide pins, each opposing pair arranged on opposite sides of the battery receiving space, and each opposing pair comprising a latching pin and a guiding pin;
the removable battery assembly comprises a battery body and a battery locking mechanism;
the battery body comprises lateral battery faces, each comprising a longitudinal guide structure that is oriented along the battery insertion and removal axis;
the battery locking mechanism comprises spring-loaded locking pins that are spring-biased in extended positions and are movable relative to the battery body from the extended positions to respective retracted positions along a latch engagement and disengagement axis; and
the latching pin of each opposing pair of battery guide pins comprises a recess forming a battery latch that is positioned to receive a leading portion of one of the spring-loaded locking pins in the extended position, with the removable battery assembly seated in the battery receiving space.

* * * * *